United States Patent
Kim et al.

(10) Patent No.: US 9,781,123 B2
(45) Date of Patent: Oct. 3, 2017

(54) METHODS OF PROVIDING SOCIAL NETWORK SERVICE AND SERVER PERFORMING THE SAME

(71) Applicant: SAMSUNG ELECTRONICS CO., LTD., Suwon-si (KR)

(72) Inventors: Sun-kyung Kim, Kiev (UA); Mykola Alieksieiev, Kiev (UA); Aleksey Kulakov, Kiev (UA); Aleksey Mokhonko, Kiev (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/696,883

(22) Filed: Apr. 27, 2015

(65) Prior Publication Data

US 2015/0312260 A1    Oct. 29, 2015

Related U.S. Application Data

(60) Provisional application No. 61/984,257, filed on Apr. 25, 2014.

(30) Foreign Application Priority Data

Apr. 30, 2014   (KR) .................. 10-2014-0052973
Apr. 6, 2015    (KR) .................. 10-2015-0048328

(51) Int. Cl.
| | |
|---|---|
| *H04L 29/06* | (2006.01) |
| *G06F 21/62* | (2013.01) |
| *H04L 12/58* | (2006.01) |
| *H04L 29/08* | (2006.01) |

(52) U.S. Cl.
CPC ........ *H04L 63/102* (2013.01); *G06F 21/6218* (2013.01); *G06F 21/6254* (2013.01); *H04L 51/04* (2013.01); *H04L 51/046* (2013.01); *H04L 51/32* (2013.01); *H04L 65/403* (2013.01); *H04L 67/04* (2013.01); *H04L 67/10* (2013.01)

(58) Field of Classification Search
CPC ....... H04L 63/102; H04L 51/04; H04L 51/32; H04L 51/046; H04L 65/403; G06F 21/6254; G06F 21/6218
USPC ......................................... 713/152
See application file for complete search history.

(56) References Cited

U.S. PATENT DOCUMENTS

| | | | |
|---|---|---|---|
| 6,711,264 B1 | 3/2004 | Matsumoto et al. | |
| 6,742,116 B1 * | 5/2004 | Matsui ................. | H04L 9/0894 709/204 |

(Continued)

FOREIGN PATENT DOCUMENTS

KR   1020050053292 A   6/2005

OTHER PUBLICATIONS

Communication dated Jul. 27, 2015, issued by the International Searching Authority in counterpart International Application No. PCT/KR2015/004140 (PCT/ISA/210 and PCT/ISA/237).

*Primary Examiner* — Mahfuzur Rahman
(74) *Attorney, Agent, or Firm* — Sughrue Mion, PLLC

(57) ABSTRACT

Methods and apparatuses for sharing content through a chatting space of a social networking service (SNS) are provided. The method includes detecting an access of a plurality of users to the chatting space, and decrypting encrypted content that was previously shared by the plurality of users in the chatting space, in response to the plurality of users accessing the chatting space.

28 Claims, 51 Drawing Sheets

(56) References Cited

U.S. PATENT DOCUMENTS

| | | | | |
|---|---|---|---|---|
| 6,941,456 B2* | 9/2005 | Wilson | G06F 21/62 | 713/160 |
| 7,624,421 B2* | 11/2009 | Ozzie | H04L 63/08 | 709/201 |
| 8,762,285 B2* | 6/2014 | Davis | G06Q 30/02 | 705/319 |
| 8,898,587 B2* | 11/2014 | Patterson | G06F 17/242 | 715/230 |
| 8,977,722 B2* | 3/2015 | Tsao | G06F 9/526 | 709/219 |
| 9,183,560 B2* | 11/2015 | Abelow | G06Q 10/067 | |
| 2003/0003953 A1* | 1/2003 | Houplain | H04L 12/1827 | 455/553.1 |
| 2007/0162554 A1 | 7/2007 | Branda et al. | | |
| 2008/0027909 A1* | 1/2008 | Gang | G06F 17/30873 | |
| 2008/0059992 A1* | 3/2008 | Amidon | G06Q 30/0201 | 725/25 |
| 2008/0168548 A1* | 7/2008 | O'Brien | G06F 21/335 | 726/9 |
| 2009/0052660 A1 | 2/2009 | Chen et al. | | |
| 2009/0147958 A1* | 6/2009 | Calcaterra | H04L 9/0822 | 380/260 |
| 2009/0276439 A1 | 11/2009 | Rosenblatt et al. | | |
| 2009/0299927 A1 | 12/2009 | Chen et al. | | |
| 2010/0239077 A1* | 9/2010 | Michaelis | H04L 63/029 | 379/93.02 |
| 2011/0169735 A1 | 7/2011 | Weber | | |
| 2011/0307695 A1* | 12/2011 | Slater | G06F 17/30528 | 713/163 |
| 2013/0254284 A1* | 9/2013 | Dougherty | G06F 21/00 | 709/204 |
| 2014/0280955 A1* | 9/2014 | Stuntebeck | H04L 63/107 | 709/226 |
| 2014/0341086 A1* | 11/2014 | Zhang | H04N 7/152 | 370/260 |
| 2014/0375756 A1* | 12/2014 | Yang | H04N 7/152 | 348/14.09 |

* cited by examiner

FIG. 10
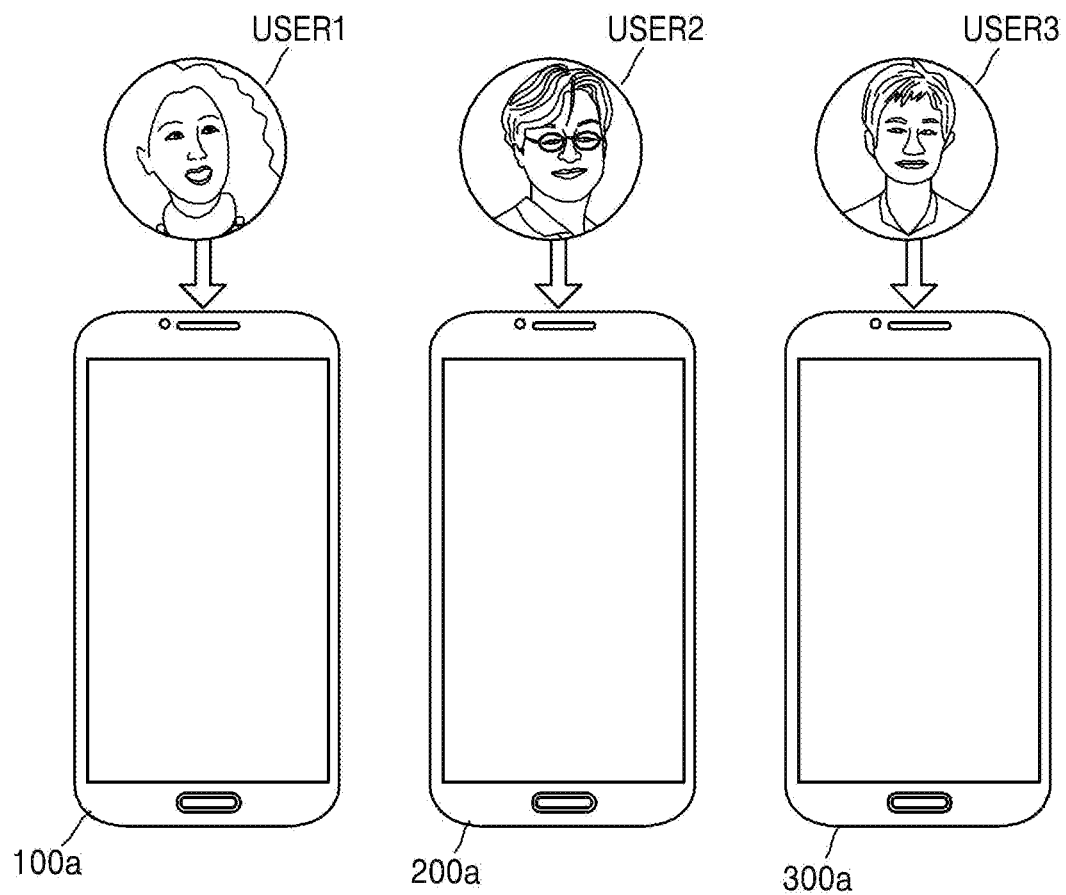
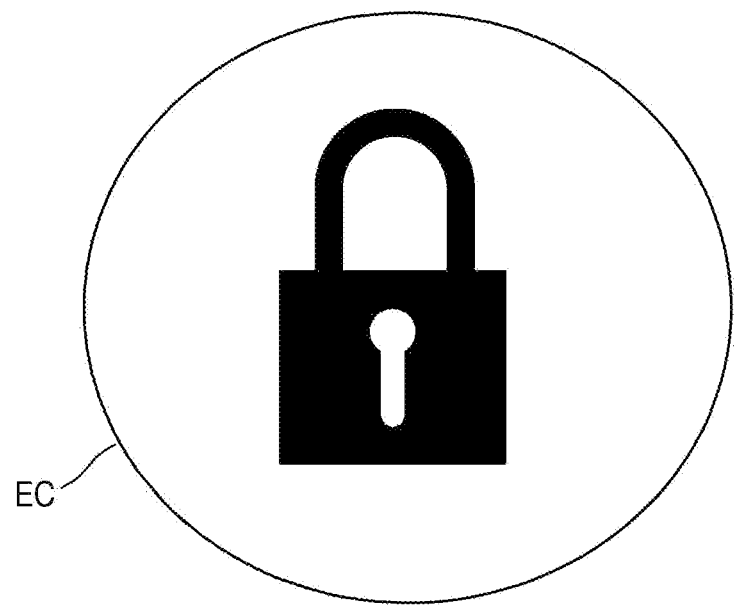

METHODS OF PROVIDING SOCIAL NETWORK SERVICE AND SERVER PERFORMING THE SAME

CROSS-REFERENCE TO RELATED APPLICATION(S)

This application claims priority from U.S. Provisional Application No. 61/984,257, filed on Apr. 25, 2014, in the United States Patent and Trademark Office, Korean Patent Application No. 10-2014-0052973, filed on Apr. 30, 2014, in the Korean Intellectual Property Office, and Korean Patent Application No. 10-2015-0048328, filed on Apr. 6, 2015, in the Korean Intellectual Property Office, the entire disclosures of which are each incorporated herein by reference.

BACKGROUND

1. Field

Apparatuses and methods consistent with exemplary embodiments relate to a social networking service (SNS), and more particularly, to a method of providing a SNS for encrypting content in a virtual space and decrypting the encrypted content, which may be performed by a security group that includes a plurality of users.

2. Description of Related Art

Due to the increasing use of devices such as user terminals which may be used to communicate via wired or wireless communication, various methods of sharing content between a plurality of devices have been suggested. However, if a proper action is not taken to secure and protect the content shared between the plurality of devices, private content may be recklessly or accidentally distributed.

For example, private content such as a video clip or a picture which are related to at least two users, may be generated. In this example, if a relation between the at least two users changes from when the content was generated, one or more of the users may not want the private content to be exposed to an outside source.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments relate to a method of sharing and protecting content in a social networking service (SNS) to provide enhanced security when a plurality of devices access a virtual space and share content, and a server performing the same.

Additional aspects will be set forth in part in the description which follows and, in part, will be apparent from the description, or may be learned by practice of the presented exemplary embodiments.

According to an aspect of an exemplary embodiment, provided is a method of sharing content in a chatting room of a social networking service (SNS), the method including detecting whether a plurality of users included in a sharing group are accessing the chatting space; and decrypting encrypted content that was previously shared in the chatting space by the sharing group of users, in response to detecting that the plurality of users included in the sharing group of users are accessing the chatting space.

The plurality of users may include a first user, a second user, and a third user, and the method may further include decrypting the encrypted content that was previously shared in the chatting space, in response to at least two selected from the group consisting of the first through third users accessing the chatting space.

The method may further include encrypting the shared content that was decrypted, in response to at least one selected from the group consisting of the plurality of users being disconnected from the chatting space after the decrypting of the encrypted content is performed.

The method may further include generating the chatting space, wherein the generating of the chatting space may include setting a decryption condition with respect to content that may be shared in the chatting space.

The setting of the decryption condition may include determining at least two essential users that have to access the chatting space to decrypt the encrypted content, from among the plurality of users.

The method may further include determining a sharing limitation with respect to the decrypted content so that the decrypted content is shared between only the plurality of users.

The determining of the sharing limitation may include determining at least one selected from the group consisting of a providing time for the decrypted content, whether a visible watermark is included in the decrypted content, whether a print screen function is prohibited with respect to the decrypted content, whether a device shaking request message is transmitted while the decrypted content is being played, and whether to stop providing the decrypted content based on a real-time detection of whether the plurality of users are viewing the decrypted content.

The setting of the decryption condition may include determining at least one of a method of transmitting a decryption request to the plurality of users and a method of receiving a decryption approval from the plurality of users.

The method of transmitting the decryption request may include transmitting a decryption request to the plurality of users using at least one of a text message, an e-mail, a notification window, and a chatting message.

The method of receiving the decryption approval may include receiving a decryption approval from the plurality of users, using at least one of a video phone call, biometric identification data, a password, and a pin code.

The setting of the decryption condition may include setting different decryption conditions for different pieces of content, respectively.

The generating the chatting space may further include determining the plurality of users.

The determining of the plurality of users may include transmitting a message asking the plurality of users about whether the plurality of users are to participate in the chatting space, based on an address book that is accessible by an application providing the chatting space.

The determining of the plurality of users may further include requesting the plurality of users for a user identification certification via at least one of a video phone call, biometric identification data, a password, and a pin code.

The generating the chatting space may further include determining a generation condition with respect to the content that may be shared in the chatting space.

The determining the generation condition may include determining at least two essential users that have to access the chatting space to generate the content, from among the plurality of users.

The method may further include generating the content that is shared in the chatting space, in response to the plurality of users accessing the chatting space.

The method may further include generating a sharing folder for the generated content in at least one device from among respective devices of the plurality of users, and a server.

The method may further include encrypting the generated content.

The method may further include storing the encrypted content in at least one device from among respective devices of the plurality of users, and the server.

The encrypting may include generating an encryption key for encrypting the content and a plurality of partial keys of the encryption key; distributing the generated plurality of partial keys to the plurality of devices, respectively; and encrypting the content using the encryption key.

The encrypting of the content may further include encrypting the plurality of partial keys, and the distributing of the generated plurality of partial keys may include distributing the encrypted plurality of partial keys to the plurality of devices, respectively.

The method may further include storing the distributed encryption keys in a security zone of the respective devices of the plurality of users.

The decrypting may further include recovering a decryption key corresponding to the encryption key from the distributed plurality of partial keys of the encryption key, in response to the plurality of users accessing the chatting space; and decrypting the encrypted content using the recovered decryption key.

According to an aspect of an exemplary embodiment, provided is a server configured to share content in a chatting space of a social networking service (SNS), the server including a receiver configured to receive, from one of a plurality of users of a sharing group of users, a request for generating a chatting space that may be accessed by the plurality of users; a controller configured to generate the chatting space, and decrypt encrypted content that was previously shared by the plurality of users of the sharing group in the chatting space, in response to the plurality of users of the sharing group accessing the chatting space; and a transmitter configured to transmit the decrypted content to the chatting space.

The plurality of users may include a first user, a second user, and a third user, and the controller may decrypt the encrypted content that was previously shared in the chatting space, in response to at least two selected form the group consisting of the first through third users accessing the chatting space.

The controller may determine a decryption condition with respect to content that may be shared in the chatting space or a generation condition with respect to the content that may be shared in the chatting space.

According to an aspect of an exemplary embodiment, provided is a non-transitory computer-readable medium having stored thereon a computer program that is executable by a computer to perform the methods described herein.

BRIEF DESCRIPTION OF THE DRAWINGS

These and/or other aspects will become apparent and more readily appreciated from the following description of the exemplary embodiments, taken in conjunction with the accompanying drawings, in which:

FIG. 10 illustrates an example of encrypting included in the method of encrypting content described with reference to FIG. 5, according to an exemplary embodiment;

DETAILED DESCRIPTION

Figure 1:
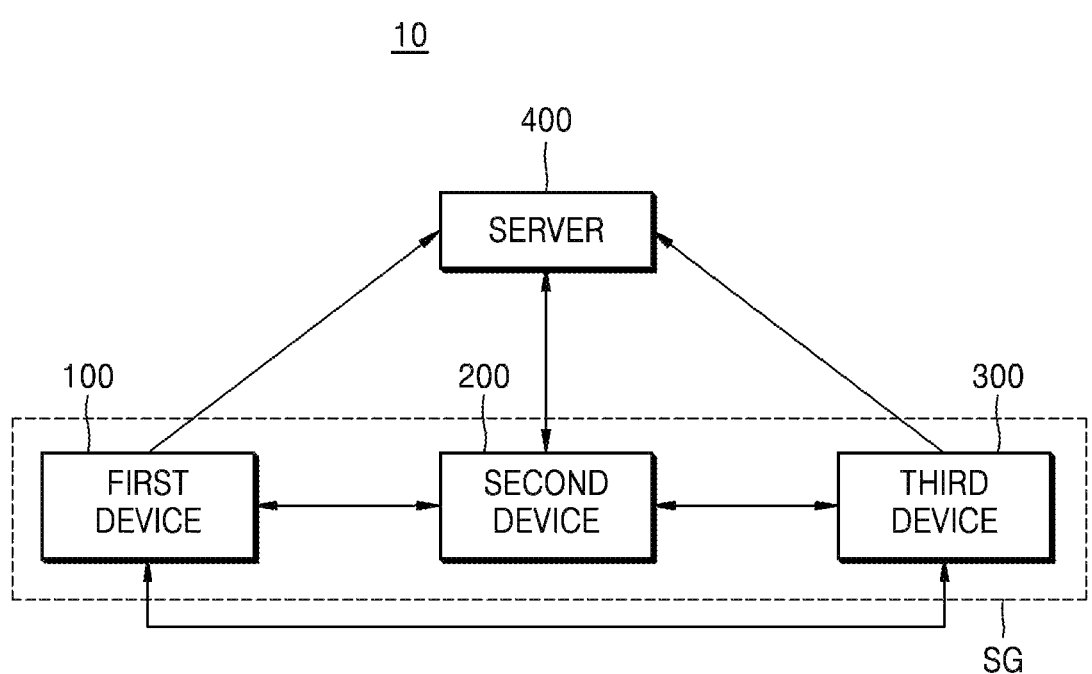
FIG. 1 illustrates a block diagram of a security system according to an exemplary embodiment.

Reference will now be made to exemplary embodiments, examples of which are illustrated in the accompanying drawings, wherein like reference numerals refer to like elements throughout. In this regard, one or more of the exemplary embodiments may have different forms and should not be construed as being limited to the descriptions set forth herein. Accordingly, the exemplary embodiments are merely described below, by referring to the figures, to explain aspects of the present description.

In the description of the exemplary embodiments, certain detailed explanations of the related art are omitted when it is deemed that they may unnecessarily obscure the essence of the inventive concept. As used herein, the term "and/or" includes any and all combinations of one or more of the associated listed items. Expressions such as "at least one of," when preceding a list of elements, modify the entire list of elements and do not modify the individual elements of the list.

General and widely-used terms have been employed herein, in consideration of functions provided by the inventive concept, and may vary according to an intention of one of ordinary skill in the art, a precedent, emergence of new technologies, and the like. Additionally, in some cases, applicant may arbitrarily select specific terms. Then, the applicant will provide the meaning of the terms in the description of the inventive concept. Accordingly, It will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, terms used herein, such as 'unit' or 'module', refer to entities for processing at least one function or operation. These entities may be implemented by hardware, software, or a combination of hardware and software.

One or more exemplary embodiments relate to sharing and protecting content between a plurality of terminals that may access a shared space or site such as a chatroom or other chatting space. While accessing the shared space, content such as photos, text, moving pictures, audio, and the like, may be shared between users of the plurality of terminals. For example, if a first user is accessing the shared space via a first terminal, and one or more other users are accessing the shared space via one or more other respective terminals, the first user may share content with the one or more other users by uploading, posting, transmitting, or otherwise sharing the content on the shared space, using the first terminal. Likewise, the one or more other users may receive the shared content through a display and/or speaker of their respective terminal.

According to one or more exemplary embodiments, the shared content may be protected to prevent unauthorized users, or other users who are not present in the shared space when the content is shared, from viewing or otherwise accessing the shared content. For example, the shared content may be encrypted using a key such as a public and/or a private key. However, rather than give the entire key to each of the plurality of terminals that are present in the shared space, only a portion of the key may be given to some or each of the plurality of terminals.

For example, the shared space may be stored at and/or executed by a terminal such as a server. When the plurality of terminals access the shared space, the plurality of terminals may perform such access through the server. In response to content being shared between the plurality of terminals, the server may encrypt the shared content via an encryption key. Also, the server may divide the encryption key (or decryption key) into a plurality of partial keys, and provide only one partial key to each of the plurality of terminals. For example, if the plurality of terminals include two terminals, the server may divide the encryption key into two partial keys. A first partial key may be given to a first terminal and a second partial key may be given to a second terminal.

Accordingly, to subsequently unlock the shared content, some or all of the plurality of terminals must be present within the shared space to fully recover the encryption key. That is, enough terminals to restore the entire key must be present in the shared space to access the previously shared content. As a result, one terminal from among the plurality of terminals is not able to independently unlock or otherwise decrypt the shared content, on their own, and must work together with at least one other terminal from among the plurality of terminals to unlock or decrypt the shared content. By requiring at least two of the plurality of terminals to be present to subsequently access the previously shared content, an additional security measure may be used to protect shared content.

FIG. 1 illustrates a block diagram of a security system 10 according to an exemplary embodiment.

Referring to FIG. 1, the security system 10 includes a security group (SG) that includes a plurality of devices, for example, first through third devices 100 through 300, and a server 400. For example, the security group SG may safely share content, in a virtual space, between the plurality of devices 100 through 300. For this, the server 400 may encrypt the content and decrypt the encrypted content. Accordingly, the security system 10 may also be referred to as a content encryption system or an encrypted-content decryption system.

It should be appreciated that the elements, shown in FIG. 1 are not all essential elements. For example, the security group SG or the security system 10 may be implemented by using more or less elements than those shown in FIG. 1. In other examples, the security group may include two devices or less, or four or more devices. The security group may also be referred to as a sharing group. The sharing group is a group of terminals that share content while accessing a virtual space, such as, a social networking service (SNS).

The first through third devices 100 through 300 may access a virtual space or a cyber space at a same time. The virtual space refers to a virtual space that is not in a real world space and is created by using a computer, the internet, and/or the like. For example, the virtual space may be a space in which a vast amount of information may be exchanged and shared through a communication network such as the Internet. The virtual space may be accessed using a terminal such as a mobile phone, a computer, a tablet, a television, a game console, an appliance, a kiosk, and the like. For example, a conversation, sending and/or receiving a letter, shopping, banking, commerce using virtual money, various culture activities for taking a rest or enjoying leisure time, educational activities, and the like, may be performed in the virtual space.

According to an exemplary embodiment, the virtual space may be a space for a conversation window or a space for a group conversation window that may be provided by a messenger service such as KakaoTalk, Line, Tictoc, NateOn, Microsoft network sources (MSN), Skype, and the like. According to another exemplary embodiment, the virtual space may be a space for a group which is provided by a social networking service (SNS) such as Facebook, and the like. According to another exemplary embodiment, the virtual space may be a space provided by a closed SNS such as Kakao Story or Band, and the like.

While many different users may be able to access the virtual space, a security group may be a particular set or group of the users that are designated by a server as having access to content shared between the group of users. For example, thousands of users may access a SNS such as KakaoTalk, however, the security group may be three users that happen to be friends who access the SNS at the same time and who share content between themselves.

The first device 100 may be a device of a first user USER1, the second device 200 may be a device of a second user USER2, and the third device 300 may be a device of the third user USER3. As a non-limiting example, the first through third devices 100 through 300 may be smartphones, but are not limited thereto. As another example, at least one of the first through third devices 100 through 300 may be a tablet personal computer (PC), a PC, a smart TV, a cellular phone, a personal digital assistant (PDA), a laptop computer, a media player, a micro server, a global positioning system (GPS), an e-book terminal, a digital broadcasting terminal, a navigation system, a kiosk, a moving pictures expert group audio layer 3 (MP3) player, a digital camera, a wearable device, other mobile or non-mobile computing devices, and the like.

The server 400 may generate or initialize the security group SG. For example, the server 400 may provide a user interface (UI) object with respect to a chatting space that may be accessed by the plurality of users USER1 through USER3. In this example, the server 400 may detect an access of the plurality of users USER1 through USER3 to the chatting space, and, if the plurality of users USER1 through USER3 access the chatting space, decrypt encrypted content that was shared in the chatting space in advance. For example, the server 400 may decrypt encrypted content that was previously shared in the chatting space between the first through third users USER1 through USER3.

In the current embodiment, at least one of the first through third devices 100 through 300 may access the virtual space, and generate or store content. At least one of the first through third devices 100 through 300 or the server 400 may encrypt the content, and the encrypted content may be copied and shared in the virtual space between the first through third devices 100 through 300. Accordingly, content generated after the at least one of the first through third devices 100 through 300 accesses the virtual space, or content in the virtual space that is owned by not just one person, but the first through third device 100 through 300 which have accessed the virtual space or the first through third users USER1 through USER3 of the first through third device 100 through 300, may be generated and stored.

According to an exemplary embodiment, at least one of the first through third devices 100 through 300 may store the encrypted content in a security zone, for example, TrustZone. According to another exemplary embodiment, the server 400 may store encrypted content, and the stored content may be shared between the first through third devices 100 through 300 which have accessed the virtual space.

As an example, the content may include video content such as TV program images, video on demand (VOD), user-created contents (UCCs), a music video clip, a Youtube video clip, and the like, still image content such as a photograph, a picture, and the like, text content such as an e-book for a poem or a novel, a letter, a work file, a web page, and the like, music content such as music, a musical program, a radio broadcast, and the like, or an application such as a widget, a game, a video phone call, and the like.

According to an exemplary embodiment, content may be selected manually according to a user input. For example, content may be generated by executing an application such as a camera application while the first through third devices 100 through 300 are accessing the virtual space, and the generated content may be selected. As another example, content may be selected by executing an application such as an album application while the first through third devices 100 through 300 are accessing the virtual space. As another example, content may be selected by executing a particular application for sharing content in the security group.

According to another exemplary embodiment, content may be automatically determined according to state information about the first through third devices 100 through 300, based on context. For example, content may be determined according to at least one of location information about the first through third devices 100 through 300 and relation information about the first through third devices 100 through 300 in a SNS. As another example, one of the first through third devices 100 through 300 may unilaterally determine content.

According to an exemplary embodiment, the content may be encrypted by at least one of the first through third devices 100 through 300 or the server 400, and the encrypted content may be decrypted and shared between the first through third devices 100 through 300 only when the first through third devices 100 through 300 have accessed or are accessing the virtual space. Accordingly, if all of the first through third devices 100 through 300 consent, the content may become public or may be changed.

For example, the security group SG that includes the first through third devices 100 through 300 and the server 400 may encrypt/decrypt content based on a secret sharing method (also referred as to a secret splitting method). The secret sharing method may be performed using an encryption technology for securely maintaining and managing secret information by splitting one piece of secret information (for example, an encryption key) into a plurality of secret shares and storing the plurality of secret shares at each group member.

According to another exemplary embodiment, the content may be encrypted by at least one of the first through third devices 100 through 300 which have accessed the virtual space or the server 400. When some of the first through third devices 100 through 300 access the virtual space, the encrypted content may be decrypted and shared therebetween. Accordingly, if some of the first through third devices 100 through 300 consent, the content may become public or be changed.

For example, the security group SG that includes the first through third devices 100 through 300 and the server 400 may encrypt/decrypt content based on a threshold method. The threshold method is a modified method of the secret sharing method. In an example of the threshold method, if t or more participants from among N participants are near each other, original secret information may be recovered. However, if less than t participants are near each other, the original secret information may not be recovered. For example, if N is 3 and t is 2, encrypted content may be decrypted and shared when two or more devices from among the first through third devices 100 through 300 are near each other.

An example of a method of providing a SNS to the security group SG which is shown in FIG. 1, that is, examples of a method of encrypting content and a method of decrypting the encrypted content while the SNS is being provided are described with reference to FIGS. 3 through 46.

Figure 2:
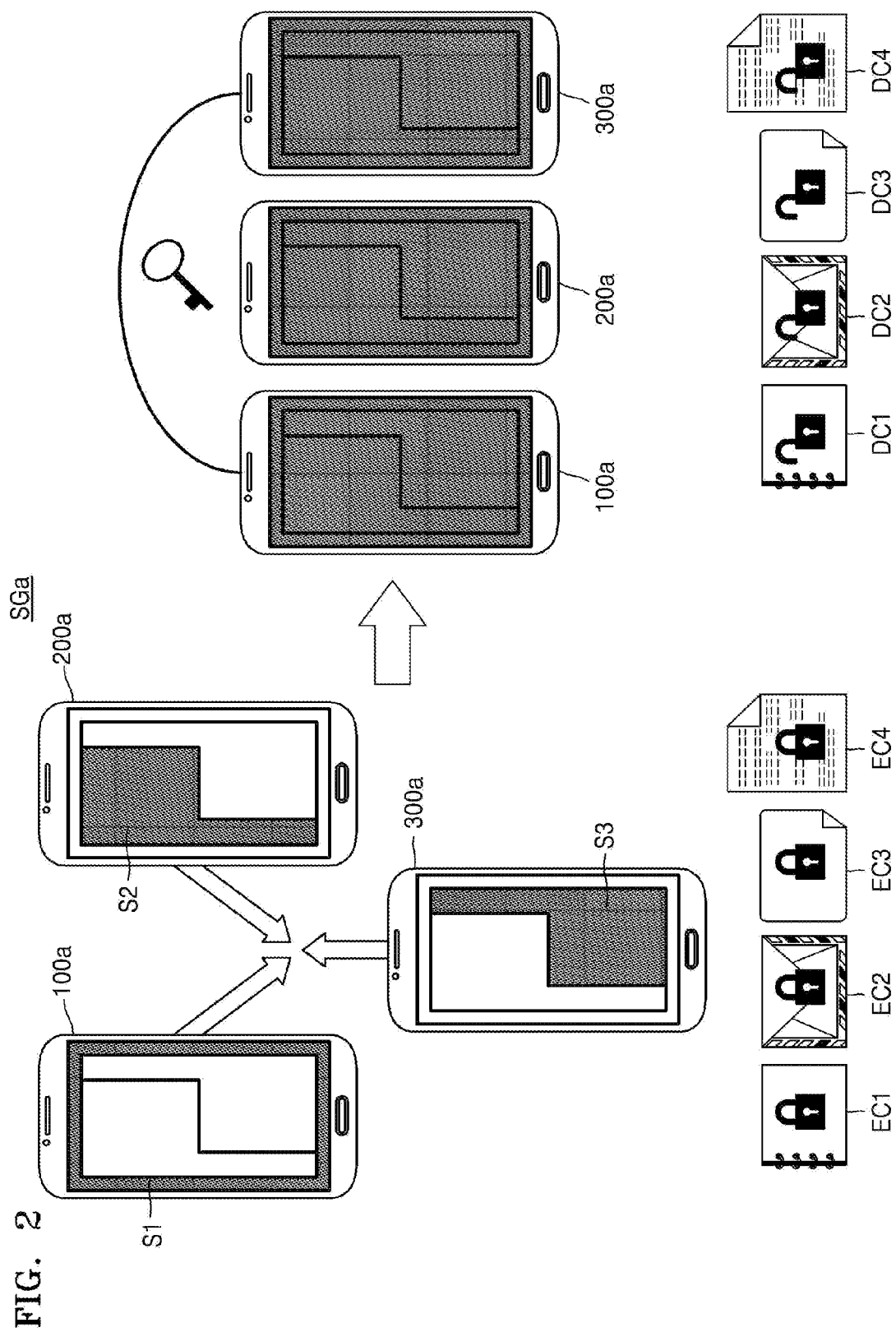
FIG. 2 illustrates a diagram of an example of a security group shown in FIG. 1 according to an exemplary embodiment.

FIG. 2 illustrates a diagram of a security group SGa as an example of the security group SG shown in FIG. 1.

Referring to FIG. 2, the security group SGa includes first through third devices 100a through 300a. For example, the first through third devices 100a through 300a may store an encrypted memo EC1, an encrypted mail EC2, an encrypted photograph EC3, an encrypted document EC4 which is generated when the first through third devices 100a through 300a have accessed a virtual space. In this example, the first through third devices 100a through 300a may respectively split secret shares S1 through S3. Accordingly, each of the first through third devices 100a through 300a may not recover original secret information.

However, when each of the first through third devices 100a through 300a have accessed or are accessing a virtual space, the original secret information may be recovered based on the split secret shares S1 through S3. Thus, the first through third devices 100a through 300a may obtain a decrypted memo DC1, a decrypted mail DC2, a decrypted photograph DC3, or a decrypted document DC4.

Figure 3:
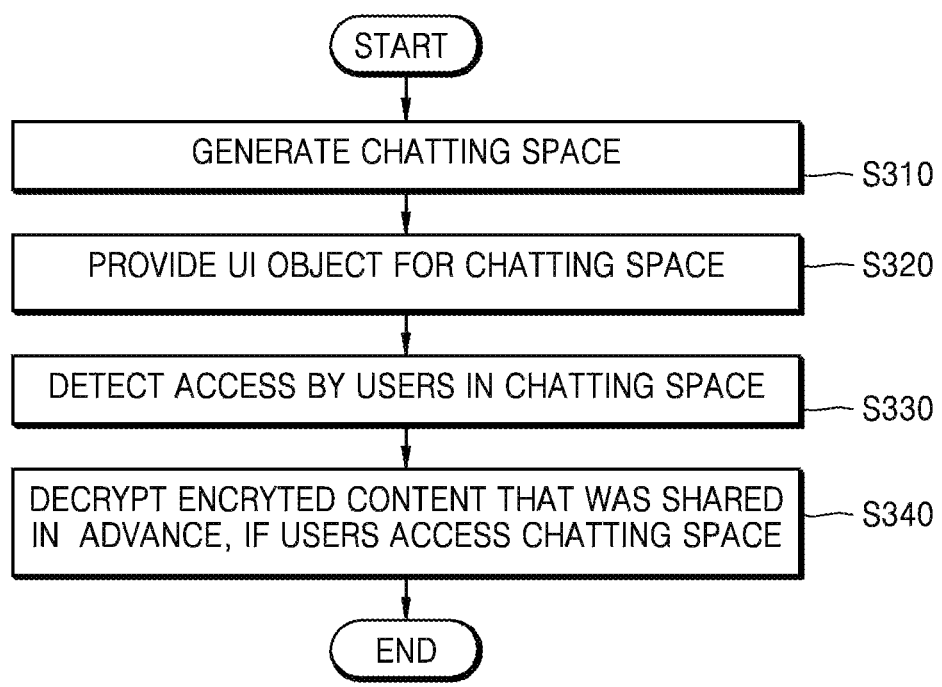
FIG. 3 illustrates a flowchart of a method of providing a social network service (SNS) according to an exemplary embodiment.

FIG. 3 illustrates a flowchart of a method of providing a SNS according to an exemplary embodiment.

Referring to FIG. 3, the method includes decrypting encrypted content, which was shared in a virtual space in advance, if a security group that includes a plurality of users or a plurality of devices accesses the virtual space. For example, the method of providing an SNS may include operations processed in a time series by the server 400 included in the security group SG shown in FIG. 1. Accordingly, it should be understood that a description, provided with regard to the security system 10 described with reference to FIG. 1, may also be applied to the method of providing an SNS in FIG. 3.

In operation S310, a chatting space is generated. According to an exemplary embodiment, the server 400 may determine a plurality of users that may access the chatting space and share content which are referred to as sharing users. According to an exemplary embodiment, the server 400 may determine a condition for generating content that is to be shared in a chatting space. For example, the server 400 may determine at least two essential users who have to access the chatting space so as to generate content, from among a plurality of users.

According to an exemplary embodiment, the server 400 may set a condition for decrypting content that is shared in the chatting space. For example, the server 400 may determine at least two essential users who have to access the chatting space in order to decrypt previously encrypted content, from among a plurality of users. Additionally, the server 400 may determine a sharing limitation with respect to the decrypted content so that the decrypted content is shared only between the sharing users. The server 400 may determine a method of transmitting a decryption request to the plurality of users and a method of receiving a decryption approval obtained from the plurality of users.

In operation S320, a UI object for the chatting space is provided that may be accessed by the plurality of users. The UI object may be a symbol, text, an image, a button, and the like, provided so that a device may communicate with a user. For example, the UI object may include a graphical object that may be manipulated by a user or an object that provides information to a user. Additionally, the UI object may include a graphics user interface (GUI) object or a character user interface (CUI) object, but is not limited thereto.

In operation S330, an access of the plurality of users to the chatting space is detected. For example, the server 400 may detect whether all the sharing users have accessed the chatting space. As another example, the server 400 may detect whether essential users from among the sharing users have accessed the chatting space.

In operation S340, in response to the plurality of users accessing the chatting space, encrypted content that was shared in the chatting space in advance is decrypted. For example, if all the sharing users access the chatting space, the server 400 may decrypt the encrypted content that was shared in the chatting space in advance. As another example, if essential users from among the sharing users access the chatting space, the server 400 may decrypt the encrypted content that was shared in the chatting space in advance.

Figure 4:
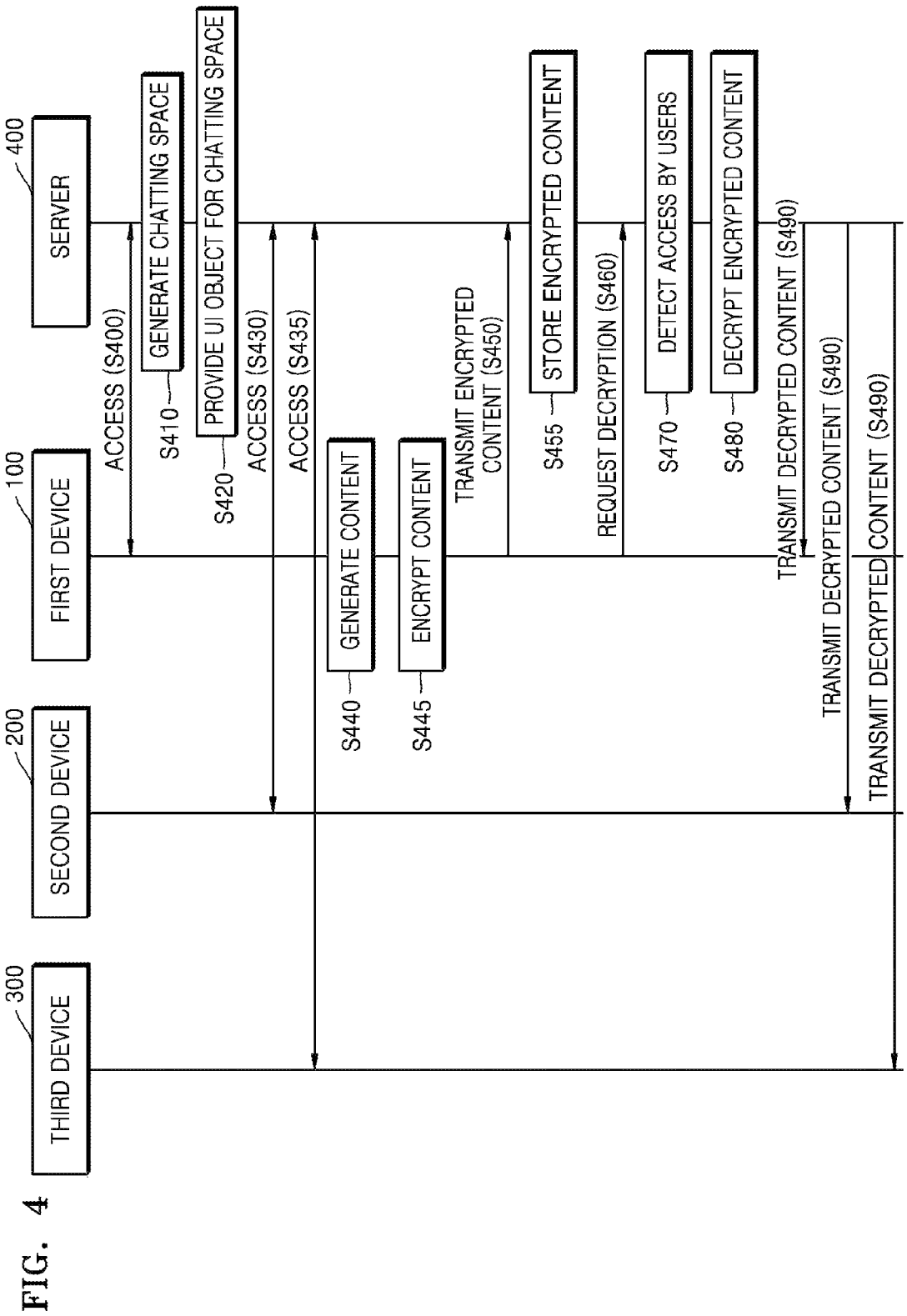
FIG. 4 illustrates a flowchart of an example of an operation of the security system shown in FIG. 1, according to an example of the method of providing an SNS described with reference to FIG. 3, according to an exemplary embodiment.

FIG. 4 illustrates a flowchart of an example of operation of the security system 10 shown in FIG. 1, according to the method of providing an SNS described with reference to FIG. 3, according to an exemplary embodiment.

Referring to FIG. 4, the method includes encrypting content in a virtual space and decrypting encrypted content that was shared in advance, if a security group that includes a plurality of user or a plurality of devices accesses the virtual space. The method of providing an SNS includes operations processed in a series of time by the first through third devices 100 through 300 and the server 4000 included in the security system 10 shown in FIG. 1.

In operation S400, the first device 100 is connected to the server 400. For example, the device 100 may be connected to the server 400 by executing a particular application for chatting, a SNS application, and the like. A device that is first connected to the server is not limited to the first device 100, and an arbitrary device from among the first through third devices 100 through 300 may be first connected to the server 400.

In operation S410, the server 400 generates a chatting space. The server 400 may determine a plurality of users that may access the chatting space and share content. As an example, the server 400 may call the second and third users USER2 and USER3 of the second and third devices 200 and 300 from an address book stored in the first device 100 or the server 400. Here, the server 400 may transmit an inquiry message asking whether the second and third devices 200 and 300 want to participate in the chatting space.

According to an exemplary embodiment, the server 400 may request user identification from the first through third users USER1 through USER3 of the first through third devices 100 through 300. According to another exemplary embodiment, the first device 100 may request user identification from the second and third users USER2 and USER3 of the second and third devices 200 and 300. A request for the user identification may be selectively performed according to a security level of shared content. For example, if content corresponding to a high security level is to be shared, various user identification request processes may be performed. Thus, if a user loses a device or a person other than the user uses the device, reckless distribution of content may be prevented.

For example, the server 400 or another device such as the first device 100 may transmit a user identification request message to the first through third devices 100 to 300. The user identification request message may include a question that may be used to check a user identification or a request a password. The first through third devices 100 through 300 may provide a user identification request to the server 400. The user identification message may be an answer to the question that may check a user identification or a requested password.

As another example, the server 400 or the first device 100 may request a video conversation or a video phone call to perform the user identification. Accordingly, other users may identify another party through a video phone call. As another example, the server 400 or the first device 100 may request a fingerprint recognition or pupil recognition for user identification.

According to an exemplary embodiment, the server may determine a condition for generating content shared in a chatting space. For example, the server 400 may determine at least two essential users who have to access the chatting space so as to generate content, from among a plurality of users.

According to an exemplary embodiment, the server 400 may set a condition for decrypting content that is shared in the chatting space. For example, the server 400 may determine at least two essential users that have to access the chatting space in order to decrypt encrypted content, from among a plurality of users. The server 400 may also determine a sharing limitation with respect to the decrypted content so that the decrypted content is shared only between sharing users. The server 400 may also determine a method of transmitting a decryption request to the plurality of users and a method of receiving a decryption approval obtained from the plurality of users.

In operation S420, the server 400 provides a UI object that corresponds to the chatting space and that may be accessed by the plurality of users in order to access the chatting space.

In operation S430, the second device 200 connects to the server 400. In operation S435, the third device 300 connects to the server 400. According to another exemplary embodiment, operations S430 and S435 may be performed before or at the same time operation S410 is performed. According to another exemplary embodiment, operation S430 and S435 may be performed before or at the same time operation S420 is performed. According to another exemplary embodiment, one of operations S430 and S435 may be performed after operation S440 is performed. For example, if the second user USER2 is not an essential user that has to access the chatting space to generate content and the third user USER3 is an essential user that has to access the chatting space to generate content, operation S430 may be performed after operation S440 is performed.

In operation S440, the first device 100 generates content. For example, if the first through third devices 100 through 300 access the chatting space, the first device 100 may generate content such as a photograph or moving pictures. As another example, if the first through third devices 100 through 300 access the chatting space, the first through third devices 100 through 300 may generate content together such as an electronic document.

According to an exemplary embodiment, if essential users that have to access the chatting space to generate content are connected to the server 400, a photograph or moving pictures may be taken, work on a document may be performed, or an audio may be recorded on an assumption that all designated essential users participate in the generating of the content. A shared folder or album for storing the generated content may be automatically generated on a wallpaper of at least one of the first through third devices 100 through 300.

In operation S445, the first device 100 encrypts the generated content. An example of the encrypting of the content is described with reference to FIG. 5. In operation S450, the first device 100 transmits the encrypted content to the server 400. In operation S455, the server 400 stores the encrypted content. However, the exemplary embodiments are not limited thereto. As another example, the encrypted content may be stored in the first device 100.

If content is generated by the second device 200, the second device 200 may encrypt the generated content, and transmit the encrypted content to the server 400. The encrypted content may also be stored in the second device 200.

In operation S460, the first device 100 requests decryption of the encrypted content from the server 400. In operation S470, the server 400 detects access by the first through third users USER1 through USER3. In operation S480, the server 400 decrypts the encrypted content. An example of the decrypting is described with reference to FIG. 24.

According to an exemplary embodiment, if all the first through third users USER1 through USER3 access the chatting space, encrypted content that was previously shared in the chatting space may be decrypted. According to another exemplary embodiment, if essential users, from among the first through third users USER1 through USER3, access the chatting space, the server 400 may decrypt encrypted content that was previously shared in the chatting space.

In operation S490, the server 400 transmits the decrypted content to the first through third devices 100 through 300. If any of the first through third devices 100 through 300 is disconnected from the chatting space, the server 400 may re-encrypt the decrypted content. Accordingly, the encrypted content may not be shared between the first through third devices 100 through 300.

As such, according to one or more exemplary embodiments, the encrypting of the content may be performed by one of the first through third devices 100 through 300, and the decrypting of content may be performed by the server 400.

Figure 5:
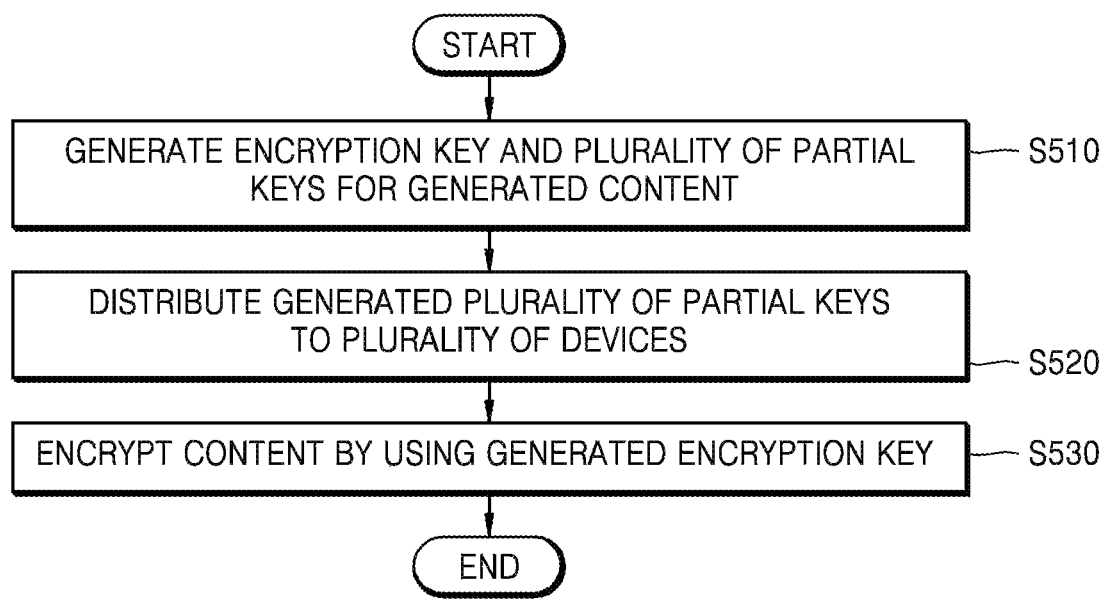
FIG. 5 illustrates a flowchart of a method of encrypting content according to an exemplary embodiment.

FIG. 5 illustrates a flowchart of a method of encrypting content according to an exemplary embodiment.

Referring to FIG. 5, the method of encrypting content may be shared in a virtual space by a security group that includes a plurality of devices, and includes operations that may be performed by one of the plurality of devices as described below. For example, the method may include operations processed in a time series by the first device 100 shown in FIG. 1.

In operation S510, an encryption key and a plurality of partial keys for content are generated. For example, the first device 100 may generate an encryption key and a plurality of partial keys that are to be distributed to the first through third devices 100 through 300. The encryption key may be used to encrypt content, and the plurality of partial keys may be used to decrypt the encrypted content.

According to an exemplary embodiment, content may be encrypted using an asymmetrical encryption method. The encryption key may include a key pair that includes a public key and a private key. In this example, the public key may be used to encrypt content, and the private key may be used to decrypt content. For example, the first device 100 may split the private key into at least 3 parts, and thus, generate at least first through third partial keys. As another example, the first device 100 may split the public key into 3 parts to generate first through third partial keys.

According to another exemplary embodiment, the content may be encrypted using a symmetrical encryption method. Because the encryption key may be used to encrypt or decrypt content, the encryption key may be also referred to as a symmetric key. For example, the first device 100 may split the encryption key into at least 3 parts to generate at least first through third partial keys.

In operation S520, the generated plurality of partial keys are distributed to the plurality of devices. For example, the first device 100 may transmit the second and third partial keys respectively to the second and third devices 200 and 300. According to another exemplary embodiment, the method may further include encrypting a plurality of partial keys, which is performed by the first device 100. In this example, the first device 100 may transmit encrypted second and third partial keys respectively to the second and third devices 200 and 300.

In operation S530, the content is encrypted using the generated encryption key. For example, the first device 100 may encrypt content by using the generated encryption key. For example, in the asymmetric encryption method, the first device 100 may encrypt content by using the public key. As another example, in the symmetric encryption method, the first device 100 may encrypt content by using the encryption key that is a symmetric key.

Figure 6:
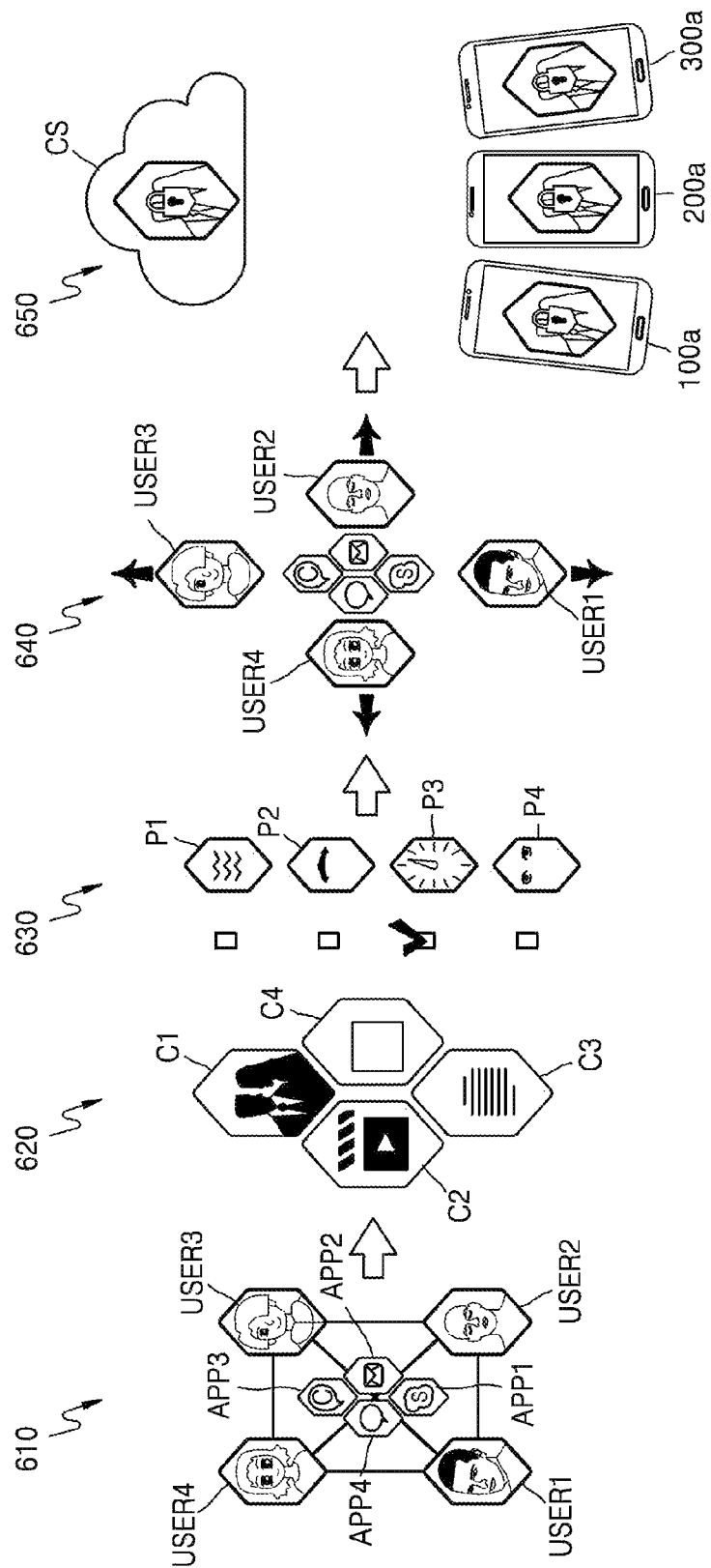
FIG. 6 illustrates an example of encrypting content using the method described with reference to FIG. 5 according to an exemplary embodiment.

FIG. 6 illustrates an example of encrypting content using the method described with reference to FIG. 5, according to an exemplary embodiment.

Referring to FIG. 6, in operation 610, first through forth users USER1 through USER4 may access a virtual space via one of various applications APP1 through APP4. In operation 620, the first through fourth users USER1 through USER4 may generate various content, for example, first through fourth content C1 through C4 in the virtual space. As a non-limiting example, the first content C1 may be a photograph, the second content C2 may be a video clip, the third content C3 may be an electronic document, and the fourth content C4 may be a folder.

In operation 630, the first through fourth users USER1 through USER4 may share the first through fourth content C1 through C4 in the virtual space. In this example, content may be prevented from being exposed to outside of the security group SG by using various protection methods, for example, at least one method selected from the group consisting of the first through fourth protection methods P1 through P4.

For example, in a first protection method P1, a shaking request message may be provided to a device while content is being played. In a second protection method P2, content may be protected by including a visible watermark in the content. In a third protection method P3, content may be played or shared only for a predetermined threshold time, and encrypted after the predetermined threshold time. In a fourth protection method P4, content may be played or shared only when the first through fourth users USER1 through USER4 view a device corresponding to each user, using an eye tracking method in which eyes of a user are detected from a screen of the device, in order to prevent the content from being exposed to an outside.

In operation 640, at least one of the first through fourth users USER1 through USER4 may be disconnected from the virtual space. In operation 650, the content may be stored in at least one of the plurality of devices 100*a* through 100*c* and a cloud server CS in an encryption state.

Figure 7:
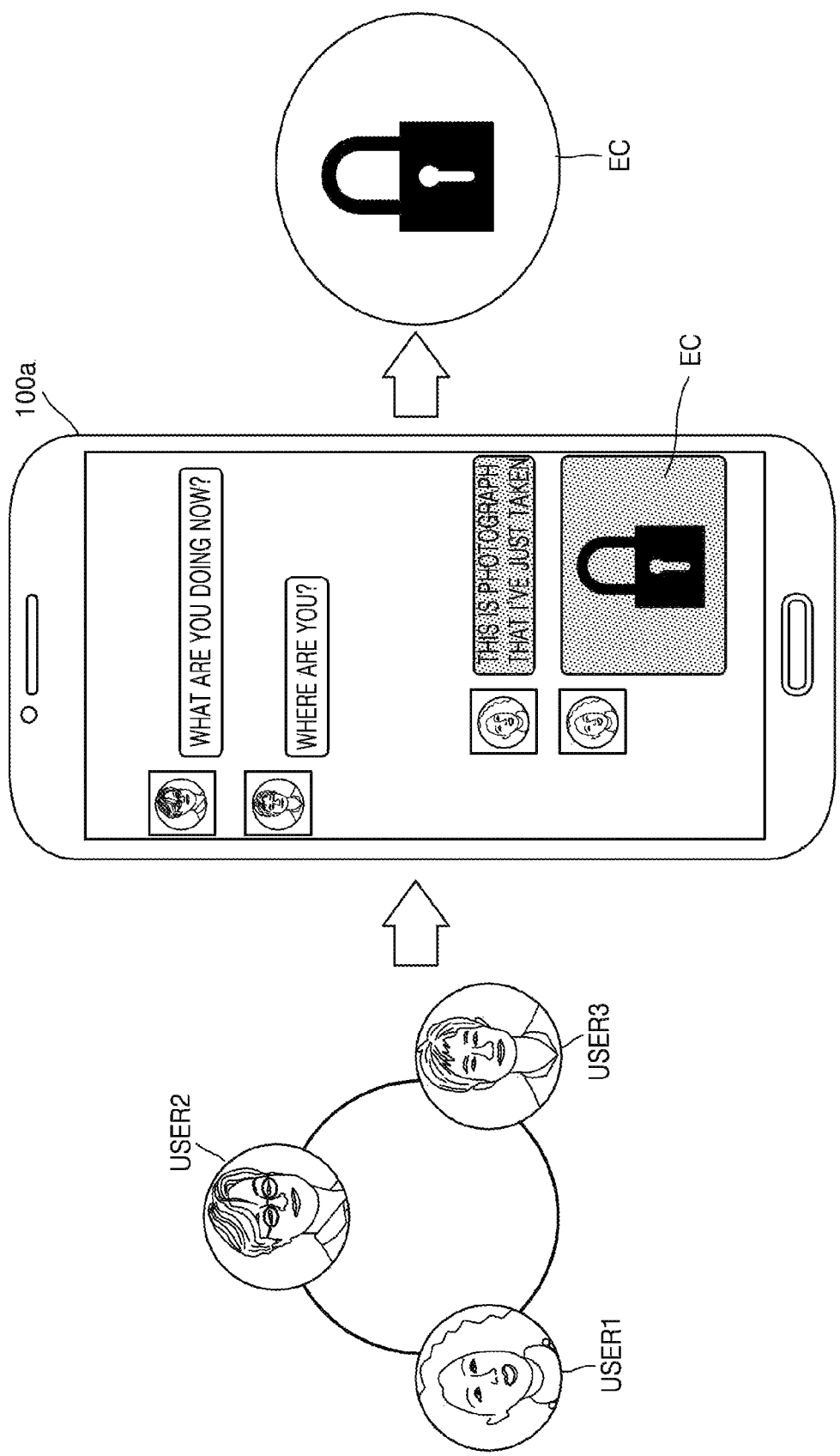
FIG. 7 illustrates an example of applying the method of encrypting content, described with reference to FIG. 5, to a first device, according to an exemplary embodiment.

FIG. 7 illustrates an example of applying the method of encrypting content, described with reference to FIG. 5, to the first device 100*a*, according to an exemplary embodiment.

Referring to FIG. 7, the first through third users USER1 through USER3 may access a virtual space at the same time. In this example, a conversation window in the virtual space such as a chatting space is open on a screen of the first device 100*a* of the first user USER1. In this example, the second user USER2 sends a message saying "what are you doing now?", the third user USER3 sends a message saying "where are you?", and the first user sends a message saying "this is a photograph that I've just taken", and then, send content, for example, a photograph. The first user USER1 may encrypt the content, and transmit the encrypted content EC to the virtual space.

Figure 8:
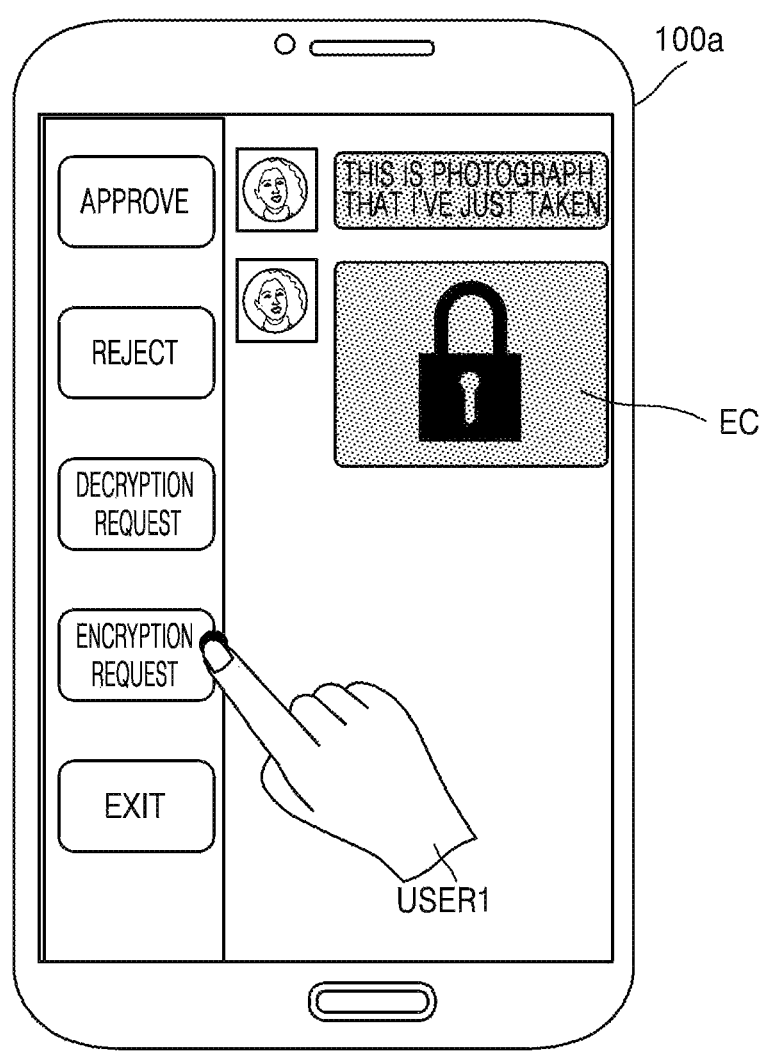
FIG. 8 illustrates an example of an encryption request operation, which is performed by the first device according to the method of encrypting content described with reference to FIG. 5, according to an exemplary embodiment.

FIG. 8 illustrates an example of an encryption request operation, which is performed by the first device 100*a* according to the method of encrypting content described with reference to FIG. 5, according to an exemplary embodiment.

Referring to FIG. 8, the first device 100*a* may detect an encryption request gesture by a user for certain content. For example, the first user USER1 may select an "encryption request" icon in a virtual space displayed on a screen of the first device 100*a*. In the current embodiment, there may be various encryption request gestures. For example, the encryption request gestures may include a tap, a double-tap, a drag, a swipe, a flick, a drag-and-drop, and the like, but are not limited thereto.

A "tap" is a gesture in which a user touches a screen using a finger or a touch tool (for example, an electronic pen), and then, lifts it off from the screen without dragging the touch on the screen. A "double tap" is a gesture in which a user touches a screen twice using a finger or a touch tool such as a stylus.

A "drag" is a gesture in which a user touches a screen using a finger or a touch tool and moves/drags the finger or the touch tool to another location in the screen while holding the touch. When the drag is performed, an object may be moved or a panning gesture, an example of which is described below, may be performed. A "flick" is a gesture in which a user performs a drag at a critical speed or at a higher speed, for example, 100 pixels/s, using a finger or a touch tool. The flick may be distinguished from the drag (or the panning) based on whether a moving speed of a finger or a touch tool is equal to or higher than the critical speed, for example, 100 pixels/s.

A "drag and drop" is a gesture in which a user drags an object to a predetermined place in a screen using a finger or a touch tool, and then, lifts the finger or touch tool off the screen. A "swipe" is a gesture for touching an object on a screen using a finger or a touch tool and moving the finger or the touch tool in a horizontal or vertical direction for a certain distance. In some cases, moving in a diagonal direction may not be recognized as a swipe event.

Figure 9:
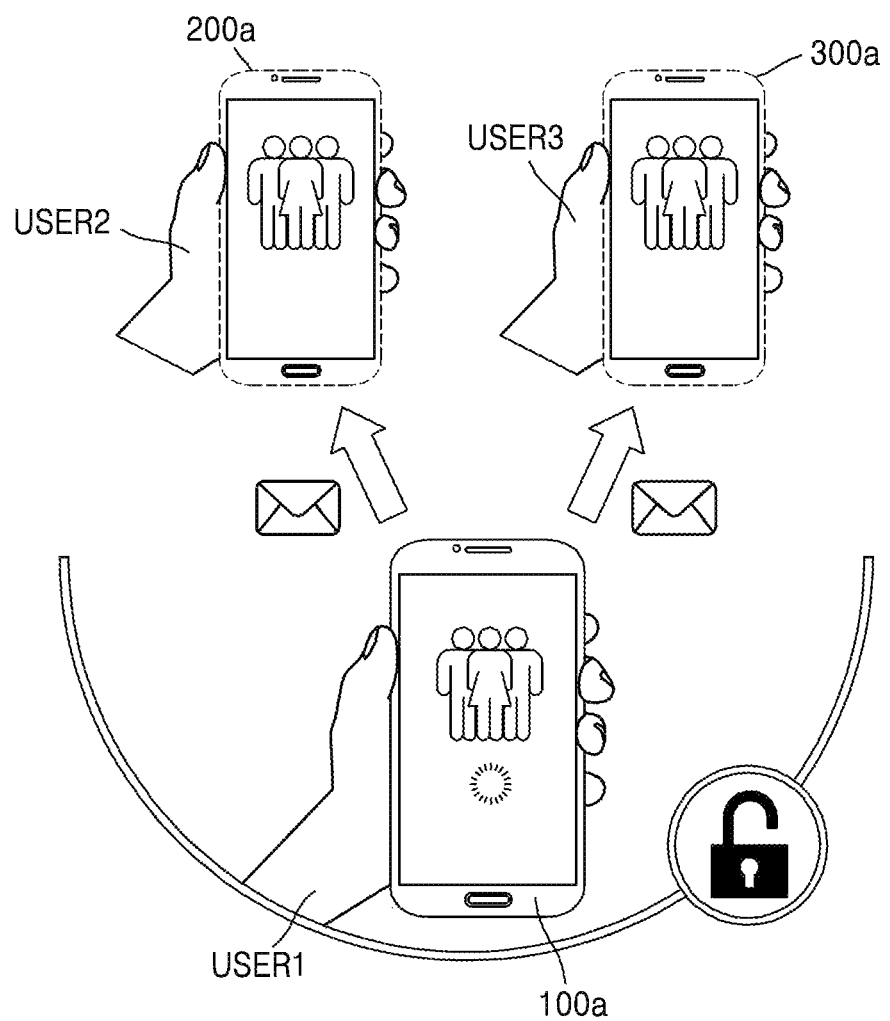
FIG. 9 illustrates an example of the distributing included in the method of encrypting content described with reference to FIG. 5, according to an exemplary embodiment.

FIG. 9 illustrates an exemplary embodiment of distributing, included in the method of encrypting content described with reference to FIG. 5, according to an exemplary embodiment.

Referring to FIG. 9, the first device 100a of the first user USER1 may transmit second and third partial keys to the second and third devices 200a and 300a, respectively. Accordingly, because an arbitrary user of an arbitrary device in the security group SG does not obtain or have access to all of the partial keys, the arbitrary user may not independently access the content. In this example, when enough devices amounting to a value equal to or greater than a threshold value, from among the plurality of devices included in the security group SG, access the virtual space, a decryption key may be recovered using a plurality of partial keys stored in each device, and then, the arbitrary user may access the encrypted content by using the decryption key.

According to another exemplary embodiment, the first device 100a of the first user USER1 may transmit encrypted second and third partial keys to the second and third devices 200a and 300a, respectively. Accordingly, because a device that is not included in the security group SG or another device included in the security group SG does not have a key for decrypting the encrypted second and third partial keys, the other device may not obtain the second and third partial keys.

According to another exemplary embodiment, the first device 100a may transmit the encrypted content to the second and third devices 200a and 300a. Accordingly, because a device or a user that does not belong to the security group SG does not have a key for decrypting the encrypted content, the other device or the user may not access the encrypted content.

FIG. 10 illustrates an exemplary embodiment of storing, included in the method of encrypting content described with reference to FIG. 5, according to an exemplary embodiment.

Referring to FIG. 10, the first through third devices 100a through 300a each may store encrypted content (EC). Additionally, because the first through third devices 100a through 300a respectively store first through third partial keys, the first through third devices 100a through 300a may not independently decrypt the encrypted content EC.

Figure 11:
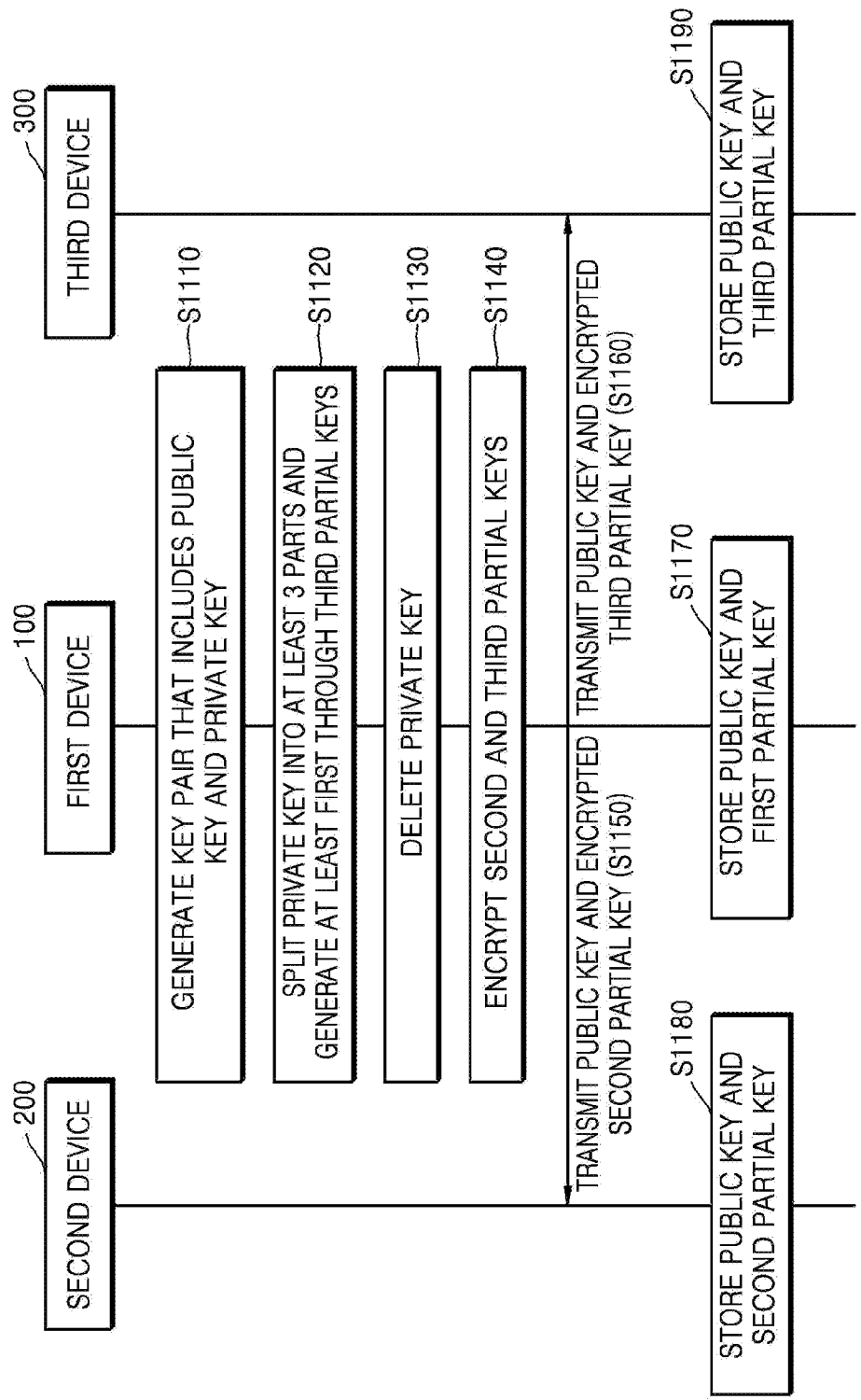
FIG. 11 illustrates a flowchart showing an example of an operation of the security group shown in FIG. 1, according to the generating of an encryption key and a plurality of partial keys and the distributing of the generated plurality of partial keys which are included in the method of encrypting content described with reference to FIG. 5, according to an exemplary embodiment.

FIG. 11 illustrates a flowchart showing an example of an operation of the security group SG, shown in FIG. 1, according to the generating of an encryption key and a plurality of partial keys and the distributing of the generated plurality of partial keys, which are included in the method of encrypting content described with reference to FIG. 5, according to an exemplary embodiment.

Referring to FIG. 11, the method of encrypting content includes a splitting encryption method performed by distributing a private key. The method includes operations that are processed in time series by the first through third devices 100 through 300 included in the security group SG shown in FIG. 1.

In operation S1110, the first device 100 generates a key pair consisting of a public key and a private key. For example, the first device 100 may generate a public key T used for encryption and a private key t that corresponds to the public key T and which is used for decryption.

In operation S1120, the first device 100 splits the private key t into at least three parts, and generates at least first through third partial keys. For example, the first device 100 may generate first through third partial keys t1 through t3 by splitting the private key t into three parts. In this example, the first device 100 may split the private key t using a Shamir scheme.

In operation S1130, the first device 100 deletes the private key t. For example, the first device 100 may delete the private key t. Accordingly, none of the first through third device 100 through 300 may obtain the private key t, and thus, the first through third devices 100 through 300 are not able to independently access the encrypted content.

In operation S1140, the first device 100 encrypts the second and third partial keys. For example, the first device 100 may generate the encrypted second and third partial keys by respectively encrypting the second and third partial keys t2 and t3, to ensure security in the transmitting of the second and third partial keys. Thus, during the transmitting of the encrypted second and third partial keys, devices that are not included in the security group SG are not able to obtain the second and third partial keys.

In operation S1150, the first device 100 transmits the public key and the encrypted second partial key to the second device 200. In operation S1160, the first device 100 transmits the public key and the encrypted third partial key to the third device 300. For example, the first device 100 may transmit the public key and the encrypted second and third partial keys to the second and third devices 200 and 300 respectively via a wireless communication such as WiFi, third generation (3G), long-term evolution (LTE), Bluetooth, and the like.

In operation S1170, the first device 100 stores the public key and the first partial key. In operation S1180, the second device 200 stores the public key and the second partial key. In operation S1190, the third device 300 stores the public key and the third partial key. For example, the second and third devices 200 and 300 may extract the second and third partial keys by respectively decrypting the encrypted second and third partial keys. Additionally, because the second and third devices 200 and 300 have the public key T, any of the first through third users USER1 through USER3 of the first through third devices 100 through 300 may decrypt the content using the public key T.

Figure 12:
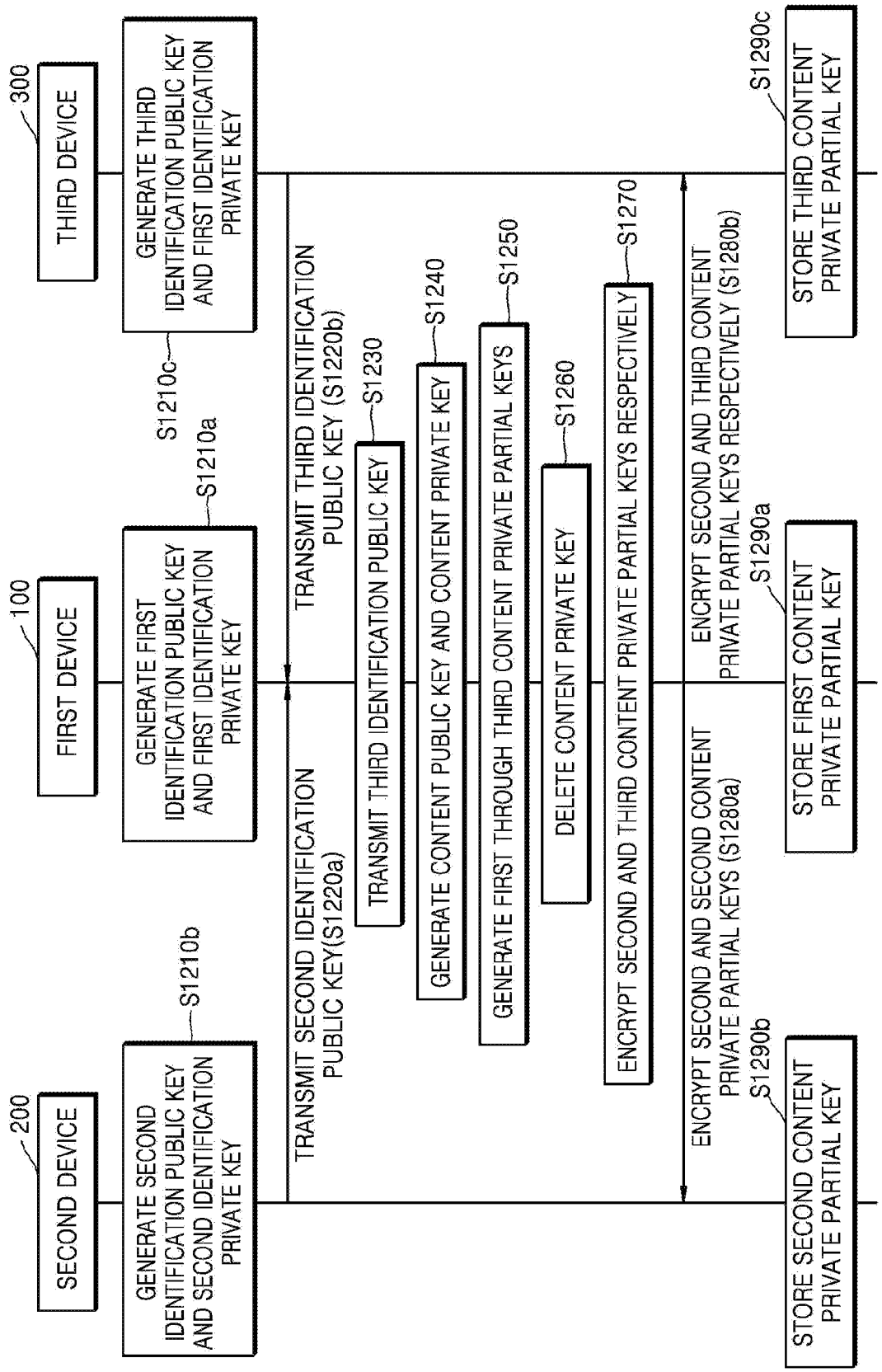
FIG. 12 illustrates a flowchart showing an example of operation of the security group shown in FIG. 1, according to the method of encrypting content described with reference to FIG. 11, according to an exemplary embodiment.

FIG. 12 illustrates a flowchart showing an example of operation of the security group SG shown in FIG. 1, according to the method of encrypting content described with reference to FIG. 11, according to an exemplary embodiment.

Referring to FIG. 12, in operation S1210a, the first device 100 generates a first identification key pair including a first identification public key K1 and a first identification private key k1. The first identification key pair is a combination of keys for identifying a first application installed in the first device 100. Second and third applications each installed in the second and third devices 200 and 300 may check or identify the first application installed in the first device 100 using the first identification public key K1.

According to an exemplary embodiment, the first device 100 may request a phone public key infrastructure (PKI) to generate the first identification public key K1 and the first identification private key k1. According to another exemplary embodiment, the first device 100 may request the phone PKI to generate the first identification public key K1, the first identification private key k1, and a first certificate $Certificate_{p1}(K1)$ with respect to the first identification public key K1. In this example, p1 denotes a key for certification of the first device 100, and the first certificate Certificate$_{p1}$ (K1) is a document for concatenating an identity of the first user USER1 to the public key, that is, the first identification public key K1.

In operation S1210*b*, the second device 200 generates a second identification key pair including a second identification public key K2 and a second identification private key k2. The second identification key pair is a combination of keys for identifying a second application installed in the second device 200. The first and third applications each installed in the first and third devices 100 and 300 may check or identify the second application installed in the second device 200 using the second identification public key K2.

According to an exemplary embodiment, the second device 200 may request the phone PKI to generate the second identification public key K2 and the second identification private key k2. According to another exemplary embodiment, the second device 200 may request the phone PKI to generate the second identification public key K2, the second identification private key k2, and a second certificate Certificate$_{p2}$(K2) with respect to the second identification public key K2. In this example, p2 denotes a key for certification of the second device 200, and the second certificate Certificate$_{p2}$(K2) is a document for concatenating an identity of the second user USER2 to the public key, that is, the second identification public key K2.

In operation S1210*c*, the third device 300 generates a third identification key pair including a third identification public key K3 and a third identification private key k3. The third identification key pair is a combination of keys for identifying a third application installed in the third device 100. The first and second applications installed in the first and second devices 100 and 200 respectively may check or identify the third application installed in the third device 300 using the third identification public key K3.

According to an exemplary embodiment, the third device 300 may request the phone PKI to generate the third identification public key K3 and the third identification private key k3. According to another exemplary embodiment, the third device 300 may request the phone PKI to generate the third identification public key K3, the third identification private key k3, and a third certificate Certificate$_{p3}$(K3) with respect to the third identification public key K3. In this example, p3 denotes a key for certification of the third device 300, and the third certificate Certificate$_{p3}$(K3) is a document for concatenating an identity of the third user USER3 to the public key, that is, the third identification public key K3. Operations S1210*a* through S1210*c* described above may be referred to as operations for generating identification keys.

In operation S1220*a*, the second device 200 transmits the second identification public key K2 to the first device 100. Here, the transmitted second identification public key K2 may be used for the first device 100 to encrypt a second content private partial key t2. According to another exemplary embodiment, the second device 200 may transmit the second identification public key K2 and the second certificate Certificate$_{p2}$(K2) to the first device 100.

In operation S1220*b*, the third device 300 transmits the third identification public key K3 to the first device 100. Here, the transmitted third identification public key K3 may be used to encrypt a third content private partial key t3. According to another exemplary embodiment, the third device 300 may transmit the third identification public key K3 and the third certificate Certificate$_{p3}$(K3) to the first device 100.

In operation S1230, the first device 100 generates a group {K1, K2, K3} of identification public keys which includes the first through third identification public keys K1 through K3. The generated group {K1, K2, K3} of the identification public keys may be stored in the first through third devices.

In operation S1240, the first device 100 generates a content key pair including the content public key T and the content private key t. The content key pair is a combination of keys for encrypting/decrypting content shared by the security group SG. For example, the content public key T may be used to encrypt a symmetric key s for encrypting content.

According to another exemplary embodiment, the first device 100 may further generate an identification public key concatenation value G from the first through third identification public keys K1 through K3 (that is, G=K1|K2|K3).

In operation S1250, the first device 100 splits the content private key t into at least three parts, and thus, generates the first through third content private partial keys t1 through t3 (that is, t=t1+t2+t3+ . . . ). The first device 100 may split the content private key t using the Shamir scheme.

According to another exemplary embodiment, the first device 100 may generate an identification public key concatenation value G and first through third electronic signatures with respect to the first through third content private partial keys t1 through t3. As another example, the first device 100 may generate a group identification (ID) GroupID, an identification public key concatenation value G, and electronic signatures with respect to the first through third content private partial keys t1 through t3. In this example, the first electronic signature is E-Sign$_t$(GroupID|G|t1), the second electronic signature is E-Sign$_t$(GroupID|G|t2), and the third electronic signature is E-Sign$_t$(GroupID|G|t3).

In operation S1260, the first device 100 deletes the content private key t. Accordingly, the content private key t may not be completely known to any one user, and unless a decryption approval is obtained from multiple devices amounting to a value equal to or greater than a threshold value, from among the first through third devices 100 through 300 which were present in the virtual space when the shared content was encrypted, any one user may not independently decrypt the encrypted content. According to another exemplary embodiment, the first device 100 may store the content private key t in a security zone such as TrustZone.

In operation S1270, the first device 100 encrypts the second and third content private partial keys t2 and t3 respectively using the second and third identification public keys K2 and K3. Thus, a second content private partial key encryption value Enc$_{K2}$(t2) and a third content private partial key encryption value Enc$_{K3}$(t3) are generated. Because the second content private partial key encryption value Enc$_{K2}$(t2) may be decrypted using the second identification private key k2 corresponding to the second identification public key K2, the second content private partial key encryption value Enc$_{K2}$(t2) may be decrypted by only the second device 200 that has the second identification key k2. Additionally, because the third content private partial key encryption value Enc$_{K3}$(t3) may be decrypted using the third identification private key k3 corresponding to the third identification public key K3, the third content private partial key encryption value Enc$_{K3}$(t3) may be decrypted by only the third device 300 that has the third identification private key k3.

In operation S1280*a*, the first device 100 transmits the group {K1, K2, K3} of the identification public keys, the content public key T, and the second content private partial key encryption value $\text{Enc}_{K2}(t2)$ to the second device 200. In some examples, the first device 100 may further transmit the second electronic signature E-Sign$_t$(GroupID|G|t2) to the second device 200.

In operation S780b, the first device 100 transmits the group {K1, K2, K3} of the identification public keys, the content public key T, and the third content private partial key encryption value $\text{Enc}_{K3}(t3)$ to the third device 300. In some examples, the first device 100 may further transmit the third electronic signature E-Sign$_t$(GroupID|G|t3) to the third device 300. Operations S1010a through S1080b may be referred to as generating or initializing the security group SG.

In operation S1290a, the first device 100 stores the group {K1, K2, K3} of the identification public keys, the content public key T, and the first content private partial key t1. In operation S1290b, the second device 200 extracts and stores the second content private partial key t2 by decrypting the second content private partial key encryption value $\text{Enc}_{K2}(t2)$ using the second identification private key k2. Likewise, in operation S1290c, the third device 300 extracts and stores the third content private partial key t3 by decrypting the third content private partial key encryption value $\text{Enc}_{K3}(t3)$ using the third identification private key k3. In this example, the first through third devices 100 through 300 may respectively store the first through third content private keys t1 through t3 in a security zone such as a Trust Zone.

Figure 13:
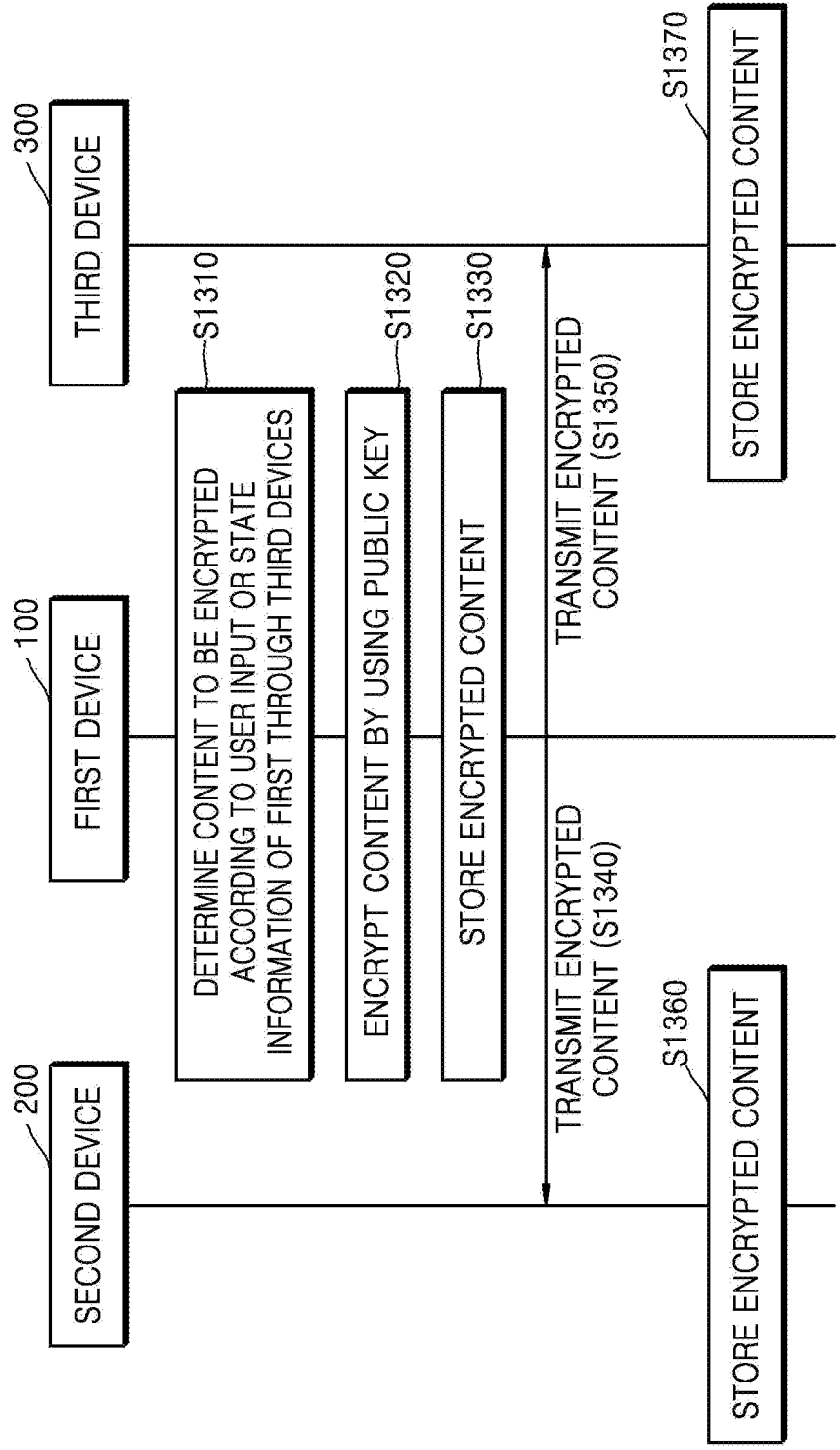
FIG. 13 illustrates a flowchart showing an example of an operation of the security group shown in FIG. 1, according to the encrypting and storing of the encrypted content which are included in the method of encrypting content shown in FIG. 5, according to an exemplary embodiment.

FIG. 13 illustrates a flowchart of an example of an operation of the security group SG shown in FIG. 1, according to the encrypting and the storing of the encrypted content which are included in the method of encrypting content shown in FIG. 5, according to an exemplary embodiment.

Referring to FIG. 13, the method of encrypting content may be performed after the method of encrypting content described with reference to FIG. 11 is performed. Additionally, the method of encrypting content may include operations that are performed in time series by the first through third devices 100 through 300 included in the security group SG shown in FIG. 1. Hereinafter, an example of an operation of encrypting content performed by the first device 100, is described. However, according to another exemplary embodiment, one of the second and third devices 200 and 300 may encrypt content, for example, by using a public key.

In operation S1310, the first device 100 determines content that is to be encrypted, according to a user input or state information of the first through third devices 100 through 300. For example, the first user USER1 may determine content stored in the first device 100 or a server as content to be encrypted, via a manual user input. Alternatively, content that is stored in the first device 100 or a server may be automatically determined as content that is to be encrypted, according to state information of the first through third devices 100 through 300.

For example, the first user USER1 may select one piece of content generated while the first through third users USER1 through USER3 are accessing the virtual space, and determine the selected content as content that is to be encrypted. As another example, a photograph that includes the first through third users USER1 through USER3, from among the photographs generated or added to the virtual space while the first through third users USER1 through USER3 access the virtual space, may be automatically selected and determined as content to be encrypted. As another example, a photograph taken at a location of the first through third devices 100 through 300, from among the photographs generated while the first through third users USER1 through USER3 access the virtual space, may be automatically selected and determined as content to be encrypted. As another example, a photograph related to a gathering at a SNS to which the first through third users USER1 through USER3 subscribed, from among the photographs generated while the first through third users USER1 through USER3 access the virtual space, may be automatically determined as content that is to be encrypted.

In operation S1320, the first device 100 encrypts the content using a public key. For example, the first device 100 may encrypt content m using a symmetric key s, (that is, $\text{Enc}_s(m)$) and encrypt the symmetric key s using a public key T (that is, $\text{Enc}_T(s)$).

In operation S1330, the first device 100 stores the encrypted content such as in a security zone such as Trust Zone.

In operation S1340, the first device 100 transmits the encrypted content to the second device 200. In operation S1350, the first device 100 transmits the encrypted content to the third device 300. For example, the first device 100 may transmit the respective encrypted content to the second and third devices 200 and 300 via a wireless communication such as WiFi, 3G, LTE, Bluetooth, and the like.

In operation S1360, the second device 200 stores the encrypted content. In operation S1370, the third device 300 stores the encrypted content. For example, the second and third devices 200 and 300 may store the encrypted content in a security zone such as TrustZone.

Figure 14:
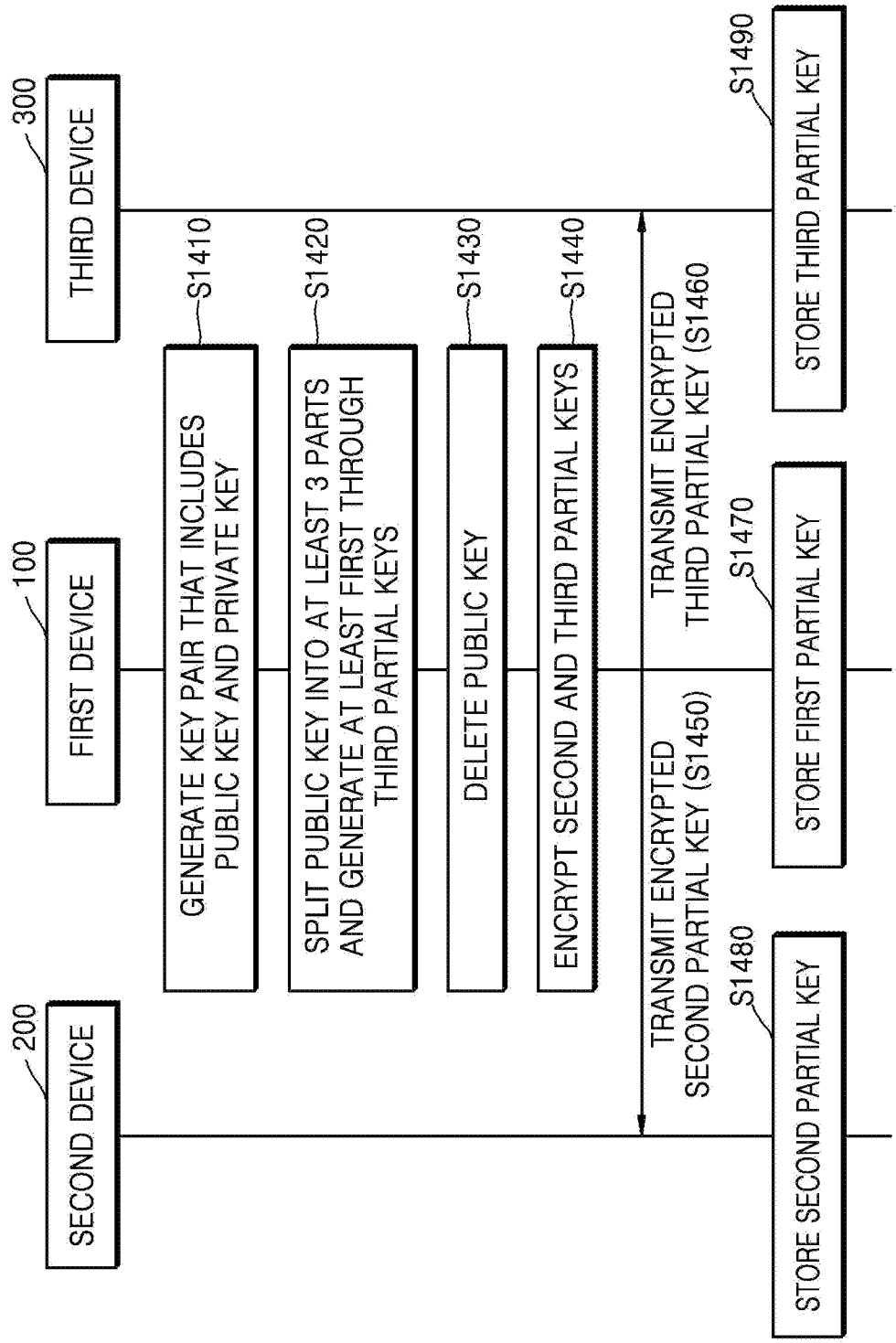
FIG. 14 illustrates a flowchart showing another example of an operation of the security group shown in FIG. 1, according to the generating of an encryption key and a plurality of partial keys and the distributing of the generated plurality of partial keys which are included in the method of encrypting content described with reference to FIG. 5, according to an exemplary embodiment.

FIG. 14 illustrates a flowchart showing another example of an operation of the security group SG shown in FIG. 1, according to the generating of an encryption key and a plurality of partial keys and the distributing of the generated plurality of partial keys which are included in the method of encrypting content described with reference to FIG. 5, according to an exemplary embodiment.

Referring to FIG. 14, the method of encrypting content includes a splitting encryption method performed by distributing a private key. The method includes operations that may be processed in a time series by the first through third devices 100 through 300 included in the security group SG shown in FIG. 1.

In operation S1410, the first device 100 generates a key pair consisting of a public key and a private key. For example, the first device 100 may generate a public key T used for encryption and a private key t that corresponds to the public key T and that is used for decryption.

In operation S1420, the first device 100 splits the public key T into at least three parts, and thus, generates at least first through third partial keys. For example, the first device 100 may generate first through third partial keys T1 through T3 by splitting the public key T into three parts. In this example, the first device 100 may split the public key T using the Shamir scheme.

In operation S1430, the first device 100 deletes the public key T. For example, the first device 100 may delete the public key T. Accordingly, none of the first through third device 100 through 300 may individually or independently obtain the public key T, and thus, the first through third device 100 through 300 may not independently encrypt the content.

In operation S1440, the first device 100 encrypts the second and third partial keys T2 and T3. For example, the first device 100 may generate the encrypted second and third partial keys by encrypting the second and third partial keys T2 and T3 each, so as to ensure security in the transmitting. Thus, in the transmitting of the encrypted second and third partial keys, devices that are not included in the security group SG may not be able to obtain the second and third partial keys because they lack the ability to decrypt the encrypted partial keys.

In operation S1450, the first device 100 transmits the encrypted second partial key to the second device 200. In operation S1460, the first device 100 transmits the encrypted third partial key to the third device 300. For example, the first device 100 may transmit the encrypted second and third partial keys to the second and third devices 200 and 300 via a wireless communication such as WiFi, 3G, LTE, Bluetooth, and the like.

In operation S1470, the first device 100 stores the first partial key. In operation S1480, the second device 200 stores the second partial key. In operation S1490, the third device 300 stores the third partial key. For example, the second and third devices 200 and 300 may extract the second and third partial keys, by decrypting the encrypted second and third partial keys, respectively.

Figure 15:
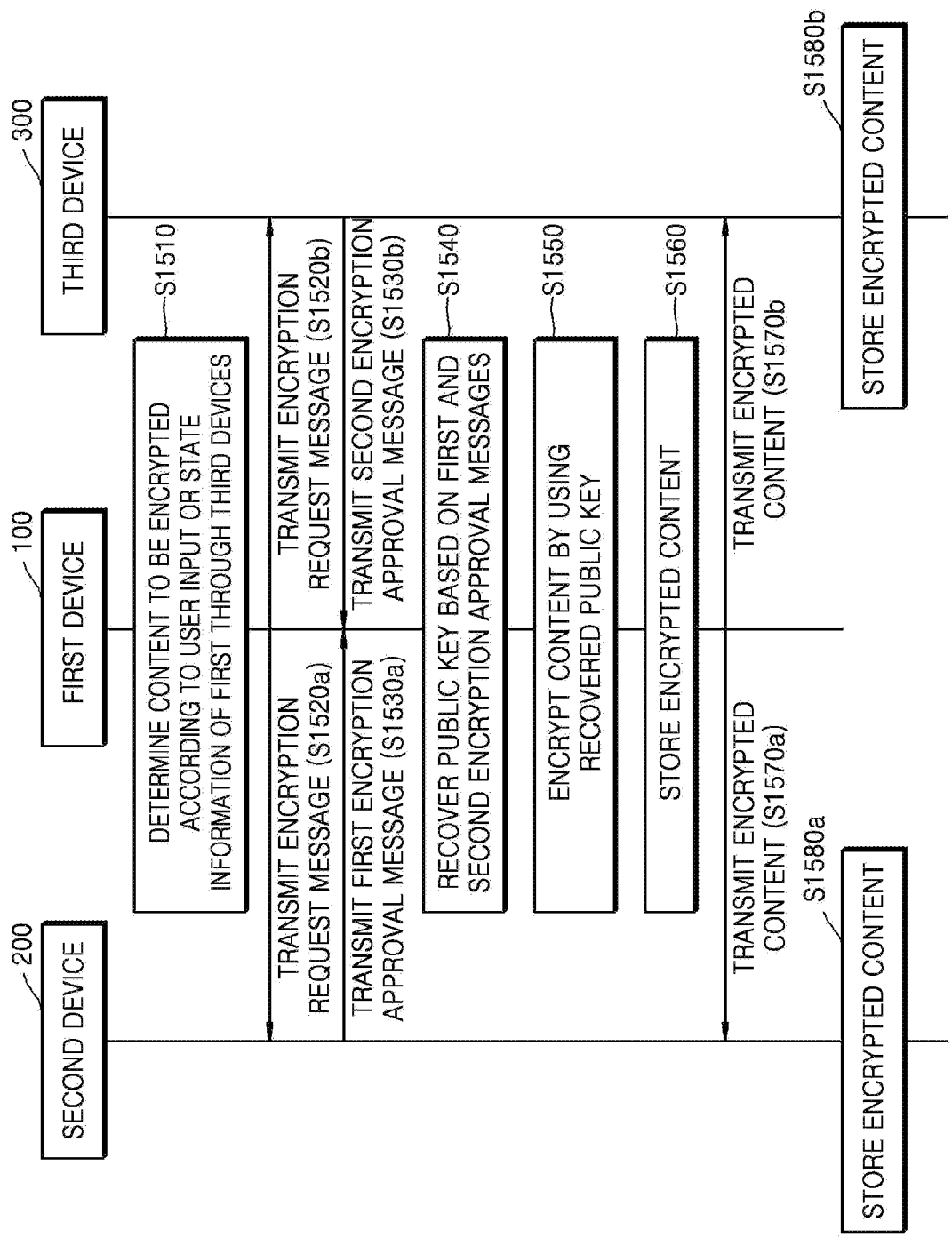
FIG. 15 illustrates a flowchart showing another example of an operation of the security group shown in FIG. 1, according to the encrypting and the storing of the encrypted content which are included in the method of encrypting content shown in FIG. 5, according to an exemplary embodiment.

FIG. 15 illustrates a flowchart showing another example of an operation of the security group SG shown in FIG. 1, according to the encrypting and the storing of the encrypted content which are included in the method of encrypting content shown in FIG. 5, according to an exemplary embodiment.

Referring to FIG. 15, the method of encrypting content may be performed after the method of encrypting content described with reference to FIG. 12 is performed. Additionally, the method of encrypting content may include operations that are performed in a time series by the first through third devices 100 through 300 included in the security group SG shown in FIG. 1.

In operation S1510, the first device 100 determines content that is to be encrypted, according to a user input or state information of the first through third devices 100 through 300. For example, the first user USER1 may determine content generated while the first through third users USER1 through USER3 access the virtual space as the content that is to be encrypted, via a manual user input. Alternatively, content generated while the first through third users USER1 through USER3 access the virtual space may be automatically determined as the content that is to be encrypted, according to state information of the first through third devices 100 through 300.

In operation S1520a, the first device 100 transmits an encryption request message to the second device 200. In operation S1520b, the first device 100 transmits an encryption request message to the third device 300.

In operation S1530a, the second device 200 transmits a first encryption approval message to the first device 100. For example, the first encryption approval message may include an encryption value of the second partial key T2 that is stored in the second device 200. In operation S1530b, the third device 300 transmits a second encryption approval message to the first device 100. For example, the second encryption approval message may include an encryption value of the third partial key T3 that is stored in the third device 300.

In operation S1540, the first device 100 recovers a public key that is based on the first and second encryption approval messages. For example, the first device 100 may recover the public key T, based on the encryption values of the second and third partial keys T2 and T3 that are included in the first and second encryption approval messages, respectively, and the first partial key T1 stored in the first device 100, (that is, T=T1+T2+T3).

In operation S1550, the first device 100 encrypts content using the public key. For example, the first device 100 may encrypt the content m using the symmetric key s (that is, $AES_s(m)$), and encrypt the symmetric key s using the recovered public key T (that is, $Enc_T(s)$).

In operation S1560, the first device 100 stores the encrypted content. For example, the first device 100 may store the encrypted content in a security zone, for example, Trust Zone.

In operation S1570a, the first device 100 transmits the encrypted content to the second device 200. In operation S1570b, the first device 100 transmits the encrypted content to the third device 300. For example, the first device 100 may transmit the respective encrypted content to the second and third devices 200 and 300 via a wireless communication such as WiFi, 3G, LTE, Bluetooth, and the like.

In operation S1580a, the second device 200 stores the encrypted content. In operation S1580b, the third device 300 stores the encrypted content. As previously mentioned, the second and third devices 200 and 300 may store the encrypted content in a security zone such as Trust Zone.

Figure 16:
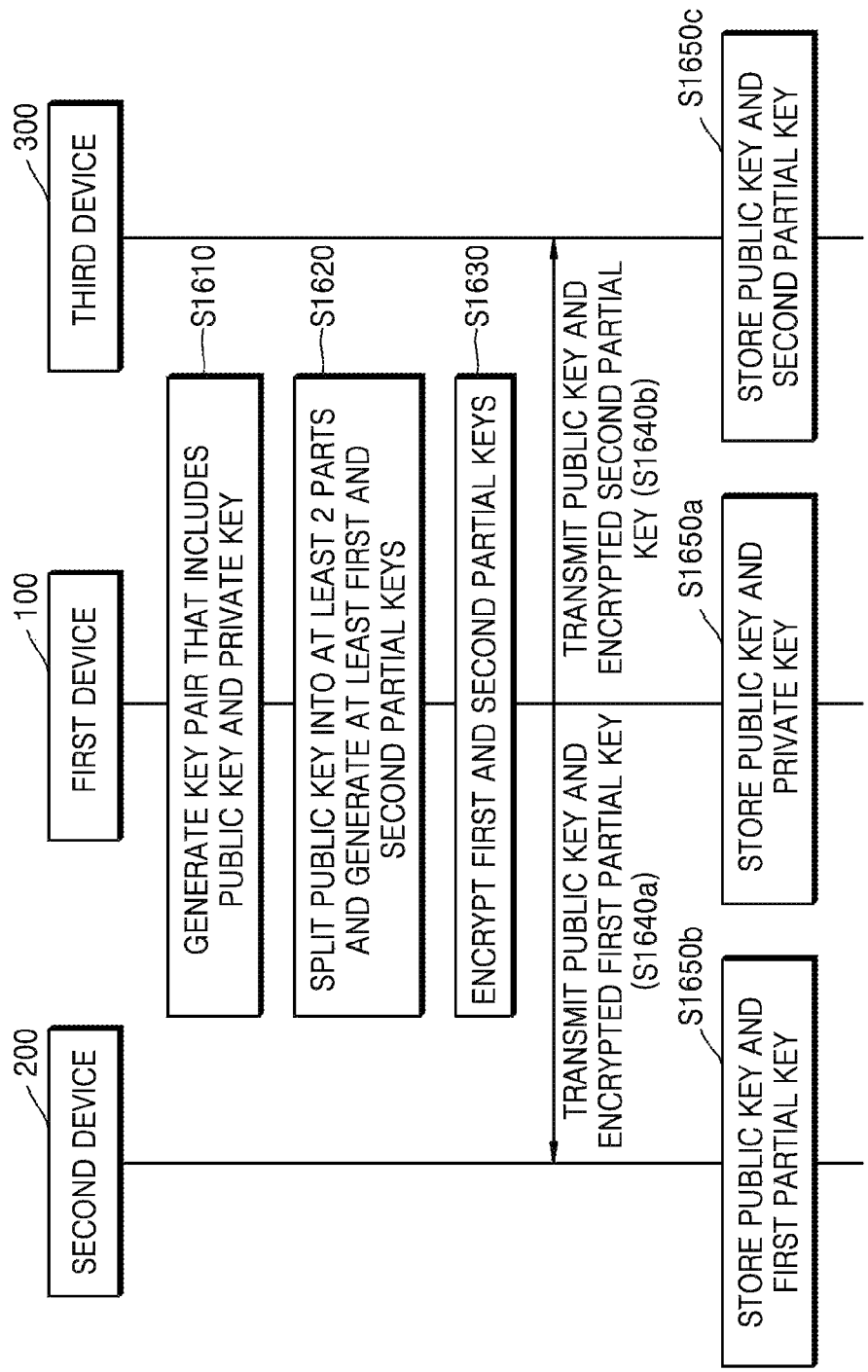
FIG. 16 illustrates a flowchart showing another example of an operation of the security group shown in FIG. 1, according to the generating of an encryption key and a plurality of partial keys and the distributing of the generated plurality of partial keys which are included in the method of encrypting content described with reference to FIG. 5, according to an exemplary embodiment.

FIG. 16 illustrates a flowchart showing another example of an operation of the security group SG shown in FIG. 1, according to the generating of an encryption key and a plurality of partial keys and the distributing of the generated plurality of partial keys which are included in the method of encrypting content described with reference to FIG. 5, according to an exemplary embodiment.

Referring to FIG. 16, the method of encrypting content includes a modified splitting encryption method that is performed by distributing a private key. The method includes operations that may be processed in a time series by the first through third devices 100 through 300 included in the security group SG shown in FIG. 1.

In operation S1610, the first device 100 generates a key pair consisting of a public key and a private key. For example, the first device 100 may generate a public key T used for encryption and a private key t that corresponds to the public key T and which is used for decryption.

In operation S1620, the first device 100 splits the private key into at least two parts, and thus, generates at least first and second partial keys. For example, the first device 100 may generate first and second partial keys t1 and t2 by splitting the private key t into two parts. For example, the first device 100 may split the private key t using the Shamir scheme.

In operation S1630, the first device 100 encrypts the first and second partial keys. For example, the first device 100 may generate the encrypted first and second partial keys by respectively encrypting the first and second partial keys t1 and t2, to ensure security in the transmitting. Thus, in the transmitting of the encrypted first and second partial keys, devices that are not included in the security group SG may not be able to obtain the first and second partial keys.

In operation S1640a, the first device 100 transmits the public key and the encrypted first partial key to the second device 200. In operation S1640b, the first device 100 transmits the public key and the encrypted second partial key to the third device 300. For example, the first device 100 may transmit the public key and the encrypted second and third partial keys to the second and third devices 200 and 300 via a wireless communication such as WiFi, 3G, LTE, Bluetooth, and the like.

In operation S1650a, the first device 100 stores the public key and the private key. For example, the first device 100 may independently encrypt the content using the public key T, and independently decrypt the content using the private key t. For example, the first user USER1 of the first device 100 may be a person that has a very high level of authority with respect to the content, and the content may be very private data. For example, the first user USER1 may be a patient that is receiving a medical service via the virtual space.

In operation S1650b, the second device 200 stores the public key and the first partial key. In operation S1650c, the third device 300 stores the public key and the second partial key. For example, the second and third devices 200 and 300 may extract the first and second partial keys by decrypting the encrypted first and second partial keys.

Because the second and third devices 200 and 300 have the public key T, any of the second and third users USER2 and USER3 of the second and third devices 200 and 300 may encrypt the content using the public key T. However, because the second and third devices 200 and 300 respectively have the first and second partial keys t1 and t2, the second and third devices 200 and 300 are not able to independently decrypt content, and may decrypt content only when the second and third devices 200 and 300 access the virtual space at the same time and transmit a decryption approval to each other or to the server. For example, second and third users USER2 and USER3 of the second and third devices 200 and 300 may be persons who have an authority for generation of the content, but have a low authority for use of the content. For example, the second and third users USER2 and USER3 may be doctors or hospital officials providing a medical service via the virtual space.

Figure 17:
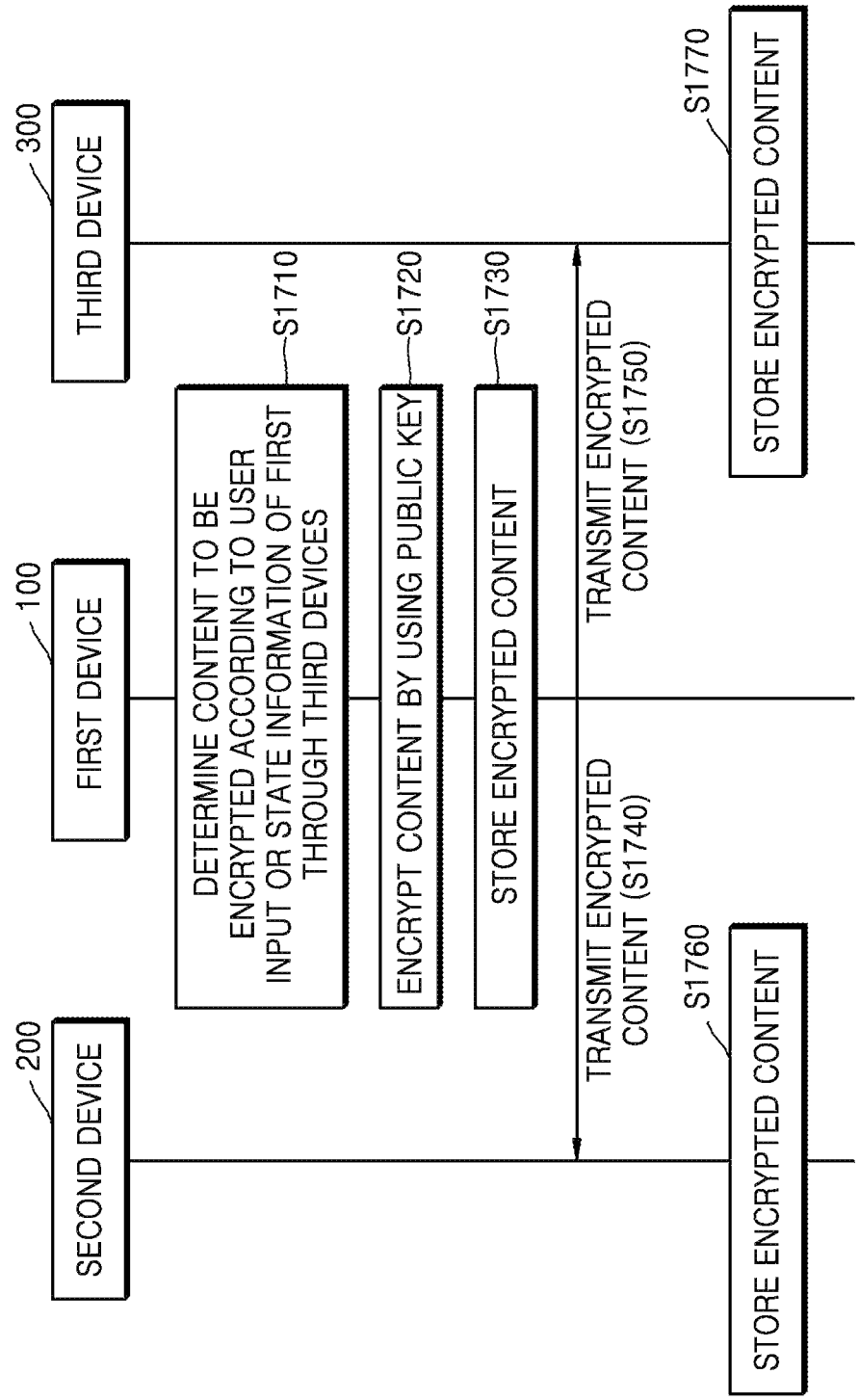
FIG. 17 illustrates a flowchart showing another example of an operation of the security group shown in FIG. 1, according to the encrypting and the storing of the encrypted content which are included in the method of encrypting content shown in FIG. 5, according to an exemplary embodiment.

FIG. 17 illustrates a flowchart showing another example of an operation of the security group SG shown in FIG. 1, according to the encrypting and the storing of the encrypted content which are included in the method of encrypting content shown in FIG. 5, according to an exemplary embodiment.

Referring to FIG. 17, the method of encrypting content may be performed after the method of encrypting content described with reference to FIG. 16 is performed. Additionally, the method of encrypting content may include operations that are performed in a time series by the first through third devices 100 through 300 included in the security group SG shown in FIG. 1. Hereinafter, an example of an operation of encrypting content performed by the first device 100 is described. However, according to another exemplary embodiment, one of the second and third devices 200 and 300 may encrypt content by using a public key.

In operation S1710, the first device 100 determines content that is to be encrypted, according to a user input or state information of the first through third devices 100 through 300. For example, the first user USER1 may manually determine content stored in the first device 100 or a server as content to be encrypted, via a user input. Alternatively, content stored in the first device 100 or a server may be automatically determined as content that is to be encrypted, according to state information of the first through third devices 100 through 300.

In operation S1720, the first device 100 encrypts the content using a public key. For example, the first device 100 may encrypt content m using a symmetric key s (that is, $Enc_s(m)$), and encrypt the symmetric key s using a public key T (that is, $Enc_T(s)$).

In operation S1730, the first device 100 stores the encrypted content. For example, the first device 100 may store the encrypted content in a security zone such as Trust Zone.

In operation S1740, the first device 100 transmits the encrypted content to the second device 200. In operation S1750, the first device 100 transmits the encrypted content to the third device 300. For example, the first device 100 may transmit the respective encrypted content to the second and third devices 200 and 300 via a wireless communication such as WiFi, 3G, LTE, Bluetooth, and the like.

In operation S1760, the second device 200 stores the encrypted content. In operation S1770, the third device 300 stores the encrypted content. For example, the second and third devices 200 and 300 may store the encrypted content in a security zone such as TrustZone.

Figure 18:
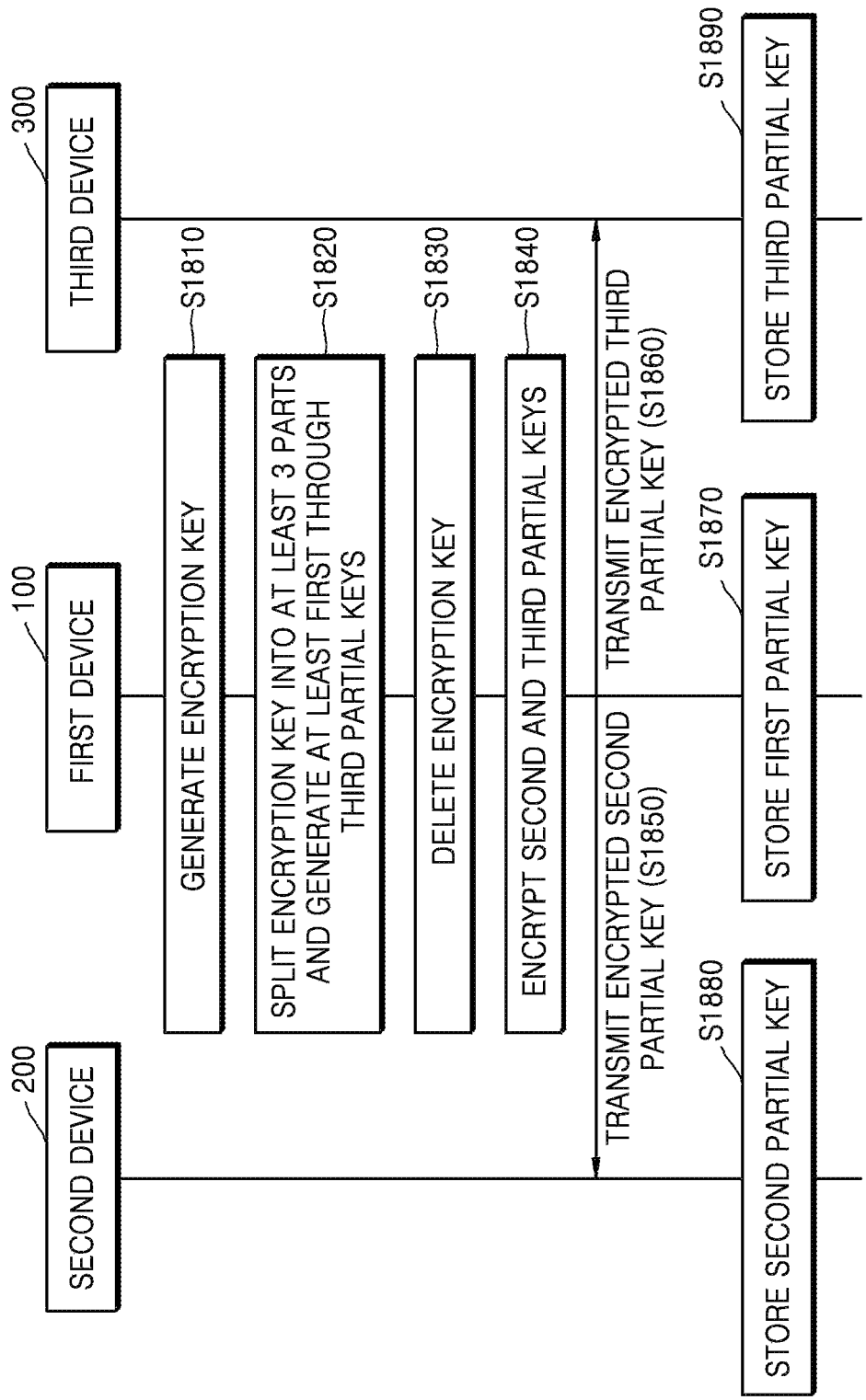
FIG. 18 illustrates a flowchart showing another example of an operation of the security group shown in FIG. 1, according to the generating of an encryption key and a plurality of partial keys and the distributing of the generated plurality of partial keys which are included in the method of encrypting content described with reference to FIG. 5, according to an exemplary embodiment.

FIG. 18 illustrates a flowchart showing another example of an operation of the security group SG shown in FIG. 1, according to the generating of an encryption key and a plurality of partial keys and the distributing of the generated plurality of partial keys which are included in the method of encrypting content described with reference to FIG. 5, according to an exemplary embodiment.

Referring to FIG. 18, the method of encrypting content includes a splitting encryption method performed by distributing a symmetric key, and includes operations that may be processed in a time series by the first through third devices 100 through 300 included in the security group SG shown in FIG. 1.

In operation S1810, the first device 100 generates an encryption key, for example, a symmetric key. For example, the first device 100 may generate an encryption key sk used for encryption. The generated encryption key sk may also be used for decryption.

In operation S1820, the first device 100 splits the encryption key into at least three parts, and thus, generates at least first through third partial keys. For example, the first device 100 may generate first through third partial keys sk1 through sk3 by splitting the encryption key sk into three parts. In this case, the first device 100 may split the encryption key sk using the Shamir scheme.

In operation S1830, the first device 100 deletes the encryption key.

In operation S1840, the first device 100 encrypts the second and third partial keys. For example, the first device 100 may generate encrypted second and third partial keys sk2 and sk3 by respectively encrypting the second and third partial keys, so as to ensure security in the transmitting. Thus, in the transmitting of the encrypted second and third partial keys, devices that are not included in the security group SG are not able to obtain or decrypt the second and third partial keys.

In operation S1850, the first device 100 transmits the encrypted second partial key to the second device 200. In operation S1860, the first device 100 transmits the encrypted third partial key to the third device 300. For example, the first device 100 may transmit the public key and the encrypted second and third partial keys to the second and third devices 200 and 300 via a wireless communication such as WiFi, 3G, LTE, Bluetooth, and the like.

In operation S1870, the first device 100 stores the first partial key sk1. In operation S1880, the second device 200 stores the second partial key sk2. In operation S1890, the third device 300 stores the third partial key sk3.

Because the first through third devices 100 through 300 respectively have the first through third partial keys sk1 through sk3, the first through third users USER1 through USER3 of the first through third devices 100 through 300 may not independently encrypt the content, and instead may encrypt content only when each of the first through third devices 100 through 300 access a virtual space at the same time. Additionally, because the first through third devices 100 through 300 use a symmetric encryption/decryption method, the first through third users USER1 through USER3 of the first through third devices 100 through 300 may not independently decrypt the content, and may decrypt content only when the first through third devices 100 through 300 each access the virtual space at the same time.

Figure 19:
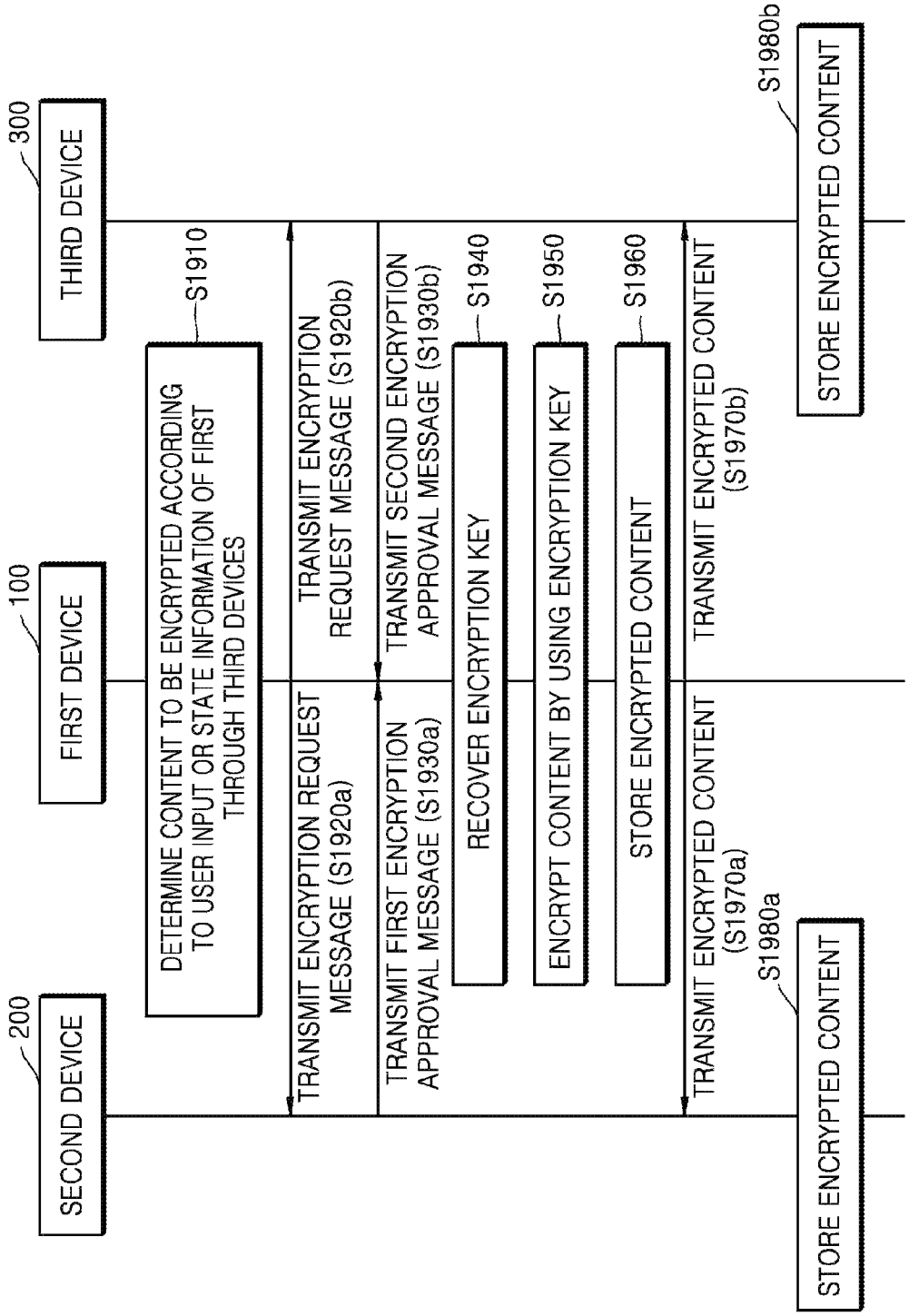
FIG. 19 illustrates a flowchart showing another example of an operation of the security group shown in FIG. 1, according to the encrypting and the storing of the encrypted content which are included in the method of encrypting content shown in FIG. 5, according to an exemplary embodiment.

FIG. 19 illustrates a flowchart showing another example of an operation of the security group SG shown in FIG. 1, according to the encrypting and the storing of the encrypted content which are included in the method of encrypting content shown in FIG. 5, according to an exemplary embodiment.

Referring to FIG. 19, the method of encrypting content may be performed after the method of encrypting content described with reference to FIG. 18 is performed. Additionally, the method of encrypting content may include operations that are performed in a time series by the first through third devices 100 through 300 included in the security group SG shown in FIG. 1.

In operation S1910, the first device 100 determines content that is to be encrypted, according to a user input or state information of the first through third devices 100 through 300. For example, the first user USER1 may manually determine content stored in the first device 100 or a server as content that is to be encrypted, via a user input. Alternatively, content stored in the first device 100 or a server may be automatically determined as content that is to be encrypted, according to state information of the first through third devices 100 through 300.

In operation S1920a, the first device 100 transmits an encryption request message to the second device 200. In operation S1920b, the first device 100 transmits an encryption request message to the third device 100.

In operation S1930a, the second device 200 transmits a first encryption approval message to the first device 100. For example, the first encryption approval message may include an encryption value of the second partial key sk2 that is stored in the second device 200. In operation S1930b, the third device 300 transmits a second encryption approval message to the first device 100. For example, the second encryption approval message may include an encryption value of the third partial key sk3 that is stored in the third device 300.

In operation S1940, the first device 100 recovers a public key based on the first and second encryption approval messages. For example, the first device 100 may recover the encryption key sk based on the encryption values of the second and third partial keys sk2 and sk3 included in the first and second encryption approval messages, respectively, and the first partial key sk1 stored in the first device 100 (that is, sk=sk1+sk2+sk3).

In operation S1950, the first device 100 encrypts content using the encryption key. For example, the first device 100 may encrypt the content m using the symmetric key s (that is, $Enc_s(m)$), and encrypt the symmetric key s using the recovered encryption key sk (that is, $Enc_T(s)$).

In operation S1960, the first device 100 stores the encrypted content. For example, the first device 100 may store the encrypted content in a security zone such as Trust Zone.

In operation S1970a, the first device 100 transmits the encrypted content to the second device 200. In operation S1970b, the first device 100 transmits the encrypted content to the third device 300. For example, the first device 100 may transmit the respective encrypted content to the second and third devices 200 and 300 via a wireless communication such as WiFi, 3G, LTE, Bluetooth, and the like.

In operation S1980a, the second device 200 stores the encrypted content. In operation S1980b, the third device 300 stores the encrypted content. For example, the second and third devices 200 and 300 may store the encrypted content in a security zone such as TrustZone.

Figure 20:
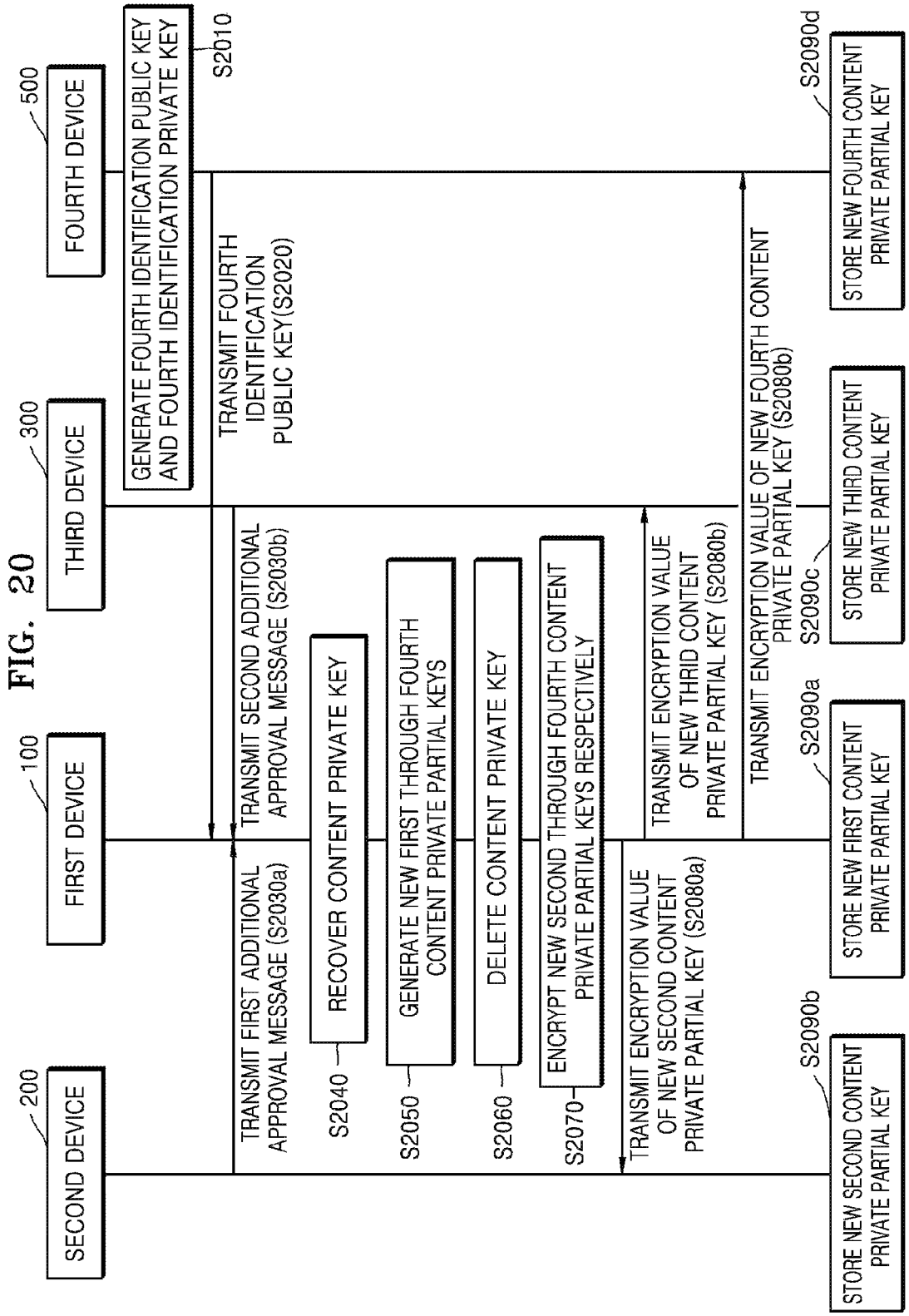
FIG. 20 illustrates a flowchart showing an example of an operation of the security group shown in FIG. 1, according to a modified example of the method of encrypting content described with reference to FIG. 5, according to an exemplary embodiment.

FIG. 20 illustrates a flowchart showing an example of an operation of the security group shown in FIG. 1, according to a modified example of the method of encrypting content described with reference to FIG. 5, according to an exemplary embodiment.

Referring to FIG. 20, the method of encrypting content includes adding a new member to the security group SG. The method of encrypting content may be performed after the operation of the security group SG according to the method of encrypting content that is described with reference to FIG. 11 is performed. In the current embodiment, the method of encrypting content includes operations that may be processed in a time series by the first through third devices 100 through 300 included in the security group SG shown in FIG. 1.

In operation S2010, a fourth device 500 generates a fourth identification public key K4 and a fourth identification private key k4. The fourth device 500 is a device of a fourth user USER4 who is a new member or new subscriber to the security group SG. A fourth identification key pair consisting of the fourth identification public key K4 and the fourth identification private key k4 is a combination of keys for identifying a fourth application installed in the fourth device 500. The first through third applications installed in the first through third devices 100 through 300 may check or identify the fourth application installed in the fourth device 500 via the fourth identification public key K4.

According to an exemplary embodiment, the fourth device 500 may request a phone PKI to generate the fourth identification public key K4 and the fourth identification private key k4. According to another exemplary embodiment, the fourth device 500 may request the phone PKI to generate the fourth identification public key K4, the fourth identification private key k4, and a fourth certificate $Certificate_{p4}(K4)$ with respect to the fourth identification public key K4. In this example, p4 denotes a key for certification of the fourth device 500, and the fourth certificate $Certificate_{p4}(K4)$ is a document for concatenating an identity of the fourth user USER4 and the public key, that is, the fourth identification public key K4.

In operation S2020, the fourth device 500 transmits the fourth identification public key K4 to the first device 100. The first device 100 may use the transmitted fourth identification public key K4 to encrypt a fourth content private partial key t4. According to another exemplary embodiment, the fourth device 500 may transmit the fourth identification public key K4 and the fourth certificate $Certificate_{p4}(K4)$ to the first device 100.

In operation S2030a, the second device 200 transmits a first additional approval message to the first device 100. For example, the first additional approval message may include an encryption value of the second partial key t2 stored in the second device 200. For example, the first additional approval message may include a value $Enc_{K1}(t2)$ that is obtained by encrypting the second partial key t2 using the first identification public key K1.

In operation S2030b, the third device 300 transmits a second additional approval message to the first device 100. For example, the second additional approval message may include an encryption value of the third partial key t3 stored in the third device 300. For example, the second additional approval message may include a value $Enc_{K1}(t3)$ obtained by encrypting the third partial key t3 using the first identification public key K1.

In operation S2040, the first device 100 recovers a content private key using the first and second additional approval messages. For example, the first device 100 may recover the second and third partial keys t2 and t3 by decrypting the encryption values $Enc_{K1}(t2)$ and $Enc_{K1}(t3)$ of the second and third partial keys included in the first and second additional approval messages using the first identification public key K1. Then, the first device 100 may recover the content private key t based on the first through third partial key t1 through t3.

In operation S2050, the first device 100 re-splits the content private key t into at least four parts, and thus, generates new at least first through fourth content private partial keys t1' through t4' (that is, t=t1'+t2'+t3'+t4' . . . ). For example, the first device 100 may re-split the content private key t using the Shamir scheme.

In operation S2060, the first device 100 deletes the content private key t. Thus, the content private key t may not be known to any one, and unless enough devices amounting to a value equal to or greater than a threshold value, from among the first through fourth devices 100 through 400, access the virtual space at the same time, the encrypted content may not be decrypted. That is, independently the devices 100 through 400 may not be able to decrypt the content. According to another exemplary embodiment, the first device 100 may store the content private key t in a security zone such as Trust Zone.

In operation S2070, the first device 100 encrypts the new second through fourth content private partial keys t2' through t4' respectively using the second through fourth identification public keys K2 through K4. Thus, a new second content private partial key encryption value $Enc_{K2}(t2')$, a new third content private partial key encryption value $Enc_{K3}(t3')$, and a new fourth content private partial key encryption value $Enc_{K4}(t4')$ are generated.

Because the new second content private partial key encryption value $Enc_{K2}(t2')$ may be decrypted using the second identification private key k2 corresponding to the second identification public key K2, the new second content private partial key encryption value $Enc_{K2}(t2')$ may be decrypted only by the second device 200 having the second identification private key k2. Additionally, because the new third content private partial key encryption value $Enc_{K3}(t3')$ may be decrypted using the third identification private key k3 corresponding to the third identification public key K3, the new third content private partial key encryption value $Enc_{K3}(t3')$ may be decrypted only by the third device 300 having the third identification private key k3. Additionally, because the new fourth content private partial key encryption value $Enc_{K4}(t4')$ may be decrypted using the fourth identification private key k4 corresponding to the fourth identification public key K4, the new fourth content private partial key encryption value $Enc_{K4}(t4')$ may be decrypted only by the fourth device 500 having the fourth identification private key k4.

In operation S2080a, the first device 100 transmits the new second content private partial key encryption value $Enc_{K2}(t2')$ to the second device 200. In operation S2080b, the first device 100 transmits the new third content private partial key encryption value $Enc_{K3}(t3')$ to the third device 300. In operation S2080c, the first device 100 transmits the new fourth content private partial key encryption value $Enc_{K4}(t4')$ to the fourth device 500.

In operation S2090a, the first device 100 stores the new first content private partial key t1'. In operation S2090b, the second device 200 decrypts the new second content private partial key encryption value $Enc_{K2}(t2')$ using the second identification private key k2, and thus, extracts and stores the second new content private partial key t2'. In operation S2090c, the third device 300 decrypts the new third content private partial key encryption value $Enc_{K3}(t3')$ using the third identification private key k3, and thus, extracts and stores the new third content private partial key t3'. In operation S2090d, the fourth device 500 decrypts the new fourth content private partial key encryption value $Enc_{K4}(t4')$ using the fourth identification private key k4, and thus, extracts and stores the new fourth content private partial key t4'. According to an exemplary embodiment, the first through fourth devices 100 through 400 may respectively store the new first through fourth content private keys t1' through t4' in a security zone such as Trust Zone.

As described in the example above, the fourth device 500 may be added to the security group SG by performing operations S2010 through S2090d. According to another exemplary embodiment, even though a new member is added to the security group SG, if a threshold value necessary for decryption is identical to the threshold value needed before the new member is added, a fourth content private partial key may be generated without having to change the first through third content private partial keys t1 through t3. In this example, transactions of the fourth device 500 with the second and third devices 200 and 300 may not occur.

Figure 21:
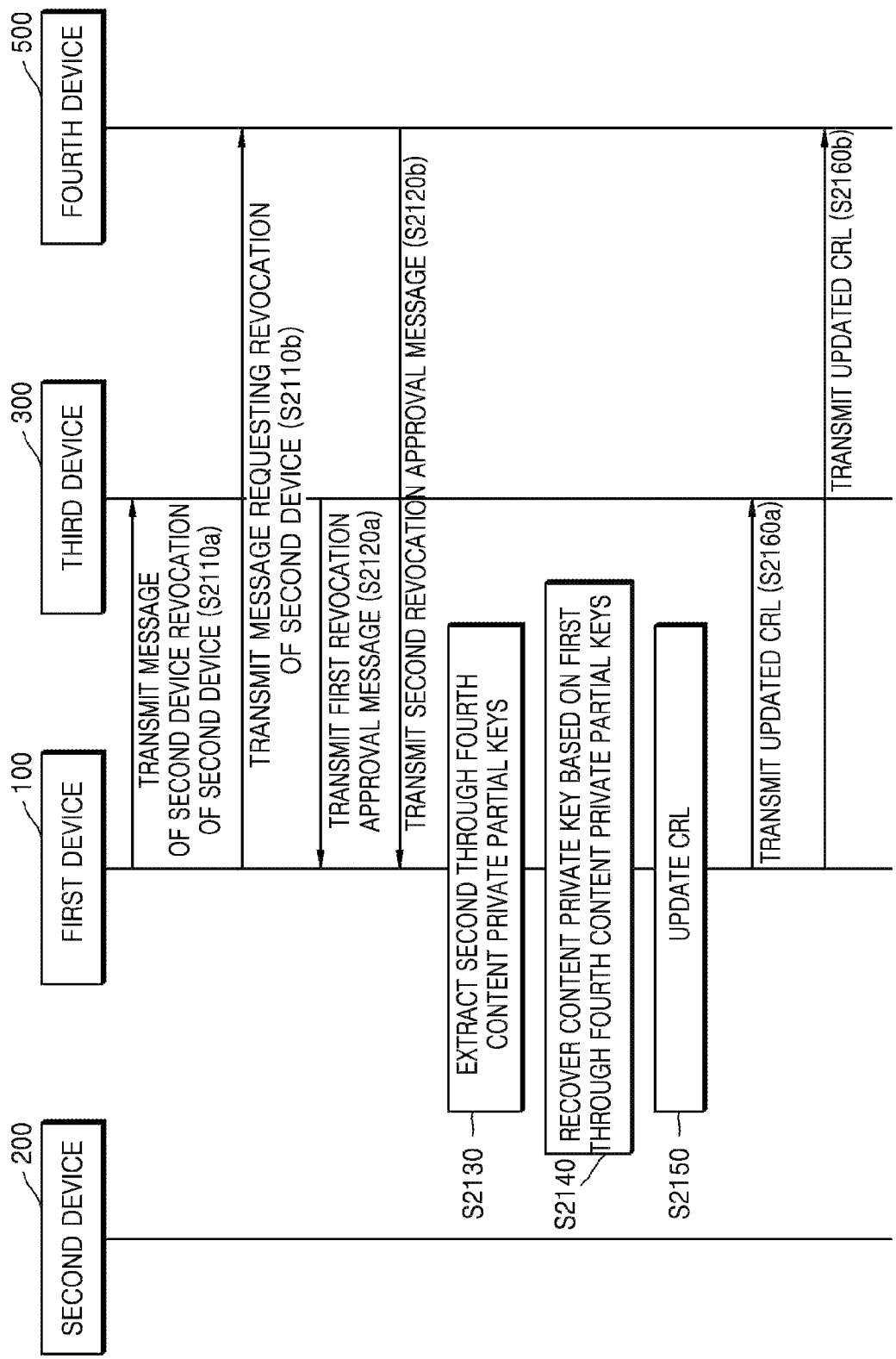
FIG. 21 illustrates a flowchart showing an example of an operation of the security group shown in FIG. 1, according to another modified example of the method of encrypting content described with reference to FIG. 5, according to an exemplary embodiment.

FIG. 21 illustrates a flowchart showing an example of an operation of the security group SG shown in FIG. 1, according to another modified example of the method of encrypting content described with reference to FIG. 5, according to an exemplary embodiment.

Referring to FIG. 21, the method of encrypting content includes a method of revoking a member included in the security group SG. This method may be performed after the operation of the security group SG according to the method of encrypting content that is described with reference to FIG. 11 is performed. For example, the method of encrypting content may be a method of revoking the second device 200, from among the first through third devices 100 through 300 included in the security group SG shown in FIG. 1, and may include operations processed in a time series by the first through third devices 100 through 300 included in the security group SG described with reference to in FIG. 1, and the fourth device 500 newly added to the security group SG in the example of FIG. 20.

In operation S2110a, the first device 100 transmits a message requesting revocation of the second device 200 to the third device 300. For example, the message requesting revocation of the second device 200 may include the first identification public key K1, a group ID GroupID, and an electronic signature $E\text{-Sign}_{K1}(K1|K3|K2|GroupID)$ with respect to the first identification public key K1, the third identification public key K3, the second identification pubic key K2, and the group ID GroupID.

In operation S2110b, the first device 100 transmits a message requesting revocation of the second device 200 to the fourth device 500. The message requesting revocation of the second device 200 may include the first identification public key K1, the group ID GroupID, and an electronic signature $E\text{-Sign}_{K1}(K1|K4|K2|GroupID)$ with respect to the first identification public key K1, the fourth identification public key K4, the second identification pubic key K2, and the group ID GroupID.

As such, the first device 100 may transmit the message requesting revocation of the second device 200, to the other members of the security group SG other than the second device 200 that is to be revoked.

In operation S2120a, the third device 300 transmits a first revocation approval message to the first device 100. The first revocation approval message may include a value $Enc_{K1}(t3)$ obtained by encrypting the third content private partial key t3 using the first identification public key K1, and an electronic signature with respect to the value $Enc_{K1}(t3)$. In operation S2120b, the fourth device 500 transmits a second revocation approval message to the first device 100. The second revocation approval message may include a value $Enc_{K1}(t4)$ obtained by encrypting the fourth content private partial key t4 using the first identification public key K1, and an electronic signature with respect to the value $Enc_{K1}(t4)$.

In operation S2130, the first device 100 extracts the second through fourth content private partial keys t2 through t4. For example, the first device 100 may extract the second through fourth content private keys t2 through t4 respectively by decrypting the values $Enc_{K1}(t2)$, $Enc_{K1}(t3)$, and $Enc_{K1}(t4)$ by using the first identification private key k1. In this example, the values $Enc_{K1}(t2)$, $Enc_{K1}(t3)$, and $Enc_{K1}(t4)$ may be obtained by encrypting the second through fourth content private partial keys t2 through t4.

In operation S2140, the first device 100 recovers the content private key t from the first content private partial key t1 and the second through fourth content private partial keys t2 through t4.

In operation S2150, the first device 100 updates a certificate revocation list (CRL). According to another exemplary embodiment, the first device 100 may further generate an electronic signature $E\text{-}Sign_t(CRL)$ for the CRL.

In operation S2160a, the first device 100 transmits the updated CRL to the third device 300. As another example, the first device 100 may transmit the updated CRL and the electronic signature $E\text{-}Sign_t(CRL)$ for the CRL to the third device 300. In operation S2160b, the first device 100 transmits the updated CRL to the fourth device 500. As another example, likewise, the first device 100 may transmit the updated CRL and the electronic signature $E\text{-}Sign_t(CRL)$ for the CRL to the fourth device 500.

Figure 22:
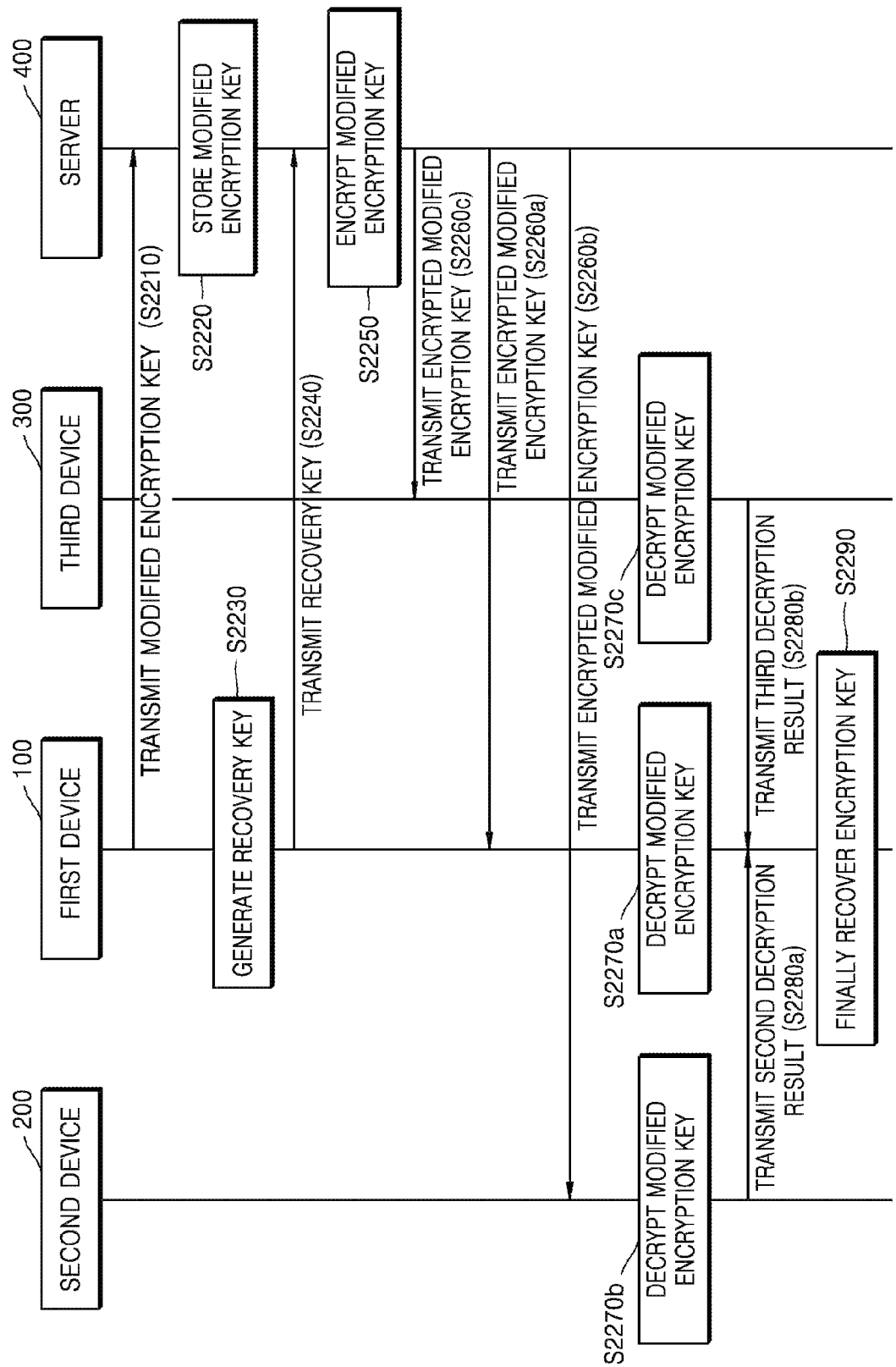
FIG. 22 illustrates a flowchart showing an example of an operation of the security group shown in FIG. 1, according to another modified example of the method of encrypting content described with reference to FIG. 5, according to an exemplary embodiment.

FIG. 22 illustrates a flowchart showing an example of an operation of the security group SG shown in FIG. 1, according to another modified example of the method of encrypting content described with reference to FIG. 5, according to an exemplary embodiment.

Referring to FIG. 22, the method of encrypting content includes a method of recovering a key using a cloud service, in response to one of a plurality of devices included in the security group SG being lost. This method may be performed after the operation of the security group SG according to the method of encrypting content described with reference to FIG. 11, is performed. The method of encrypting content includes operations that may be processed in a time series by the first through third devices 100 through 300 included in the security group SG shown in FIG. 1. In the current embodiment, the server 400 may be a cloud server.

In operation S2210, the first device 100 transmits a modified encryption key ti to the server 400. In operation S2220, the server 400 stores the modified encryption key ti. For example, the modified encryption key ti may have a value corresponding to the content private key t and, for example, may be a content private key $Enc_{K1}(Enc_{K2}(Enc_{K3}(t)))$ that is encrypted using the first through third identification public keys K1 through K3.

In operation S2230, the first device 100 generates a recovery key v. In operation S2240, the first device 100 transmits the recovery key v to the server 400. In operation S2250, the server 400 encrypts the modified encryption key ti using the recovery key v. For example, the encrypted modified encryption key may be $Enc_v(Enc_{K1}(Enc_{K2}(Enc_{K3}(t))))$.

In operation S2260a, the server 400 transmits the encrypted modified encryption key $Enc_v(Enc_{K1}(Enc_{K2}(Enc_{K3}(t))))$ to the first device 100. In operation S2260b, the server 400 transmits the encrypted modified encryption key $Enc_v(Enc_{K1}(Enc_{K2}(Enc_{K3}(t))))$ to the second device 200. In operation S2260c, the server 400 transmits the encrypted modified encryption key $Enc_v(Enc_{K1}(Enc_{K2}(Enc_{K3}(t))))$ to the third device 300.

In operation S2270a, the first device 100 obtains a first decryption result $Dec_{k1}(Enc_v(Enc_{K1}(Enc_{K2}(Enc_{K3}(t)))))$, by decrypting the encrypted modified encryption key $Enc_v(Enc_{K1}(Enc_{K2}(Enc_{K3}(t))))$ using the first identification private key k1. In operation S2270b, the second device 200 obtains a second decryption result $Dec_{k2}(Enc_v(Enc_{K1}(Enc_{K2}(Enc_{K3}(t)))))$, by decrypting the encrypted modified encryption key $Enc_v(Enc_{K1}(Enc_{K2}(Enc_{K3}(t))))$ using the second identification private key k2. In operation S2270c, the third device 300 obtains a third decryption result $Dec_{k3}(Enc_v(Enc_{m}(Enc_{K2}(Enc_{K3}(t)))))$, by decrypting the encrypted modified encryption key $Enc_v(Enc_{K1}(Enc_{K2}(Enc_{K3}(t))))$ using the third identification private key k3.

In operation S2280a, the second device 200 transmits the second decryption result $Dec_{k2}(Enc_v(Enc_{K1}(Enc_{K2}(Enc_{K3}(t)))))$ to the first device 100. In operation S2280b, the third device 300 transmits the third decryption result $Dec_{k3}(Enc_v(Enc_{K1}(Enc_{K2}(Enc_{K3}(t)))))$ to the first device 100. As such, each device sequentially encrypts the encrypted modified encryption key $Enc_v(Enc_{K1}(Enc_{K2}(Enc_{K3}(t))))$ using an identification private key corresponding thereto. As a result, the first device 100 may obtain $Enc_v(t)$.

In operation S2290, the first device 100 finally recovers an encryption key using the recovery key v. For example, the first device 100 may recover the content private key t by decrypting $Enc_v(t)$ using the recovery key v (that is, $Dec_v(Enc_v(t))=t$).

Figure 23:
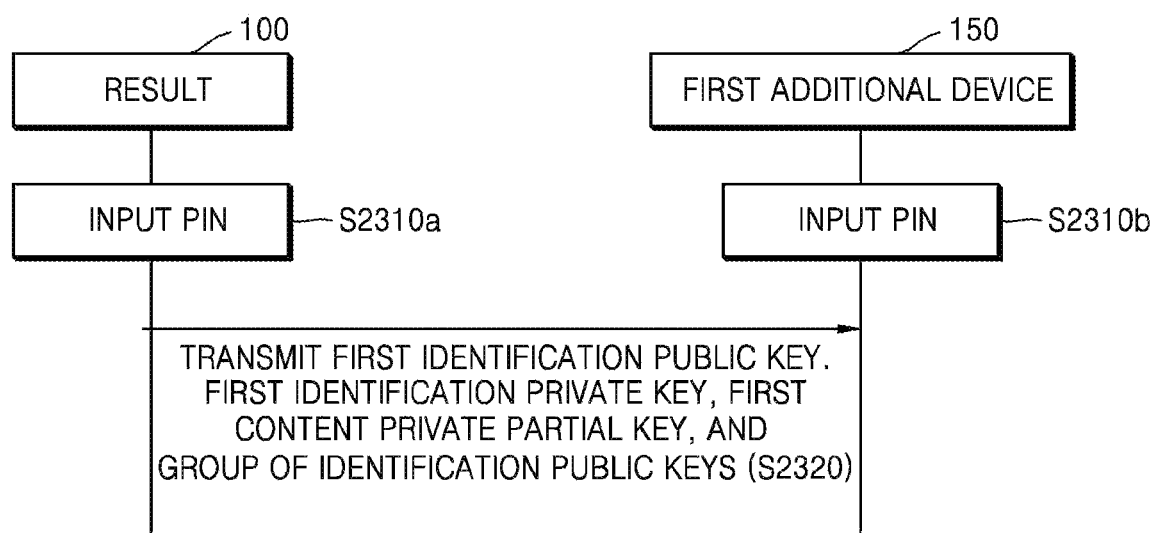
FIG. 23 illustrates a flowchart showing an example of an operation of the security group shown in FIG. 1, according to another modified example of the method of encrypting content described with reference to FIG. 5, according to an exemplary embodiment.

FIG. 23 illustrates a flowchart showing an example of an operation of the security group SG shown in FIG. 1, according to another modified example of the method of encrypting content described with reference to FIG. 5, according to an exemplary embodiment.

Referring to FIG. 23, the method of encrypting content includes a method of adding a new device, owned by one of a plurality of users of a plurality of devices included in the security group SG. This method may be performed after the operation of the security group SG according to the method of encrypting content that is described with reference to FIG. 11, is performed. For example, the method of encrypting content may include a method of adding a first additional device 150 to the security group SG. In this example, the first additional device 150 is a device owned by the first user USER1 of the first device 100 that is already included in the security group SG shown in FIG. 1. The method of encrypting content includes operations that may be processed in a time series by the first device 100 and the first additional device 150.

In operation S2310a, a personal identification number (PIN) is input to the first device 100. In operation S2320b, the PIN is input to the first additional device 150. For example, the PINs respectively input to the first device 100 and the first additional device 150 may be identical to each other.

In operation S2320, the first device 100 transmits the first identification public key K1, the first identification private key k1, the first content private partial key t1, and the group {K1, K2, K3} of identification public keys to the first additional device 150. According to another exemplary embodiment, the first device 100 may encrypt the first identification private key k1 and the first content private partial key t1, and instead transmit the encrypted identification private key k1 and the encrypted first content private partial key t1 to the first additional device 150.

Figure 24:
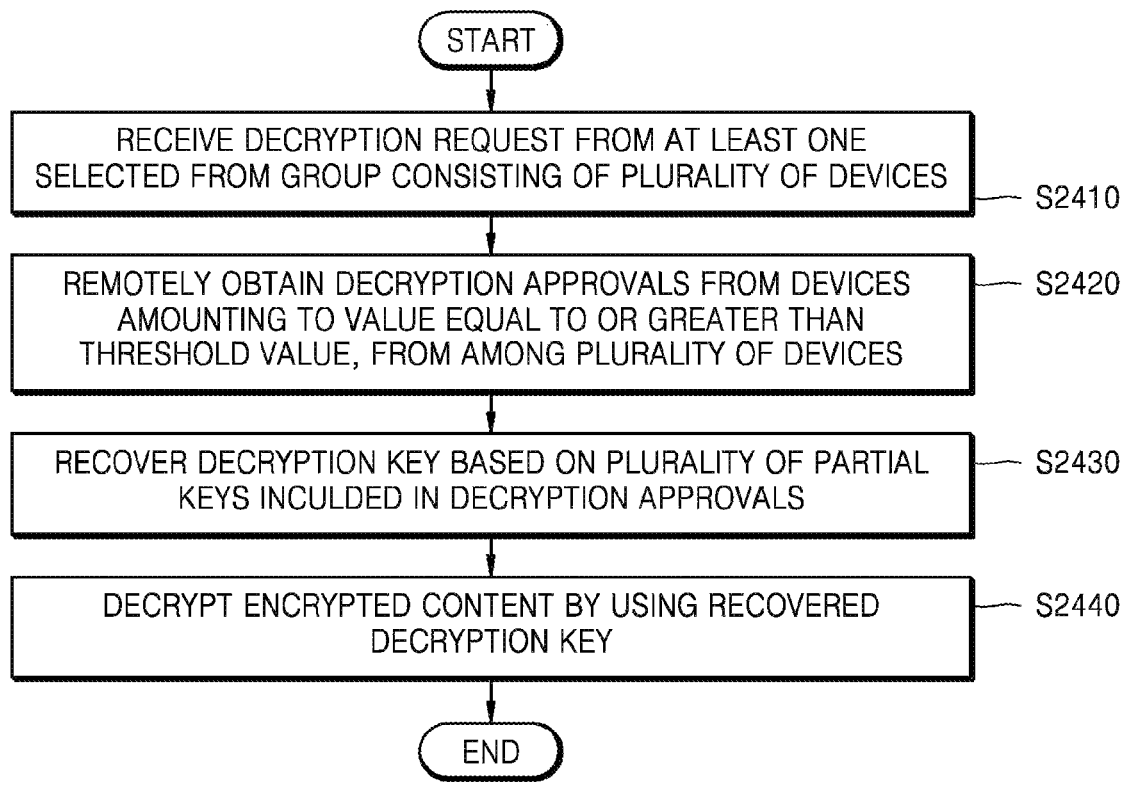
FIG. 24 illustrates a flowchart of a method of decrypting content, according to an exemplary embodiment.

FIG. 24 illustrates a flowchart of a method of decrypting content, according to an exemplary embodiment.

Referring to FIG. 24, the method of decrypting content is a method of decrypting content that may be shared in a virtual space, and which is performed by the security group SG that includes a plurality of devices. In this example, the method includes operations performed by a server or by one of the plurality of devices, as described below. For example, the method of decrypting content may include operations processed in time series by the first device 100 included in the security group SG shown in FIG. 1. Additionally, the method of decrypting content may correspond to the method of encrypting content described with reference to FIG. 5.

In operation S2410, a decryption request is received from at least one of a plurality of devices. For example, the first device 100, from among the first through third devices 100 through 300 which access a virtual space, may transmit a decryption request message to the other devices or the server.

In operation S2420, decryption approvals from a number of devices amounting to a value that is equal to or greater than a threshold value, from among the plurality of devices, are obtained remotely. For example, decryption approvals from a number of devices amounting to a value equal to or greater than a threshold value, from among the first through third devices which access the virtual space, may be obtained remotely. For example, the threshold value may be 2.

If the security group SG includes N devices where N is an integer equal to or greater than 2, the threshold value may be an integer equal to or greater than 2 and equal to or less than N. Accordingly, for example, if N is 2, the threshold value may be 2. If N is greater than 2, the threshold value may be equal to or greater than 2 and equal to or less than N.

In operation S2430, a decryption key is recovered from a plurality of partial keys that are respectively included in the decryption approvals. According to an exemplary embodiment, in the method of decrypting content, content may be decrypted according to an asymmetric decryption method. The plurality of partial keys may correspond to a plurality of private partial keys, and a decryption key may be a private key. According to another exemplary embodiment, in the method of decrypting content, content may be decrypted using an asymmetric decryption method. The plurality of partial keys may correspond to a plurality of private partial keys, and a decryption key may be an encryption key.

In operation S2440, the encrypted content is decrypted using the recovered decryption key. For example, the first through third devices 100 through 300 may decrypt encrypted content stored in at least one of the first through third devices 100 through 300 or in a server, using the recovered encryption key. For example, in regard to the asymmetric decryption method, the first through third devices 100 through 300 may decrypt content using the recovered private key. As another example, in regard to a symmetric decryption method, the first through third devices 100 through 300 may decrypt content using the encryption key that is a symmetric key.

Figure 25:
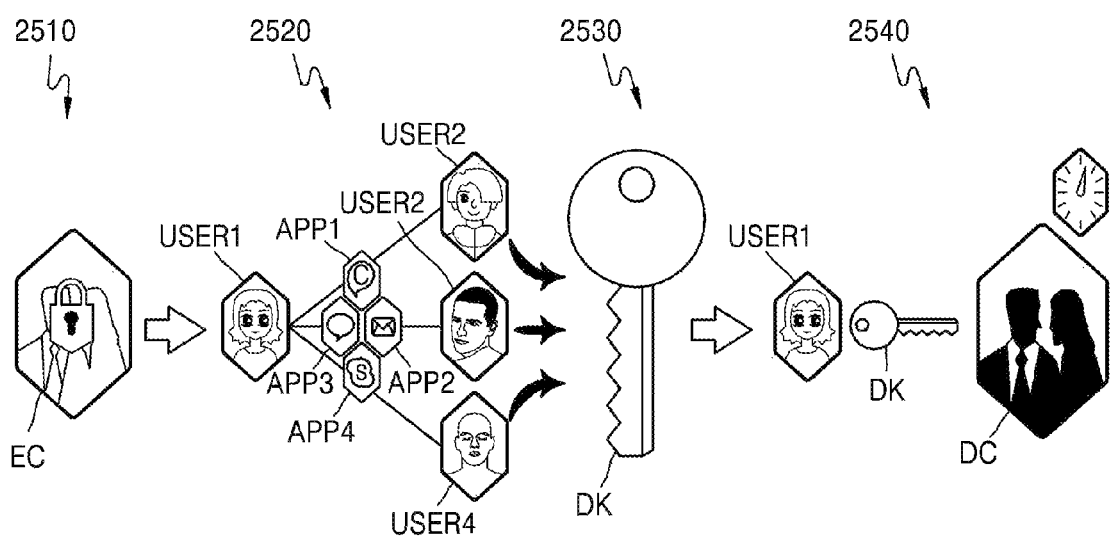
FIG. 25 illustrates an of decrypting content in the method of decrypting content described with reference to FIG. 24.

FIG. 25 illustrates an exemplary embodiment of the method of decrypting content described with reference to the example of FIG. 24.

Referring to FIG. 25, in operation 2510, content generated in a virtual space may be stored in an encrypted state (EC). In operation 2520, the first user USER1 may request decryption from other users such as the second through fourth users USER2 through USER4, which accessed the virtual space via one of various applications APP1 through APP4.

In operation 2530, a decryption key DK may be obtained from second through fourth partial keys that are respectively stored in the second through fourth devices of the second through fourth users USER2 through USER4, and a first partial key that is stored in the first device 100a.

In operation S2540, the first user USER1 may obtain decrypted content DC, by decrypting encrypted content using the decryption key DK. A time limit may be set with respect to a playing time of the decrypted content DC, and thus, an unintentional or unwanted exposure of the decrypted content DC to an outside user may be prevented.

Figure 26:
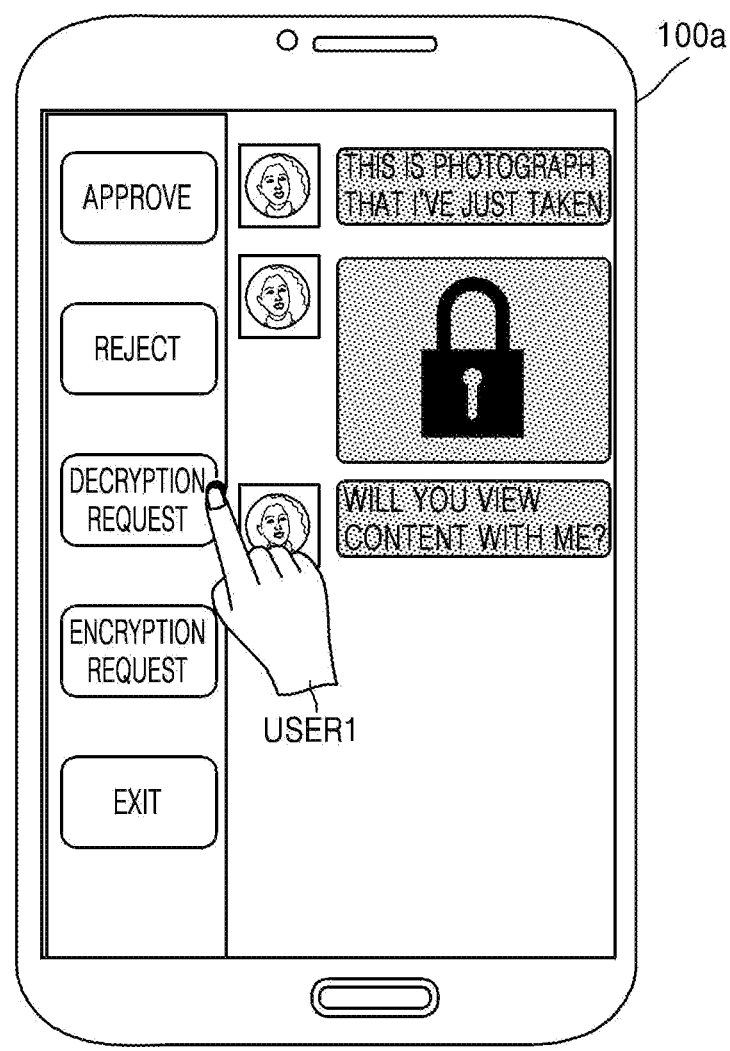
FIG. 26 illustrates an example of an encryption request operation, which is performed by the first device, according to the method of decrypting content described with reference to FIG. 24, according to an exemplary embodiment.

FIG. 26 illustrates an example of an encryption request operation, which is performed by the first device 100a, according to the method of decrypting content described with reference to FIG. 24, according to an exemplary embodiment.

Referring to FIG. 26, the first device 100a may detect an encryption request gesture by a user for a certain piece of content. For example, the first user USER1 may select an "encryption request" icon in a virtual space that is displayed on the first device 100a. For example, various encryption request gestures may be input. For example, encryption request gestures may include a tap, a double-tap, a drag, a swipe, a flick, a drag-and-drop, and the like, but are not limited thereto.

Figure 27:
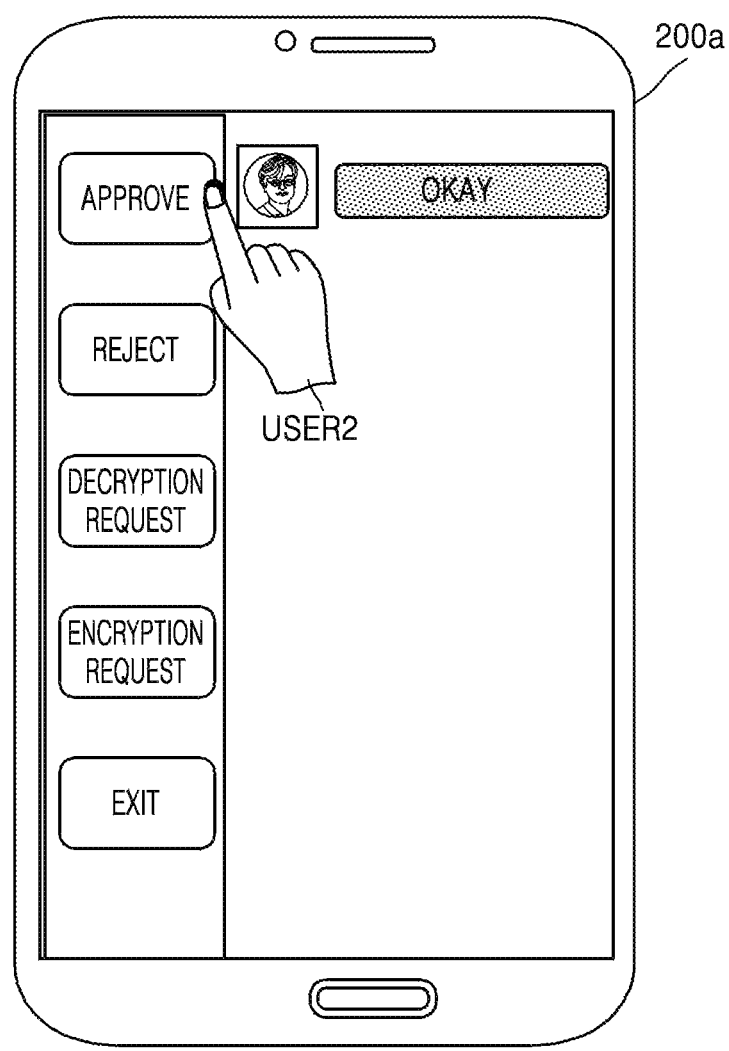
FIG. 27 illustrates an example of an approval operation according to the method of decrypting content described with reference to FIG. 24, according to an exemplary embodiment.

FIG. 27 illustrates an example of an approval operation according to the method of decrypting content described with reference to FIG. 24, according to an exemplary embodiment.

Referring to FIG. 27, the second device 200a may detect an approval gesture with respect to a decryption request, and transmit a result of the detection to other users such as the first and third users USER1 and USER3 via a virtual space. For example, the second user USER2 may select an "approval" icon in a virtual space displayed on the second device 200a. For example, various approval gestures may be input. For example, approval gestures may include a tap, a double-tap, a drag, a swipe, a flick, a drag-and-drop, and the like, but are not limited thereto.

Figure 28:
FIG. 28 illustrates an example of an additional approval operation according to the method of decrypting content described with reference to FIG. 24, according to an exemplary embodiment.

FIG. 28 illustrates an example of an additional approval operation according to the method of decrypting content described with reference to FIG. 24, according to an exemplary embodiment.

Referring to FIG. 28, a group video phone call may be initiated in a virtual space. Accordingly, a voice or a face of the second user USER2 may be detected by the first and third users USER1 and USER3. Accordingly, a decryption approval may be more accurately transmitted via the group video phone call, and thus, a stability in security may be enhanced.

Figure 29:
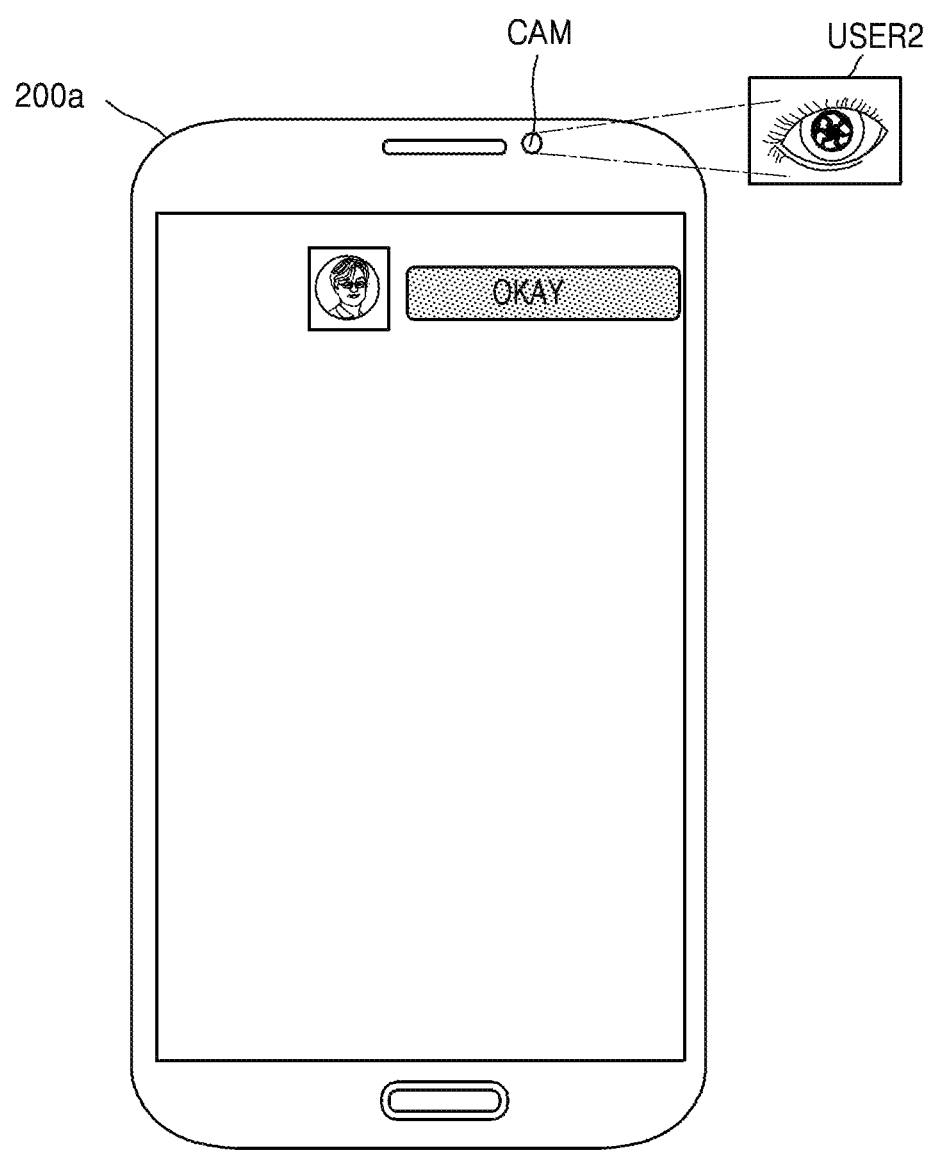
FIG. 29 illustrates another example of an additional approval operation according to the method of decrypting content described with reference to FIG. 24, according to an exemplary embodiment.

FIG. 29 illustrates another example of an additional approval operation according to the method of decrypting content described with reference to FIG. 24, according to an exemplary embodiment.

Referring to FIG. 29, a camera CAM included in the second device 200a may recognize an iris of an eye of the second user USER2, and transmit a result of the recognizing to the first and third users USER1 and USER3 via a virtual space.

Figure 30:
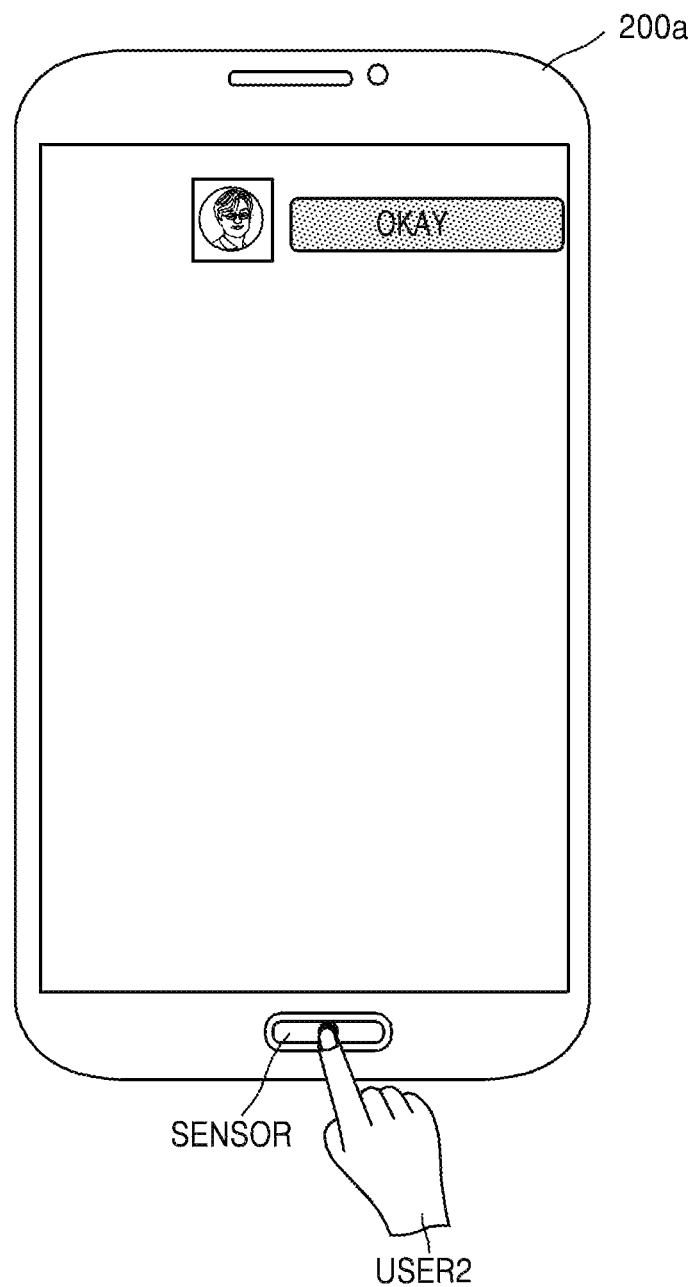
FIG. 30 illustrates another example of an additional approval operation according to the method of decrypting content described with reference to FIG. 24, according to an exemplary embodiment.

FIG. 30 illustrates another example of an additional approval operation according to the method of decrypting content described with reference to FIG. 24, according to an exemplary embodiment.

Referring to FIG. 30, a fingerprint recognition sensor included in the second device 200a may recognize a fingerprint of the second user USER2, and transmit a result of the recognizing to the first and third users USER1 and USER3 via a virtual space.

Figure 31:
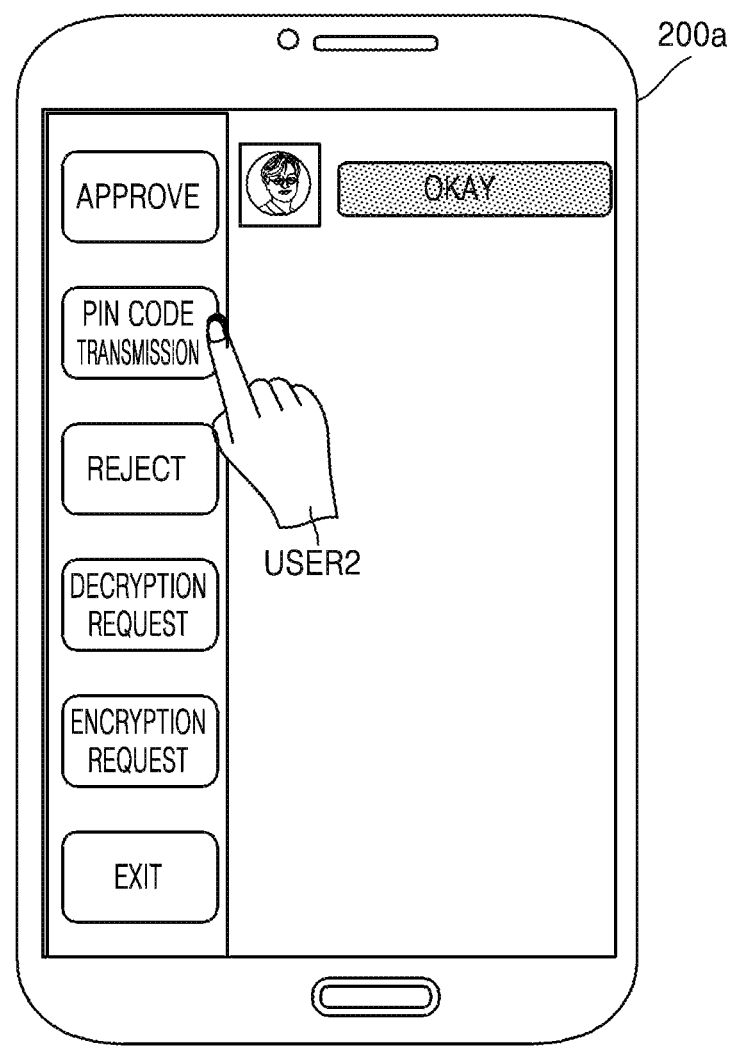
FIG. 31 illustrates another example of an additional approval operation according to the method of decrypting content described with reference to FIG. 24, according to an exemplary embodiment.

FIG. 31 illustrates another example of an additional approval operation according to the method of decrypting content described with reference to FIG. 24, according to an exemplary embodiment.

Referring to FIG. 31, the second device 200a may detect an additional approval gesture with respect to a decryption request, and transmit a result of the detecting to the first and third users USER1 and USER3 via a virtual space. For example, the second user USER2 may select a "pin code transmission" icon in a virtual space displayed on a screen of the second device 200a. Although not illustrated, as another example, the second user USER2 may select a "password transmission" icon in a virtual space displayed on a screen of the second device 200a.

Figure 32:
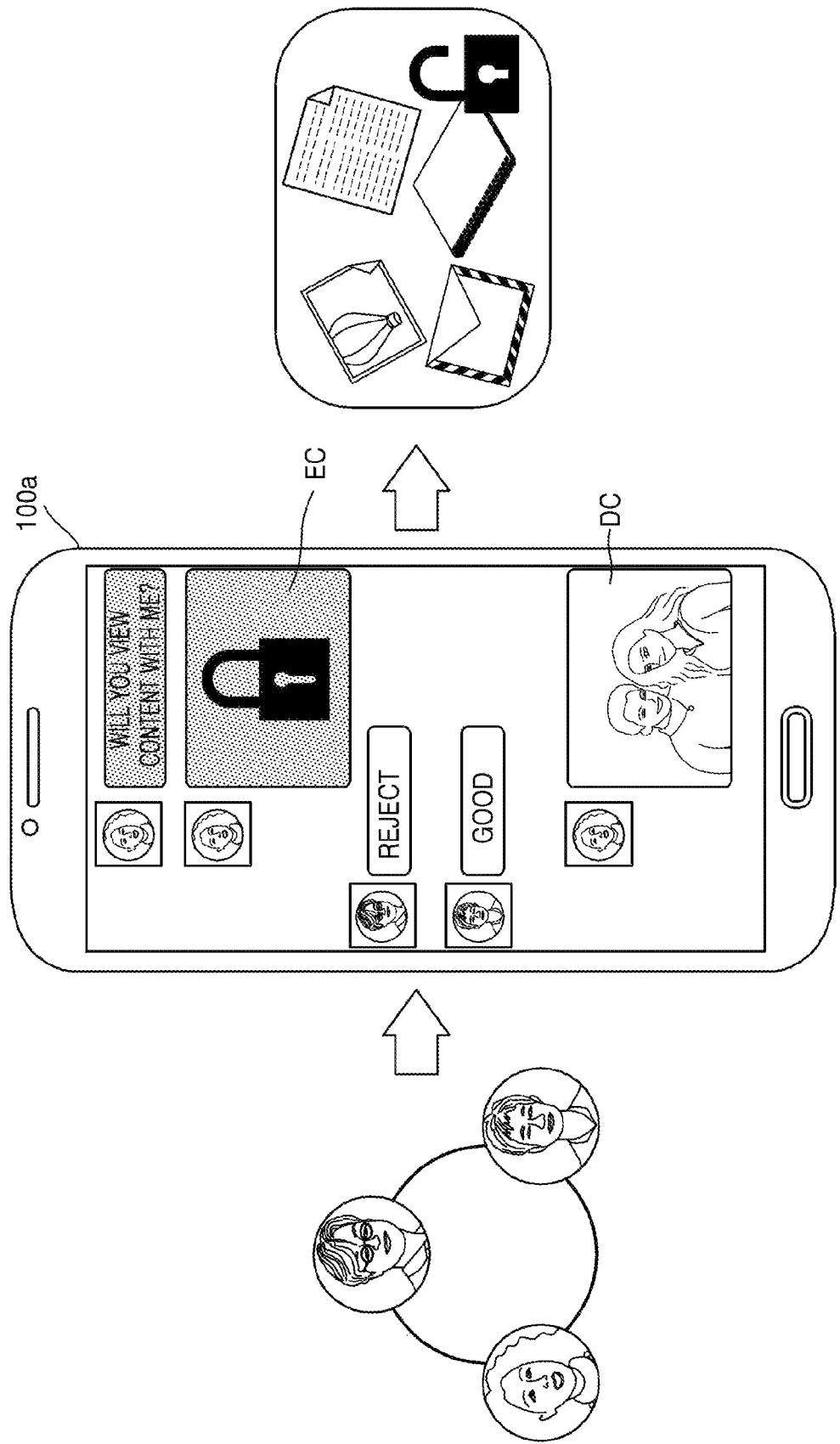
FIG. 32 illustrates an example of an operation of playing decrypted content, according to the method of decrypting content described with reference to FIG. 24, according to an exemplary embodiment.

FIG. 32 illustrates an example of an operation of playing decrypted content, according to the method of decrypting content described with reference to FIG. 24, according to an exemplary embodiment.

Referring to FIG. 32, the first device 100a may obtain decryption approvals from the second and third devices 200a and 300a, remotely. Then, the first device 100a may recover a decryption key from a plurality of partial keys respectively included in the encryption approvals, and obtain decrypted content DC by decrypting encrypted content EC using the recovered decryption key.

For example, the first through third users USER1 through USER3 may access a virtual space at the same time. Here, a conversation window in the virtual space may be open on a screen of the first device 100a of the first user USER1. If the first user USER1 sends a message asking "will you view content with me?" and sends the encrypted content EC to the second and third users USER1 and USER2, the second user USER2 may send a message saying "okay" to the first user USER1 and the third user USER3 may send a message saying "good" to the first user USER1. In response, the server 400 may decrypt the content and play the decrypted content DC.

Figure 33:
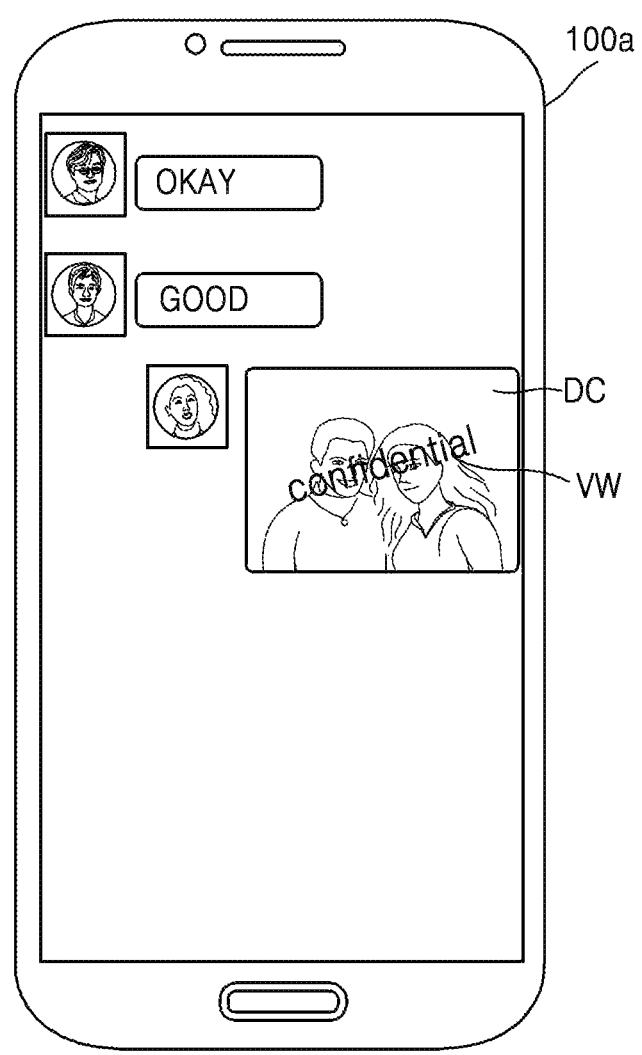
FIG. 33 illustrates an example of an operation of protecting decrypted content, according to the method of decrypting content described with reference to FIG. 24, according to an exemplary embodiment.

FIG. 33 illustrates an example of an operation of protecting the decrypted content DC, according to the method of decrypting content described with reference to FIG. 24, according to an exemplary embodiment.

Referring to FIG. 33, the first device 100a may display a visible watermark VW on the decrypted content DC. Like the first device 100a, the second and third devices 200a and 300a may also display the visible watermark VW on the decrypted content DC. For example, the visible watermark VW may be inserted into or overlap with a still image or a video signal, so that the visible watermark VW is capable of being viewed by eyes of a user.

Figure 34:
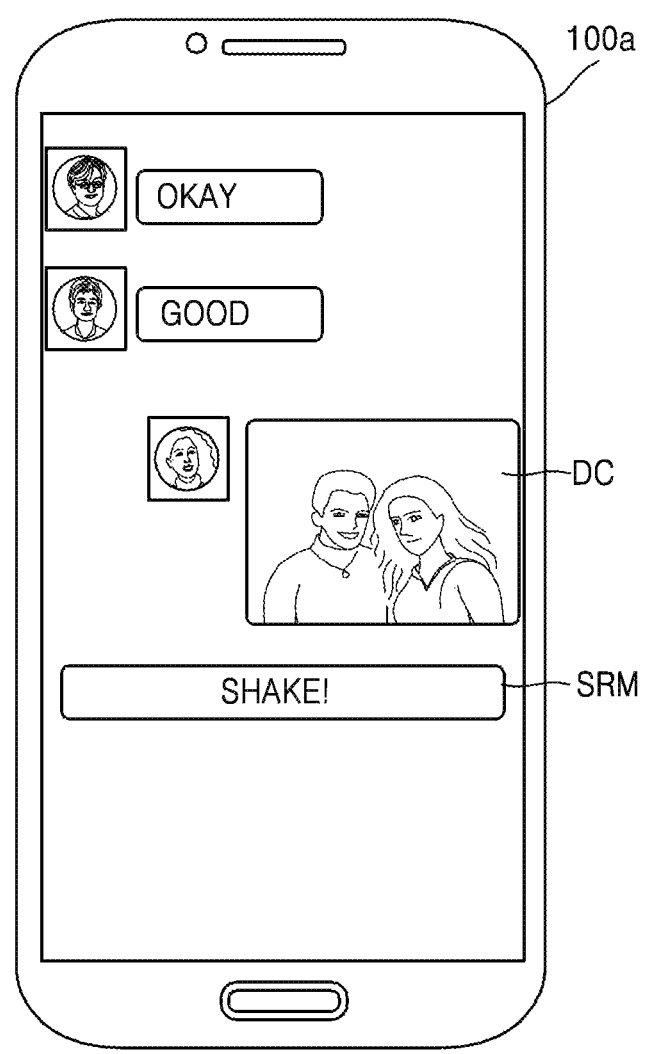
FIG. 34 illustrates another example of an operation of protecting decrypted content, according to the method of decrypting content described with reference to FIG. 24, according to an exemplary embodiment.

FIG. 34 illustrates another example of an operation of protecting the decrypted content DC, according to the method of decrypting content described with reference to FIG. 24, according to an exemplary embodiment.

Referring to FIG. 34, while the first device 100a is playing the decrypted content DC, the first device 100a may continuously receive a shaking request message SRM and display an indication that the shaking request message SRM is received on a screen of the first device 100a. Like the first device 100a, while the decrypted content DC is being played, the second and third devices 200a and 300a may continuously receive the shaking request message SRM and display the indication of the received shaking request message SRM on a screen of the second and third devices 200a and 300a.

Figure 35:
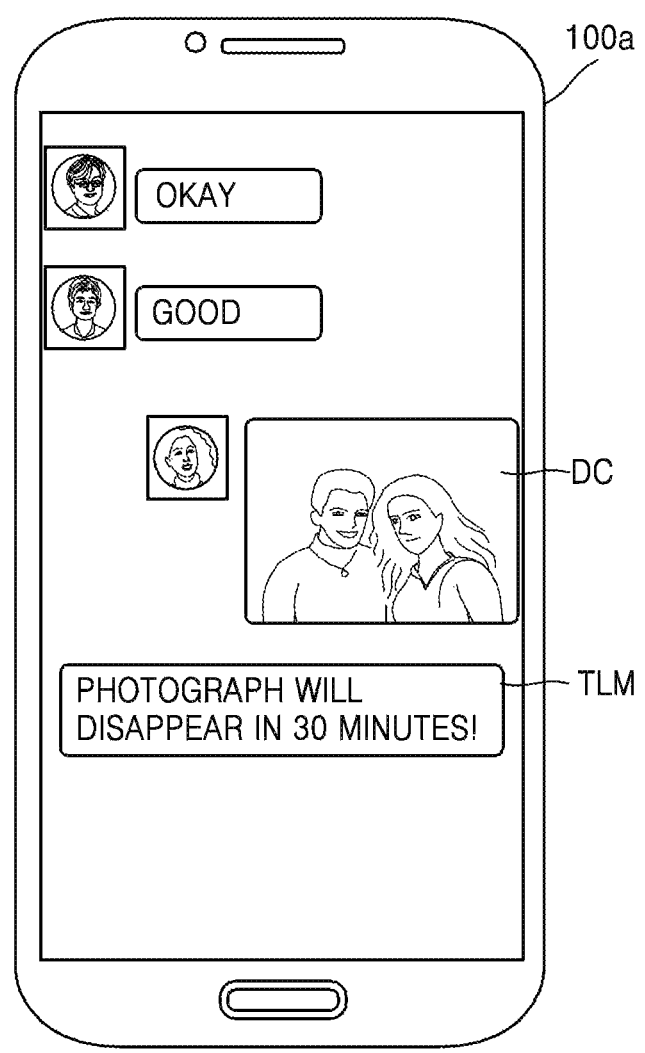
FIG. 35 illustrates another example of an operation of protecting decrypted content, according to the method of decrypting content described with reference to FIG. 24, according to an exemplary embodiment.

FIG. 35 illustrates another example of an operation of protecting the decrypted content DC, according to the method of decrypting content described with reference to FIG. 24, according to an exemplary embodiment.

Referring to FIG. 35, while the first device 100a is playing the decrypted content DC, the first device 100a may receive a time limit message TLM and display an indication of the received time limit message TLM on a screen of the first device 100a. For example, the time limit message TLM may be generated according to a predetermined threshold time. Like the first device 100a, while the decrypted content DC is being played, the second and third devices 200a and 300a may receive the time limit message TLM and display the received time limit message TLM on a screen of the second and third devices 200a and 300a.

According to another exemplary embodiment, while the decrypted content is being played in a virtual space, if at least one user from among the plurality of devices is not viewing or listening to the decrypted content, the decrypted content may be re-encrypted.

Although not illustrated, according to another exemplary embodiment, a print screen function with respect to the decrypted content may be prohibited. According to another exemplary embodiment, a photographing function with respect to the decrypted content may be prohibited. Accordingly, the decrypted content may be selectively and/or additionally protected according to a security level of shared content. If content corresponding to a high security level is shared, various protection operations may be performed. Thus, the content may be prevented from being leaked to an outside source.

Figure 36:
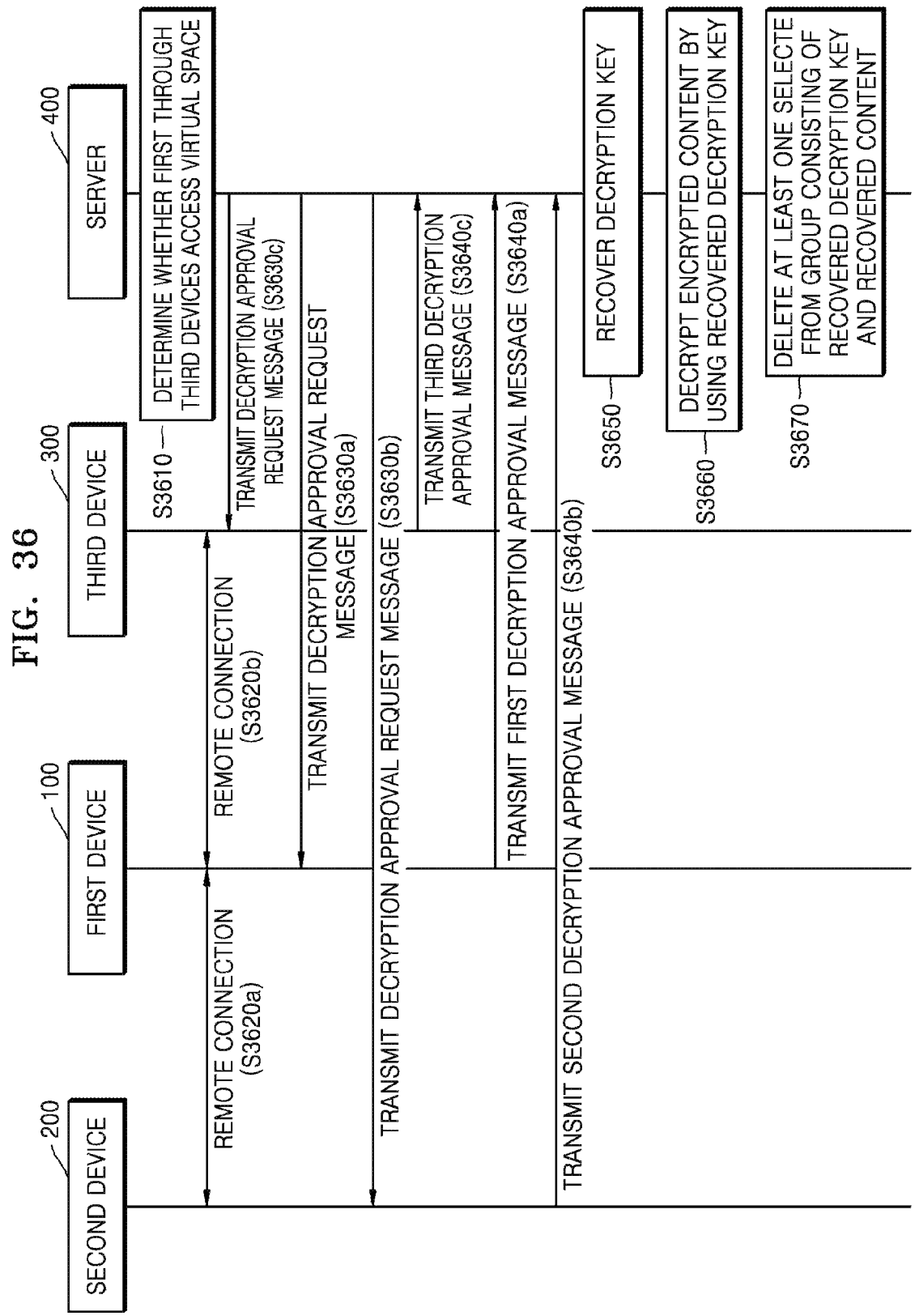
FIG. 36 illustrates a flowchart showing an example of an operation of the security group shown in FIG. 1, according to the method of decrypting content described with reference to FIG. 24, according to an exemplary embodiment.

FIG. 36 illustrates a flowchart showing an example of an operation of the security group shown in FIG. 1, according to the method of decrypting content described with reference to FIG. 24, according to an exemplary embodiment.

Referring to FIG. 36, the method of decrypting content includes operations that may be processed in a time series by the first through third devices 100 through 300 included in the security system 10, shown in FIG. 1, and the server 400.

In operation S3610, the server 400 determines whether the first through third devices 100 through 300 are accessing a virtual space.

In operation S3620a, the first and second devices 100 and 200 are remotely connected to each other. In operation S3620b, the first and third devices 100 and 300 are remotely connected to each other. Accordingly, the second and third devices 200 and 300 are also remotely connected to each other. In this example, the first through third devices 100 through 300 may access a virtual space, that is, a chatting space.

In operation S3630a, the server 400 transmits a decryption approval request message to the first device 100. In operation S3630b, the server 400 transmits a decryption approval request message to the second device 200. In operation S3630c, the server 400 transmits a decryption approval request message to the third device 300. Here, the server 400 may request approval for decrypting content that was previously shared between the plurality of users.

In operation S3640a, the first device 100 transmits a first decryption approval message to the server 400 approving of the decryption of the shared content. For example, the first decryption approval message may include an encryption value $\text{Enc}_{k1}(t1)$ of the first partial key t1 stored in the first device 100. In operation S3640b, the second device 200 transmits a second decryption approval message to the server 400. For example, the second decryption approval message may include an encryption value $\text{Enc}_{k2}(t2)$ of the second partial key t2 stored in the second device 200. In operation S3640c, the third device 300 transmits a third decryption approval message to the server 400. For example, the third decryption approval message may include an encryption value $\text{Enc}_{k3}(t3)$ of the third partial key t3 stored in the third device 300. Accordingly, the first through third devices 100 through 300 may authorize the decryption of the shared content.

In operation S3650, the server 400 recovers a decryption key based on the first through third decryption approval messages. For example, the server 400 may obtain the second and third partial keys t2 and t3, by decrypting the encryption values $\text{Enc}_{k1}(t1)$, $\text{Enc}_{k2}(t2)$, and $\text{Enc}_{k3}(t3)$ of the first through third partial keys t1 through t3 respectively included in the first through third decryption approval messages using first through third identification public keys K1 through K3. Then, the server 400 may recover the decryption key, that is, a private key t based on the first through third partial keys t1 through t3 (that is, t=t1+t2+t3).

In operation S3660, the server 400 decrypts previously encrypted content using the recovered decryption key. For example, the server 400 may decrypt a symmetric key s using the recovered private key t (such as $\text{Dec}_t(\text{Enc}_T(s))=s$), and decrypt encrypted content using the decrypted symmetric key s (that is, $\text{AES}_s(m)=m$).

In operation S3670, the server 400 deletes at least one of the recovered encryption key and the recovered content for purposes of additional protection and security. For example, the server 400 may delete at least one of the recovered encryption key t and the recovered content m.

Figure 37:
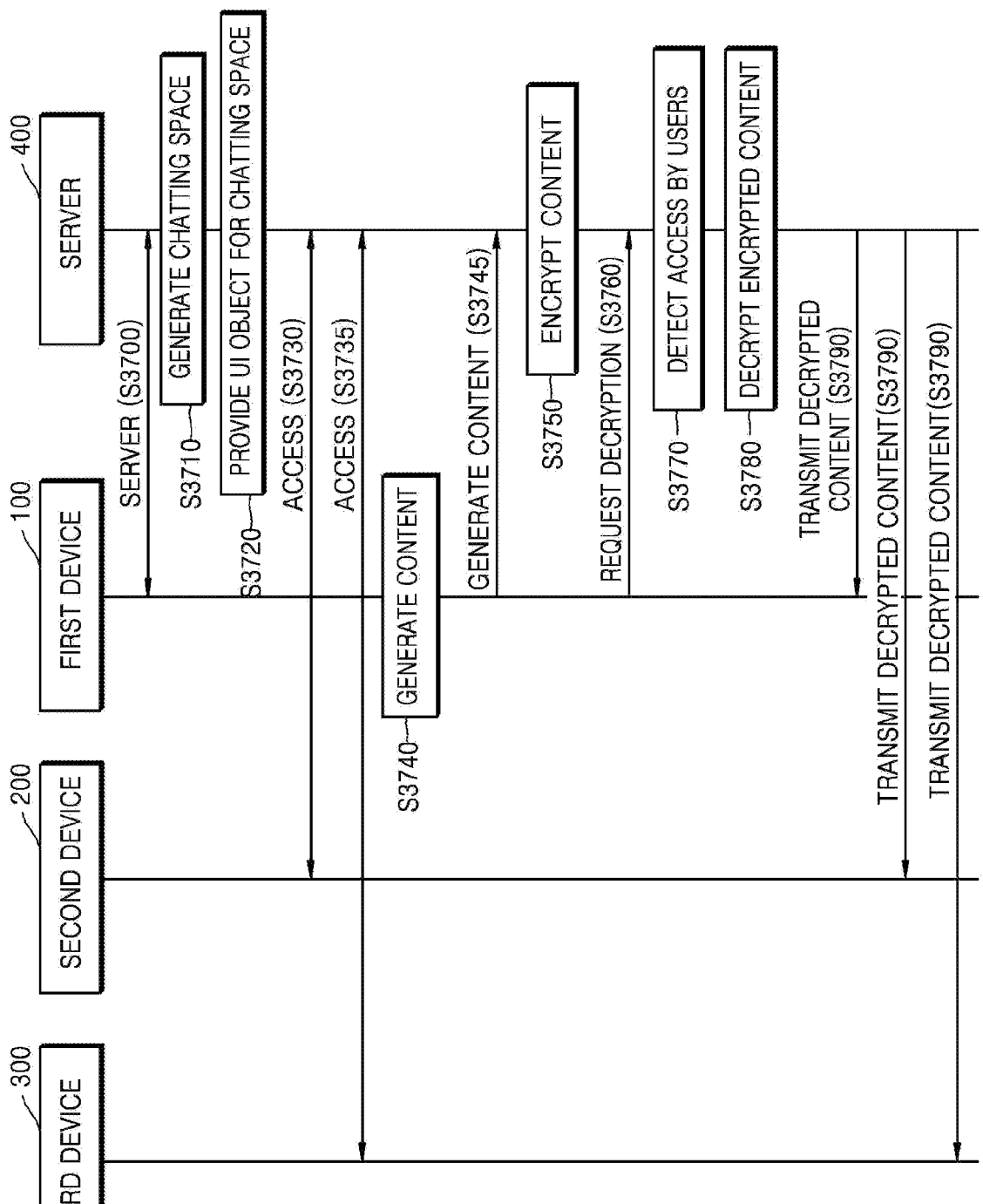
FIG. 37 illustrates a flowchart showing another example of an operation of the security system shown in FIG. 1, according to the method of providing an SNS described with reference to FIG. 3, according to an exemplary embodiment.

FIG. 37 illustrates a flowchart showing another example of an operation of the security system 10 shown in FIG. 1, according to the method of providing an SNS described with reference to FIG. 3, according to an exemplary embodiment.

Referring to FIG. 37, the method of providing an SNS is a method of encrypting content in a virtual space and decrypting encrypted content that was previously shared, if a security group that includes a plurality of users or a plurality of devices accesses the virtual space. The method of providing an SNS includes operations that may be processed in a time series by the first through third devices 100 through 300 and the server 400 included in the security system 10 shown in FIG. 1. The current embodiment is a modified example described with reference to FIG. 2. Thus, a redundant description thereof is not provided here again.

In operation S3700, the first device 100 is connected to the server 400. In operation 3710, the server 400 generates a chatting space. In operation S3720, the server 400 provides a UI object corresponding to the chatting space that may be accessed by a plurality of users. In operation S3730, the second device 200 is connected to the server 400. In operation S3735, the third device 300 is connected to the server 400.

In operation S3740, the first device 100 generates content. In operation S3745, the first device 100 transmits the content to the server 400. In operation S3750, the server 400 encrypts content. An example of an operation of encrypting content, which is performed by the server 400, is described with reference to FIGS. 38 through 43. In the current example, unlike in the embodiment described with reference to FIG. 4, the encrypting may be performed by the server 400.

For example, the method of encrypting content, described above with reference to FIG. 5, may be performed by the server 400. Accordingly, the server 400 may generate an encryption key and a plurality of partial keys with respect to the content, distribute the plurality of partial keys to the first through third devices 100 through 300, and encrypt the content using the generated encryption key.

In operation S3760, the first device 1000 requests decryption of the encrypted content from the server 400. In operation S3770, the server 400 detects an access by the first through third users USER1 through USER3 to the shared virtual space. In operation S3780, the server 400 decrypts the encrypted content. In operation S3790, the server 400 transmits the decrypted content to the first through third devices 100 through 300.

According to the above-described embodiment, the encrypting of content may be performed by the first device 100, and the decrypting of content may be performed by the server 400.

Figure 38:
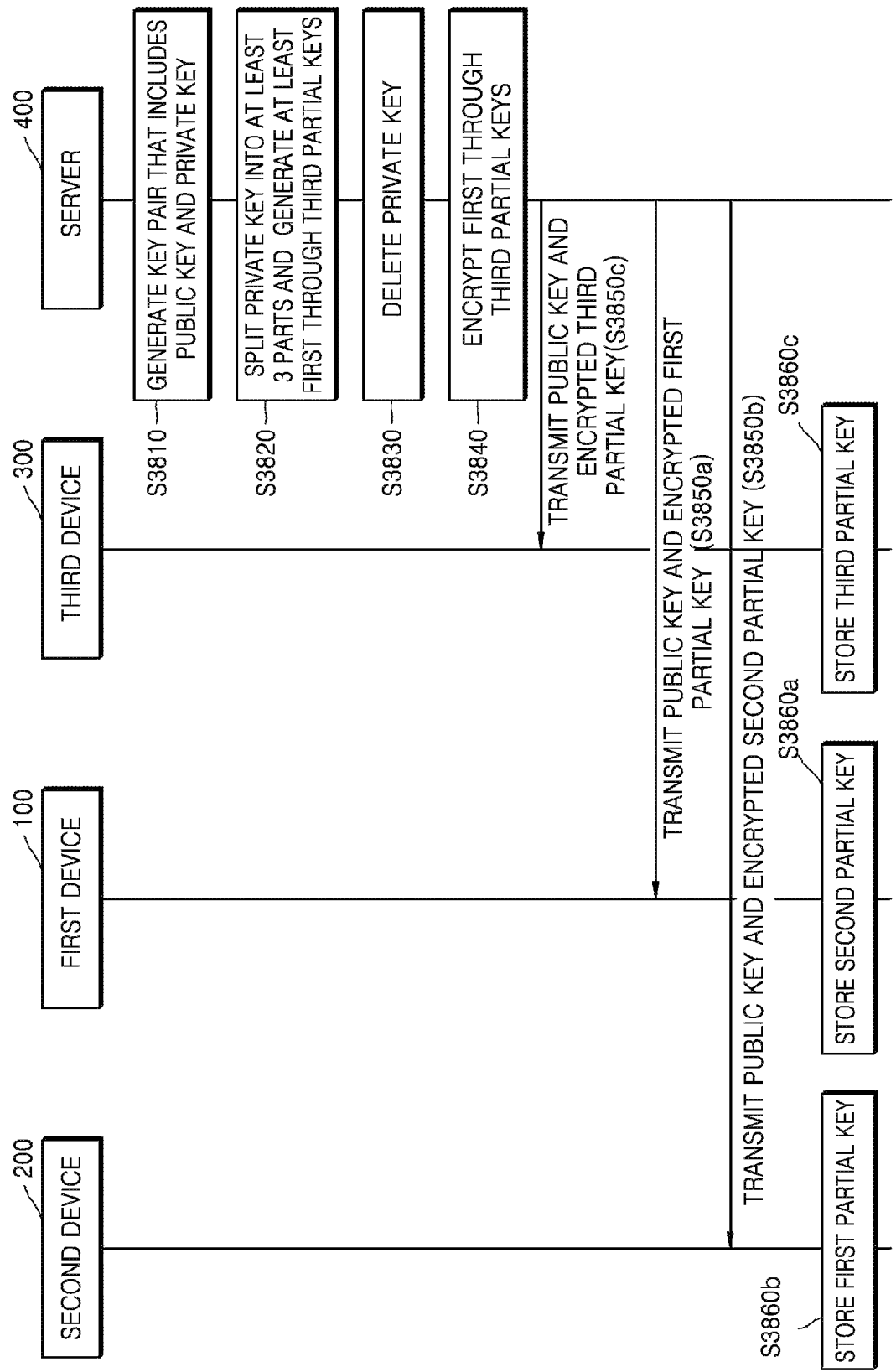
FIG. 38 illustrates a flowchart showing an example of an operation of the security group shown in FIG. 1, according to the generating of an encryption key and a plurality of partial keys and the distributing of the generated plurality of partial keys which are included in the method of encrypting content described with reference to FIG. 5, according to an exemplary embodiment.

FIG. 38 illustrates a flowchart showing an example of an operation of the security system 10 shown in FIG. 1, according to the generating of an encryption key and a plurality of partial keys and the distributing of the generated plurality of partial keys which are included in the method of encrypting content described with reference to FIG. 5, according to an exemplary embodiment.

Referring to FIG. 38, the method of encrypting content is a splitting encryption method performed by distributing a private key. The method of encrypting content includes operations that may be processed in a time series by the first through third devices 100 through 300 and the server 400 included in the security system 10 shown in FIG. 1.

In operation S3810, the server 400 generates a key pair consisting of a public key and a private key. For example, the server 400 may generate a public key T that is used for encryption and a private key t that corresponds to the public key T and that is used for decryption.

In operation S3820, the server 400 splits the private key t into at least three parts, and thus, generates at least first through third partial keys. For example, the server 400 may generate first through third partial keys t1 through t3 by splitting the private key t into three parts. For example, the server 400 may split the private key t using the Shamir scheme.

In operation S3830, the server 400 deletes the private key t. For example, the server 400 may delete the private key t, and thus, none of the first through third device 100 through 300 may obtain the entire private key t. Accordingly, the first through third device 100 through 300 may not independently access the encrypted content on their own.

In operation S3840, the server 400 encrypts the first and third partial keys. For example, the server 400 may generate the encrypted first and third partial keys by encrypting the first through third partial keys t1 through t3, so as to ensure security in transmitting the first through third partial keys. Thus, in the transmitting of the encrypted first through third partial keys, devices that are not included in the security group SG may not be able to successfully obtain the first through third partial keys.

In operation S3850a, the server 400 transmits the public key and the encrypted first partial key to the first device 100. In operation S3850b, the server 400 transmits the public key and the encrypted second partial key to the second device

200. In operation S3850c, the server 400 transmits the public key and the encrypted third partial key to the third device 300. For example, the server 400 may transmit the public key and the encrypted first through third partial keys to the first through third devices 100 through 300 via a wireless communication.

In operation S3860a, the first device 100 stores the public key and the first partial key. In operation S3860b, the second device 200 stores the public key and the second partial key. In operation S3860c, the third device 300 stores the public key and the third partial key. For example, in operations S3860a-S3860c, the first through third devices 100 through 300 may extract the first through third partial keys by respectively decrypting the encrypted first through third partial keys. Additionally, because the first through third devices 100 through 300 have the public key T, any of the first through third users USER1 through USER3 of the first through third devices 100 through 300 may encrypt the content using the public key T.

Figure 39:
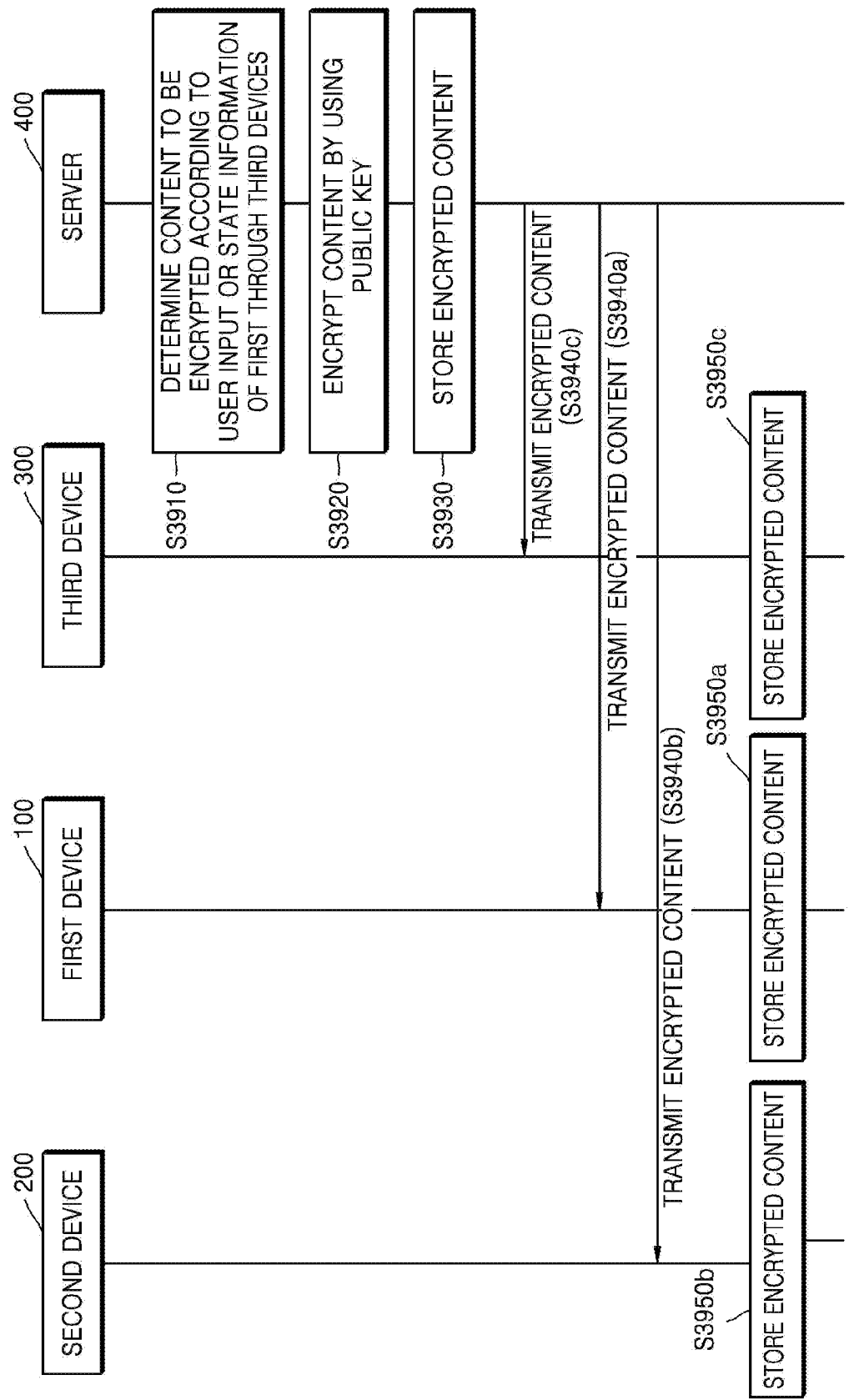
FIG. 39 illustrates a flowchart showing an example of an operation of the security group shown in FIG. 1, according to the encrypting and the storing of the encrypted content which are included in the method of encrypting content shown in FIG. 5, according to an exemplary embodiment.

FIG. 39 illustrates a flowchart showing an example of an operation of the security system 10 shown in FIG. 1, according to the encrypting and the storing of the encrypted content which are included in the method of encrypting content shown in FIG. 5, according to an exemplary embodiment.

Referring to FIG. 39, the method of encrypting content may be performed after the method of encrypting content described with reference to the example of FIG. 38 is performed. Additionally, the method of encrypting content may include operations that are performed in a time series by the first through third devices 100 through 300 and the server 400 which are included in the security system 10 shown in FIG. 1.

In operation S3910, the server 400 determines content that is to be encrypted, according to a user input or state information of the first through third devices 100 through 300. For example, the first user USER1 may manually determine content stored in the first device 100 or the server 400 as content that is to be encrypted, via a user input. Alternatively, content stored in the first device 100 or the server 400 may be automatically determined as content that is to be encrypted, according to state information of the first through third devices 100 through 300.

In operation S3920, the server 400 encrypts the content using a public key. For example, the server 400 may encrypt content using a symmetric key s, and encrypt the symmetric key s using a public key T. In operation S3930, the server 400 stores the encrypted content.

The server then transmits the encrypted content to the plurality of devices. In operation S3940a, the server 400 transmits the encrypted content to the first device 100. In operation S3940b, the server 400 transmits the encrypted content to the second device 200. In operation S3940c, the server 400 transmits the encrypted content to the third device 300.

In operation S3950a, the first device 100 stores the encrypted content. In operation S3950b, the second device 200 stores the encrypted content. In operation S3950c, the third device 300 stores the encrypted content. For example, the first through third devices 100 through 300 may store the encrypted content in a security zone such as TrustZone.

Figure 40:
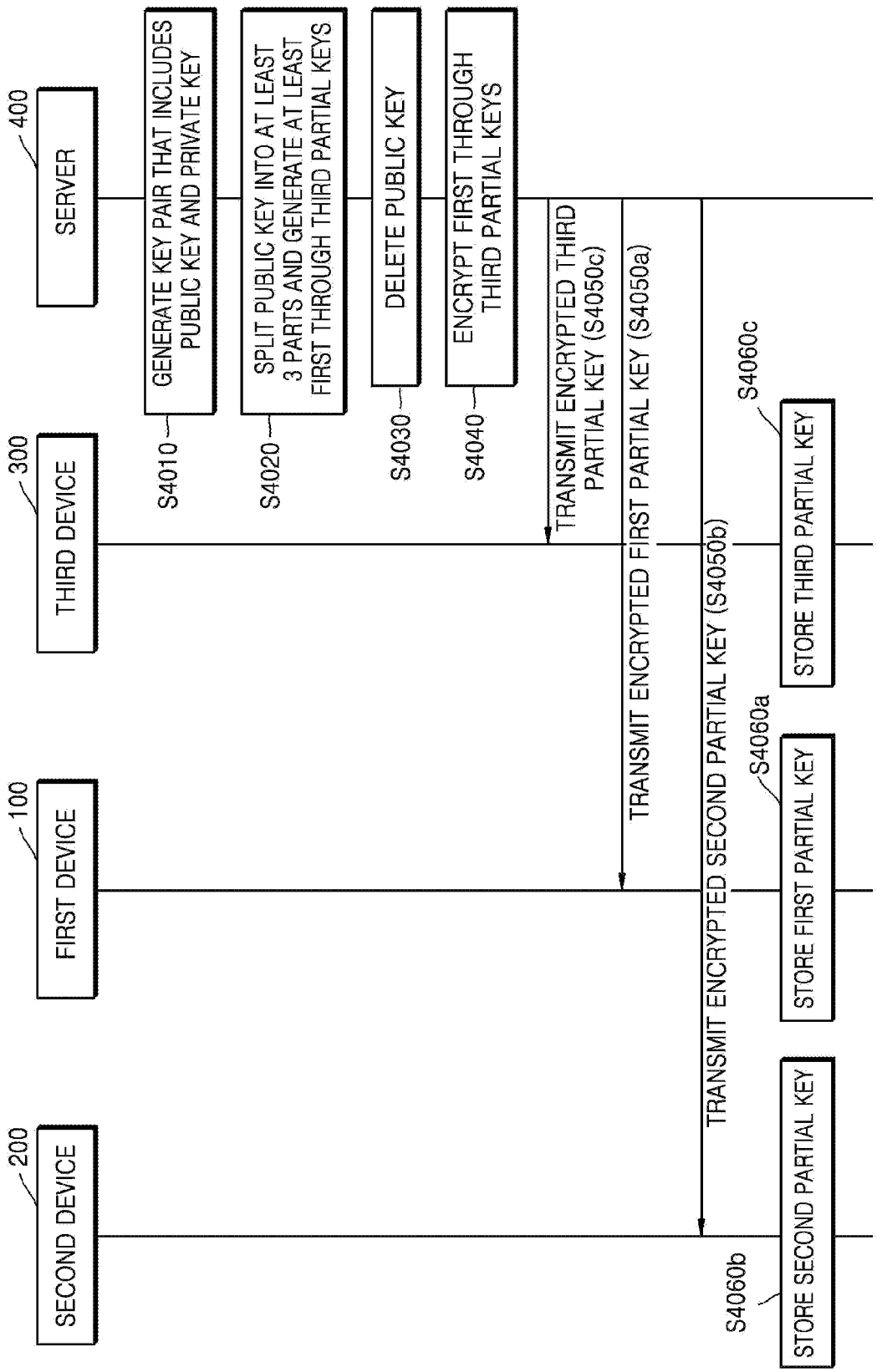
FIG. 40 illustrates a flowchart showing another example of an operation of the security group shown in FIG. 1, according to the generating of an encryption key and a plurality of partial keys and the distributing of the generated plurality of partial keys which are included in the method of encrypting content described with reference to FIG. 5, according to an exemplary embodiment.

FIG. 40 illustrates a flowchart showing another example of an operation of the security system 10 shown in FIG. 1, according to the generating of an encryption key and a plurality of partial keys and the distributing of the generated plurality of partial keys which are included in the method of encrypting content described with reference to FIG. 5, according to an exemplary embodiment.

Referring to FIG. 40, the method of encrypting content includes a splitting encryption method performed by distributing a private key. The method of encrypting content includes operations that may be processed in a time series by the first through third devices 100 through 300 and the server 400 included in the security system 10 shown in FIG. 1.

In operation S4010, the server 400 generates a key pair consisting of a public key and a private key. For example, the server 400 may generate a public key T that is used for encryption and a private key t that corresponds to the public key T and that is used for decryption. In operation S4020, the server 400 splits the public key T into at least three parts, and thus, generates at least first through third partial keys. For example, the server 400 may split the public key T into three parts, and thus, generate first through third partial keys T1 through T3.

In operation S4030, the server 400 deletes the public key. In operation S4040, the server 400 encrypts the first and third partial keys. For example, the server 400 may generate the encrypted first and third partial keys by respectively encrypting the first through third partial keys T1 through T3, so as to protect and ensure security in transmitting the encrypted first through third partial keys T1 through T3.

In operation S4050a, the server 400 transmits the encrypted first partial key to the first device 100. In operation S4050b, the server 400 transmits the encrypted second partial key to the second device 200. Likewise, in operation S4050c, the server 400 transmits the encrypted third partial key to the third device 300. In operation S4060a, the first device 100 stores the first partial key. In operation S4060b, the second device 200 stores the second partial key. In operation S4060c, the third device 300 stores the third partial key.

Figure 41:
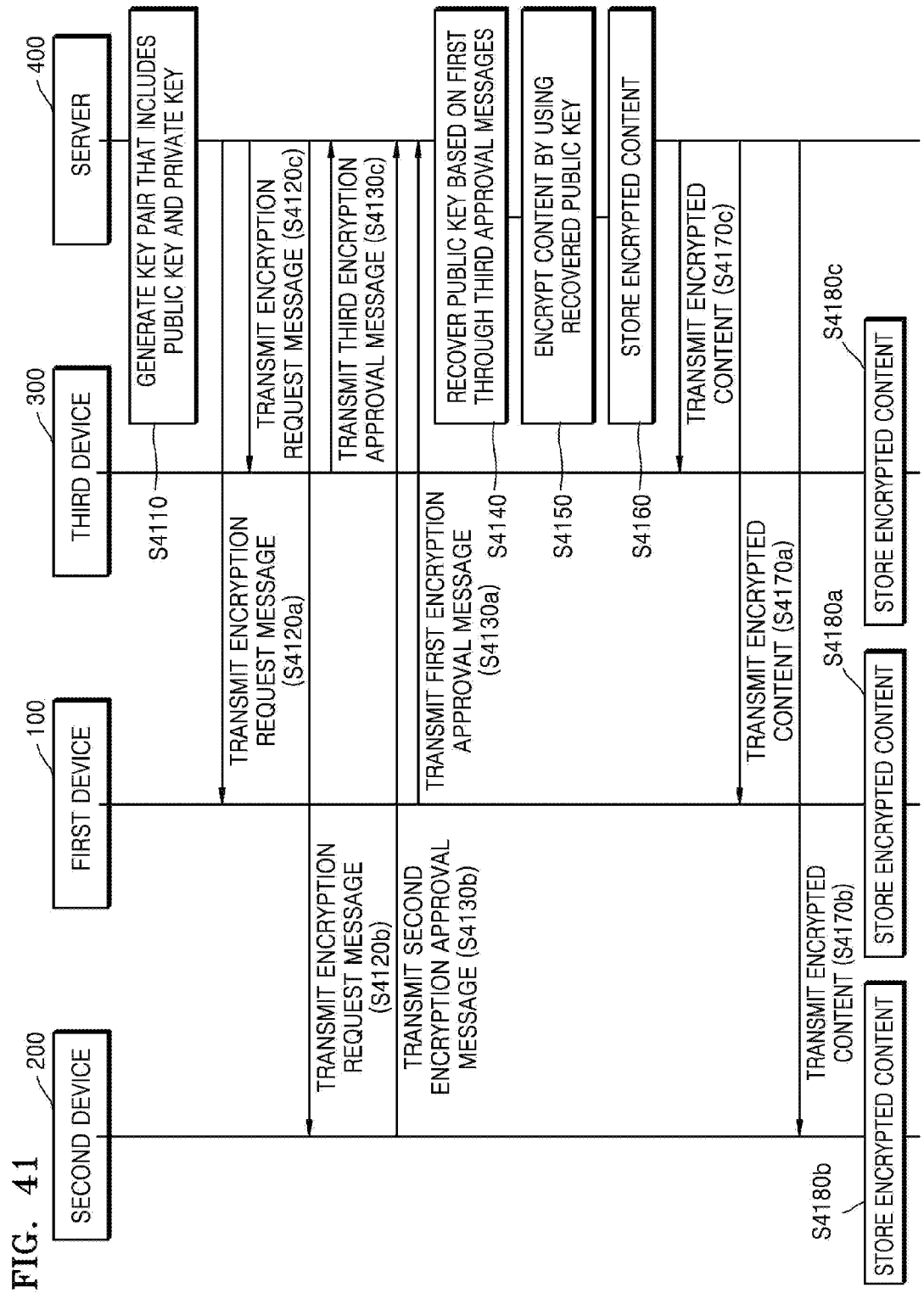
FIG. 41 illustrates a flowchart showing another example of an operation of the security group shown in FIG. 1, according to the encrypting and the storing of the encrypted content which are included in the method of encrypting content shown in FIG. 5, according to an exemplary embodiment.

FIG. 41 illustrates a flowchart showing another example of an operation of the security system 10 shown in FIG. 1, according to the encrypting and the storing of the encrypted content which are included in the method of encrypting content shown in FIG. 5, according to an exemplary embodiment.

Referring to FIG. 41, the method of encrypting content may be performed after the method of encrypting content described with reference to FIG. 40 is performed. Additionally, the method of encrypting content may include operations that are performed in a time series by the first through third devices 100 through 300 and the server 400 which are included in the security system 10 shown in FIG. 41.

In operation S4110, the server 400 determines content that is to be encrypted, for example, according to a user input or state information of the first through third devices 100 through 300. In operation S4120a, the server 400 transmits an encryption request message to the first device 100. In operation S4120b, the server 400 transmits an encryption request message to the second device 200. Likewise, in operation S4120c, the server 400 transmits an encryption request message to the third device 300.

In operation S4130a, the first device 100 transmits a first encryption approval message to the server 400. For example, the first encryption approval message may include an encryption value of the first partial key T1 that is stored in the first device 100. In operation S4130b, the second device 200 transmits a second encryption approval message to the server 400. For example, the second encryption approval message may include an encryption value of the second partial key T2 that is stored in the second device 200. In operation S4130c, the third device 300 transmits a third encryption approval message to the server 400. For example, the third encryption approval message may include an encryption value of the third partial key T3 that is stored in the third device 300.

In operation S4140, the server 400 recovers a public key based on the first through third encryption approval messages. In operation S4150, the server 400 encrypts content using the recovered public key. In operation S4160, the server 400 stores the encrypted content.

In operation S4170a, the server 400 transmits the encrypted content to the first device 100. In operation S4170b, the server 400 transmits the encrypted content to the second device 200. Likewise, in operation S4170c, the server 400 transmits the encrypted content to the third device 300.

In operation S4180a, the first device 100 stores the encrypted content. In operation S4180b, the second device 200 stores the encrypted content. In operation S4180c, the third device 300 stores the encrypted content. As a non-limiting example, the first through third devices 100 through 300 may store the encrypted content in a security zone such as Trust Zone.

Figure 42:
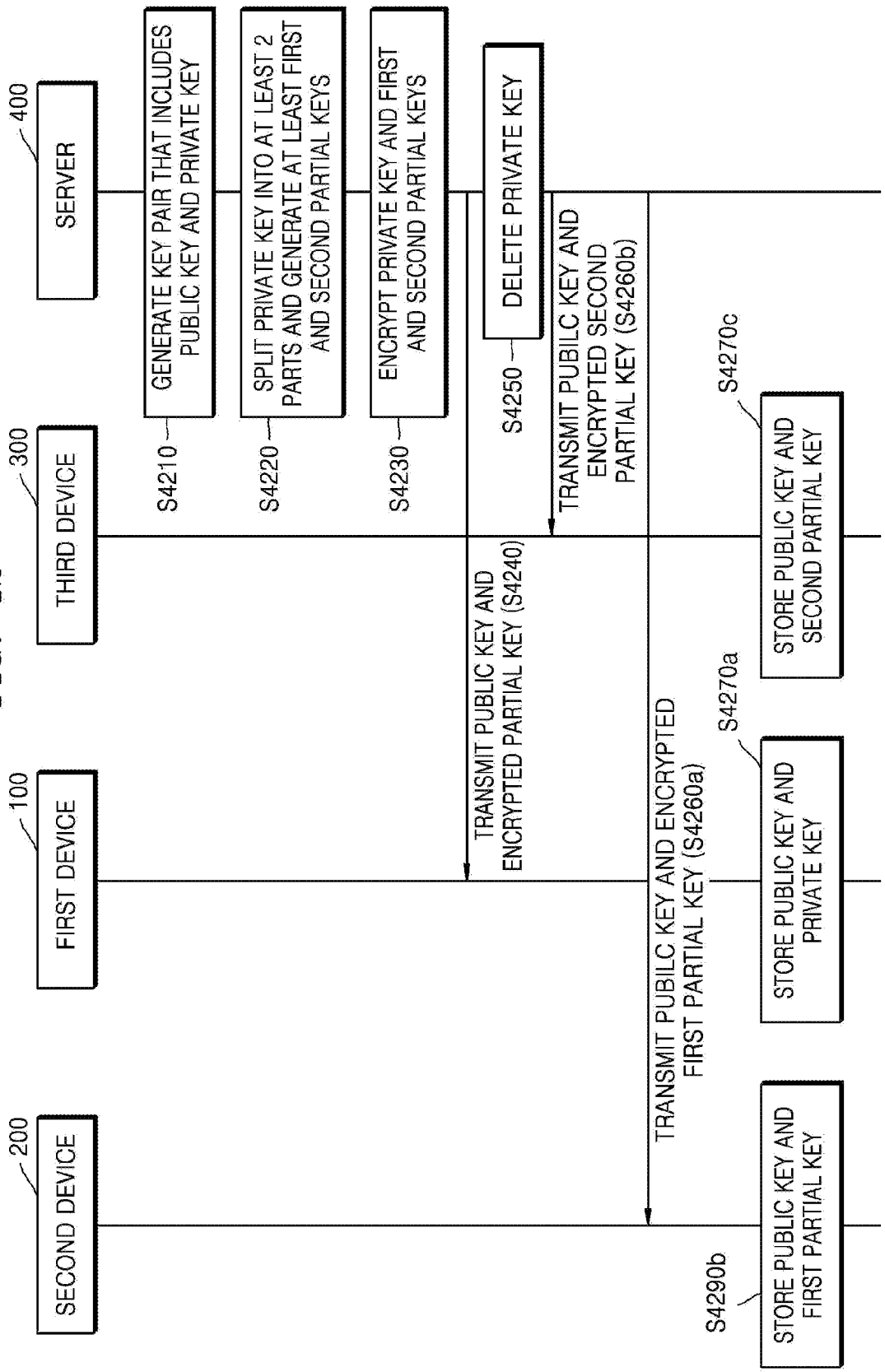
FIG. 42 illustrates a flowchart showing another example of an operation of the security group shown in FIG. 1, according to the generating of an encryption key and a plurality of partial keys and the distributing of the generated plurality of partial keys which are included in the method of encrypting content described with reference to FIG. 5, according to an exemplary embodiment.

FIG. 42 illustrates a flowchart showing another example of an operation of the security system 10 shown in FIG. 1, according to the generating of an encryption key and a plurality of partial keys and the distributing of the generated plurality of partial keys which are included in the method of encrypting content described with reference to FIG. 5, according to an exemplary embodiment.

Referring to FIG. 42, the method of encrypting content includes a modified splitting encryption method that is performed by distributing a private key. The method of encrypting content includes operations that may be processed in a time series by the first through third devices 100 through 300 and the server 400 which are included in the security system 10 shown in FIG. 1.

In operation S4210, the server 400 generates a key pair consisting of a public key T and a private key t. In operation S4220, the server 400 splits the private key t into at least two parts, and thus, generates at least first and second partial keys t1 and t2. In operation S4230, the server 400 encrypts the private key t and the first and second partial keys t1 and t2.

In operation S4240, the server 400 transmits the public key and the encrypted private key to the first device 100. In operation S4250, the server 400 deletes the private key t. In operation S4260a, the server 400 transmits the public key and the encrypted first partial key to the second device 200. In operation S4260b, the server 400 transmits the public key and the encrypted second partial key to the third device 300.

In operation S4270a, the first device 100 stores the public key and the private key t. In this example, the first device 100 may independently encrypt the content using the public key T, and independently decrypt the content using the private key t.

In operation S4270b, the second device 200 stores the public key and the first partial key. In operation S4270c, the third device 300 stores the public key and the second partial key. For example, the second and third devices 200 and 300 may extract the first and second partial keys, respectively, by decrypting the encrypted first and second partial keys.

Because the second and third devices 200 and 300 have the public key T, any of the second and third users USER2 and USER3 of the second and third devices 200 and 300 may encrypt the content using the public key T. However, because the second and third devices 200 and 300 respectively have the first and second partial keys t1 and t2, the second and third devices 200 and 300 may not independently decrypt the content, and instead may only decrypt content when the second and third devices 200 and 300 are both accessing a virtual space at the same time.

In this example, the encrypting of content and the storing of the encrypted content are substantially similar to the encrypting and the storing that is described with reference to FIG. 39. Thus, a detailed description thereof is not provided here.

Figure 43:
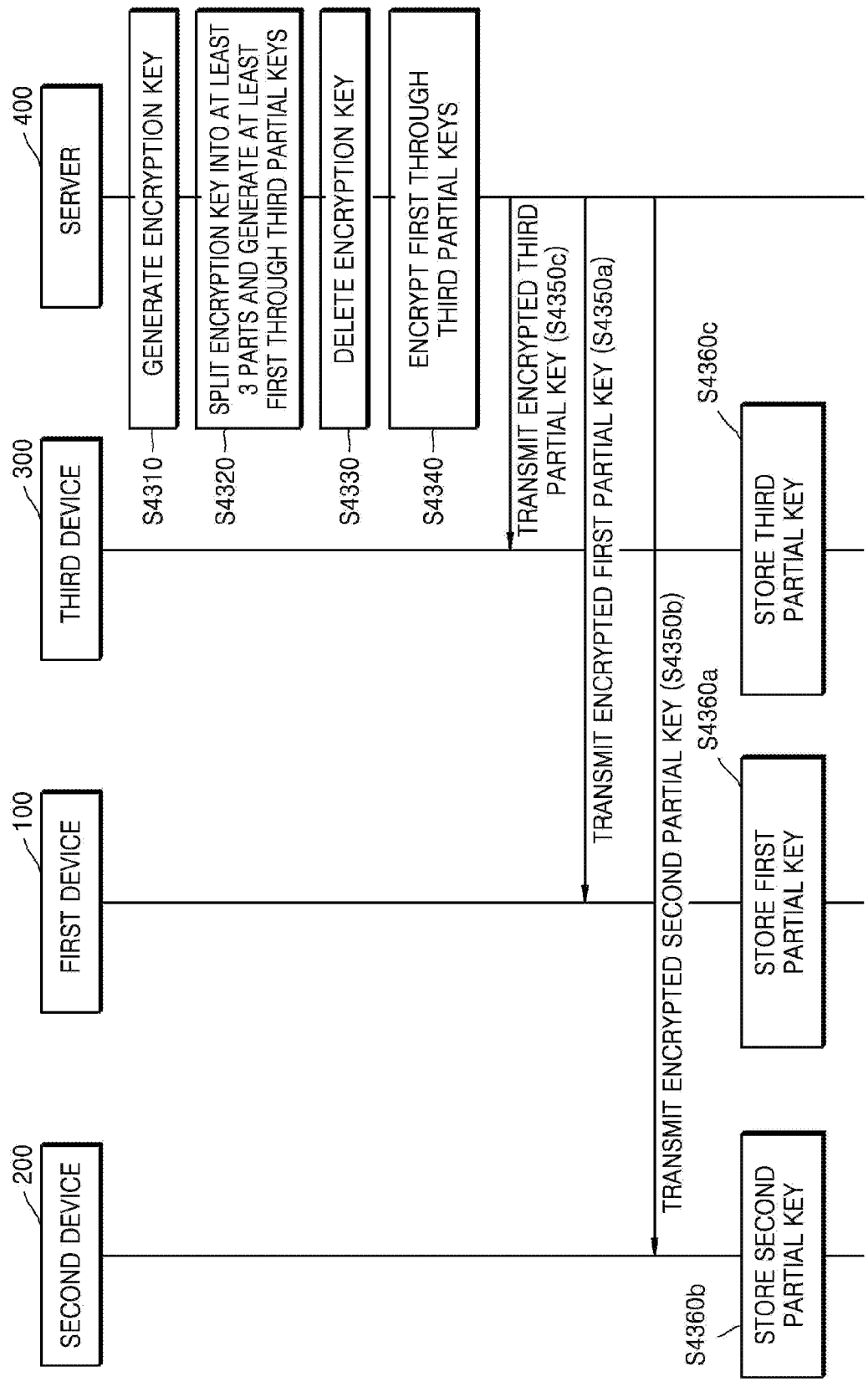
FIG. 43 illustrates a flowchart showing another example of an operation of the security group shown in FIG. 1, according to the generating of an encryption key and a plurality of partial keys and the distributing of the generated plurality of partial keys which are included in the method of encrypting content described with reference to FIG. 5, according to an exemplary embodiment.

FIG. 43 illustrates a flowchart showing another example of an operation of the security system 10 shown in FIG. 1, according to the generating of an encryption key and a plurality of partial keys and the distributing of the generated plurality of partial keys which are included in the method of encrypting content described with reference to FIG. 5, according to an exemplary embodiment.

Referring to FIG. 43, the method of encrypting content includes a splitting encryption method performed by distributing a private key. The method of encrypting content includes operations that may be processed in a time series by the first through third devices 100 through 300 and the server 400 which are included in the security system 10 shown in FIG. 1.

In operation S4310, the server 400 generates an encryption key, that is, a symmetric key. For example, the server 400 may generate an encryption key sk that may be used for encryption. The generated encryption key sk may be also used for decryption.

In operation S4320, the server 400 splits the encryption key into at least three parts, and thus, generates at least first through third partial keys. For example, the server 400 may split the encryption key sk into at least three parts, and thus, generate at least the first through third partial keys sk1 through sk3.

In operation S4330, the server 400 deletes the encryption key. In operation S4340, the server 400 encrypts the first through third partial keys. In operation S4350a, the server 400 transmits the encrypted first partial key to the first device 100. In operation S4350b, the server 400 transmits the encrypted second partial key to the second device 200. Likewise, in operation S4350c, the server 400 transmits the encrypted third partial key to the third device 300.

In operation S4360a, the first device 100 stores the first partial key sk1. In operation S4360b, the second device 200 stores the second partial key sk2. In operation S4360c, the third device 300 stores the third partial key sk3.

Because the first through third devices 100 through 300 have only the first through third partial keys sk1 through sk3, respectively, the first through third users USER1 through USER3 of the first through third devices 100 through 300 may not independently encrypt the content, and may only encrypt content when the first through third devices 100 through 300 access a virtual space at the same time. Additionally, because the first through third devices 100 through 300 use a symmetric encryption/decryption method, the first through third users USER1 through USER3 of the first through third devices 100 through 300 may not independently decrypt the content, and may decrypt content only when the first through third devices 100 through 300 access the virtual space at the same time.

In this example, the encrypting of content and the storing of the encrypted content are substantially similar to the encrypting and the storing that are described with reference to FIG. 41. Thus, a detailed description thereof is not provided here.

Figure 44:
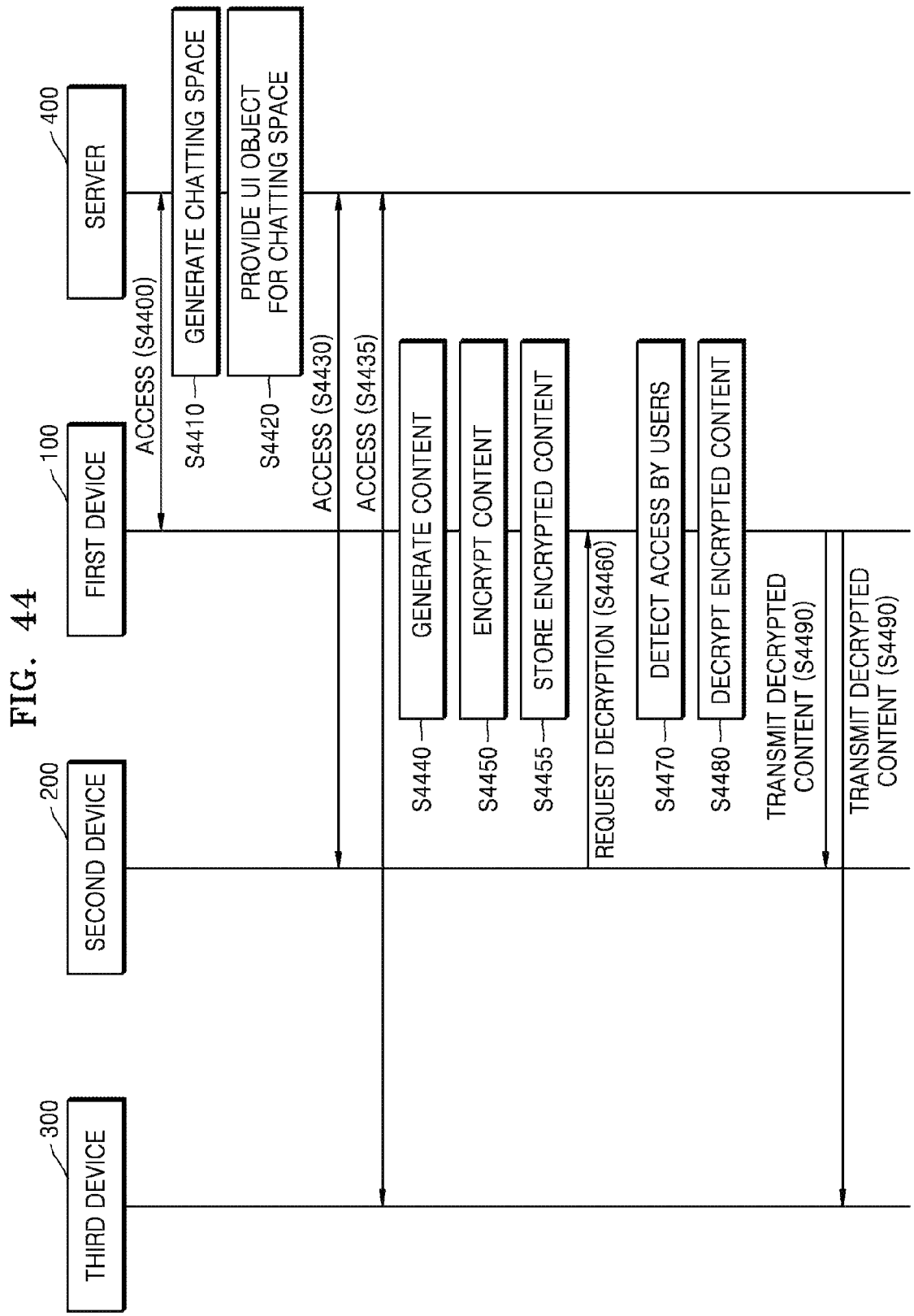
FIG. 44 illustrates a flowchart showing another example of an operation of the security system shown in FIG. 1, according to the method of providing an SNS described with reference to FIG. 3, according to an exemplary embodiment.

FIG. 44 illustrates a flowchart showing another example of an operation of the security system 10 shown in FIG. 1, according to the method of providing an SNS described with reference to FIG. 3.

Referring to FIG. 44, the method of providing a SNS is a method of encrypting content in a virtual space and decrypting encrypted content that was previously shared, if a security group that includes a plurality of users or a plurality of devices accesses the virtual space. The method of providing a SNS includes operations that may be processed in a time series by the first through third devices 100 through 300 and the server 400 which are included in the security system 10 shown in FIG. 1. The current embodiment is a modified embodiment of the examples described with reference to FIGS. 4 and 37. Thus, a description thereof is not provided here again.

In operation S4400, the first device 100 is connected to the server 400. In operation 4410, the server 400 generates a chatting space. In operation S4420, the server 400 provides a UI object corresponding to the chatting space and which may be accessed by a plurality of users. In operation S4430, the second device 200 is connected to the server 400. In operation S4435, the third device 300 is connected to the server 400.

In operation S4440, the first device 100 generates content. In operation S4450, the first device 100 transmits the content to the server 400. For example, the method of encrypting content, which is described with reference to FIGS. 5 through 23, may be applied to the current embodiment. In operation S4455, the first device 100 stores the encrypted content. In the current embodiment, unlike the examples described with reference to FIGS. 4 and 37, the encrypted content may not be stored in the server 400.

In operation S4460, the second device 200 requests decryption of the encrypted content from the first device 100. However, one or more exemplary embodiments are not limited thereto. As another example, the third device 300 may request decryption of the encrypted content from the first device 100. In operation S4770, the first device 100 detects access by the second and third users USER2 and USER3.

In operation S4480, the first device 100 decrypts the encrypted content. An example of an operation of decrypting the encrypted content, which is performed by the first device 100, is described with reference to FIGS. 45 and 46. In operation S4490, the first device 100 transmits the decrypted content to the second and third devices 200 and 300.

According to the above-described example embodiment, both the encrypting of content and the decrypting of content may be performed by the first device 100.

Figure 45:
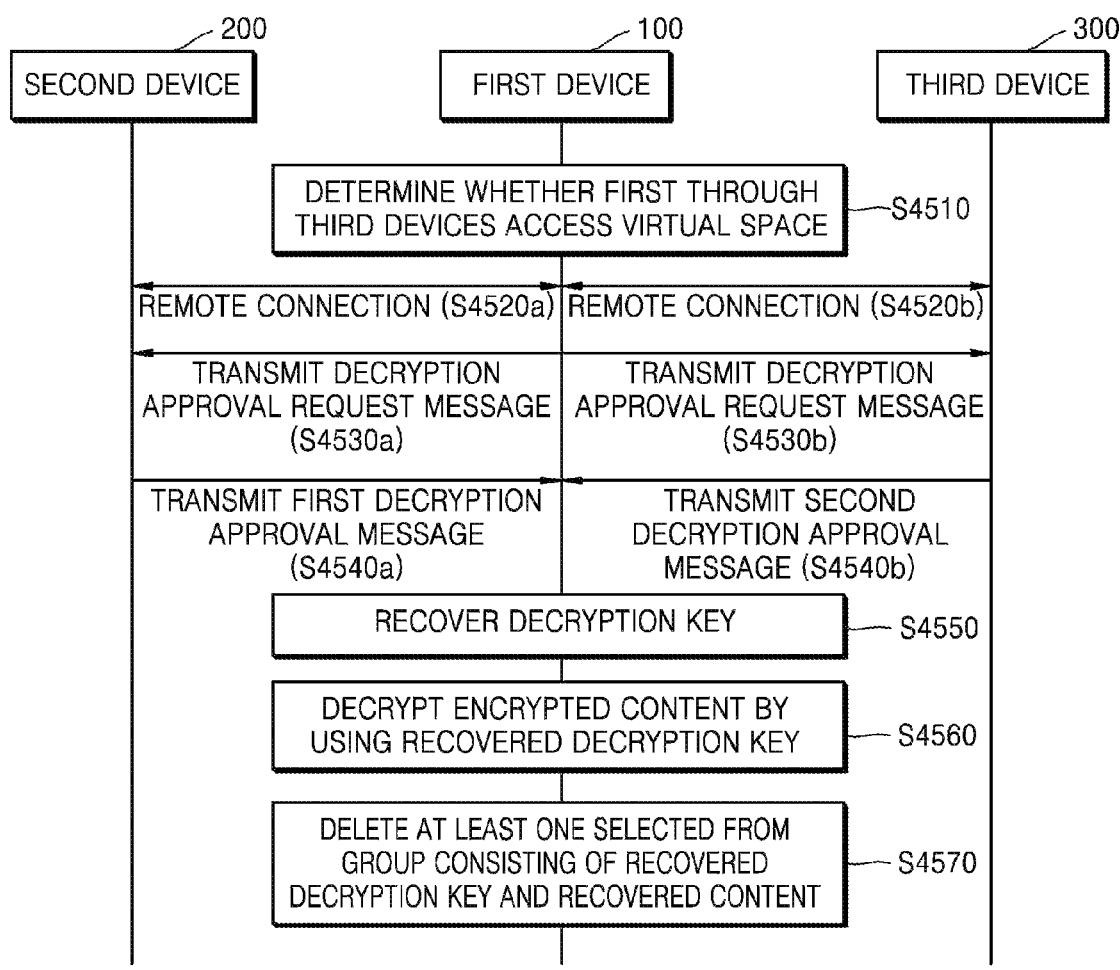
FIG. 45 illustrates a flowchart showing an example of an operation of the security group shown in FIG. 1, according to the method of decrypting content described with reference to FIG. 24, according to an exemplary embodiment.

FIG. 45 illustrates a flowchart showing an example of an operation of the security group SG shown in FIG. 1, according to the method of decrypting content described with reference to FIG. 24, according to an exemplary embodiment.

Referring to FIG. 45, the method of decrypting content includes operations that may be processed in a time series by the first through third devices 100 through 300 which are included in the security group SG shown in FIG. 1.

In operation S4510, the first device 100 determines whether the first through third devices 100 through 300 access a virtual space.

In operation S4520a, the first and second devices 100 and 200 are remotely connected to each other. In operation S4520b, the first and third devices 100 and 300 are remotely connected to each other. Likewise, the second and third devices 200 and 300 may also be remotely connected to each other.

In operation S4530a, the first device 100 transmits a decryption approval request message to the second device 200. In operation S4530b, the first device 100 transmits a decryption approval request message to the third device 300.

In operation S4540a, the second device 200 transmits a first decryption approval message to the first device 100. For example, the first decryption approval message may include an encryption value EncK1(t2) of a second partial key t2 stored in the second device 200. In operation S4540b, the third device 300 transmits a second decryption approval message to the first device 100. For example, the second decryption approval message may include an encryption value $Enc_{K1}(t3)$ of the third partial key t3 stored in the third device 300.

In operation S4550, the first device 100 recovers a decryption key based on the first and second decryption approval messages. For example, the first device 100 may obtain the second and third partial keys t2 and t3, by decrypting the encryption values $Enc_{K1}(t2)$ and $Enc_{K1}(t3)$ of the second and third partial keys t2 and t3, respectively, which are included in the first and second decryption approval messages, using a first identification private key k1. Then, the first device 100 may recover a private key t based on the second and third partial keys t2 and t3 and a first partial key t1 stored in the first device 100 (that is, t=t1+t2+t3).

In operation S4560, the first device 100 decrypts encrypted content using the recovered decryption key. For example, the first device 100 may decrypt a symmetric key s using the recovered private key t (that is, $Dec_t(Enc_T(s))=s$), and decrypt encrypted content using the decrypted symmetric key s (that is, $AES_s(m)=m$).

In operation S4570, the first device 100 deletes at least one of the recovered encryption key and the recovered content. For example, the first device 100 may delete at least one of the recovered encryption key t and the recovered content m.

Figure 46:
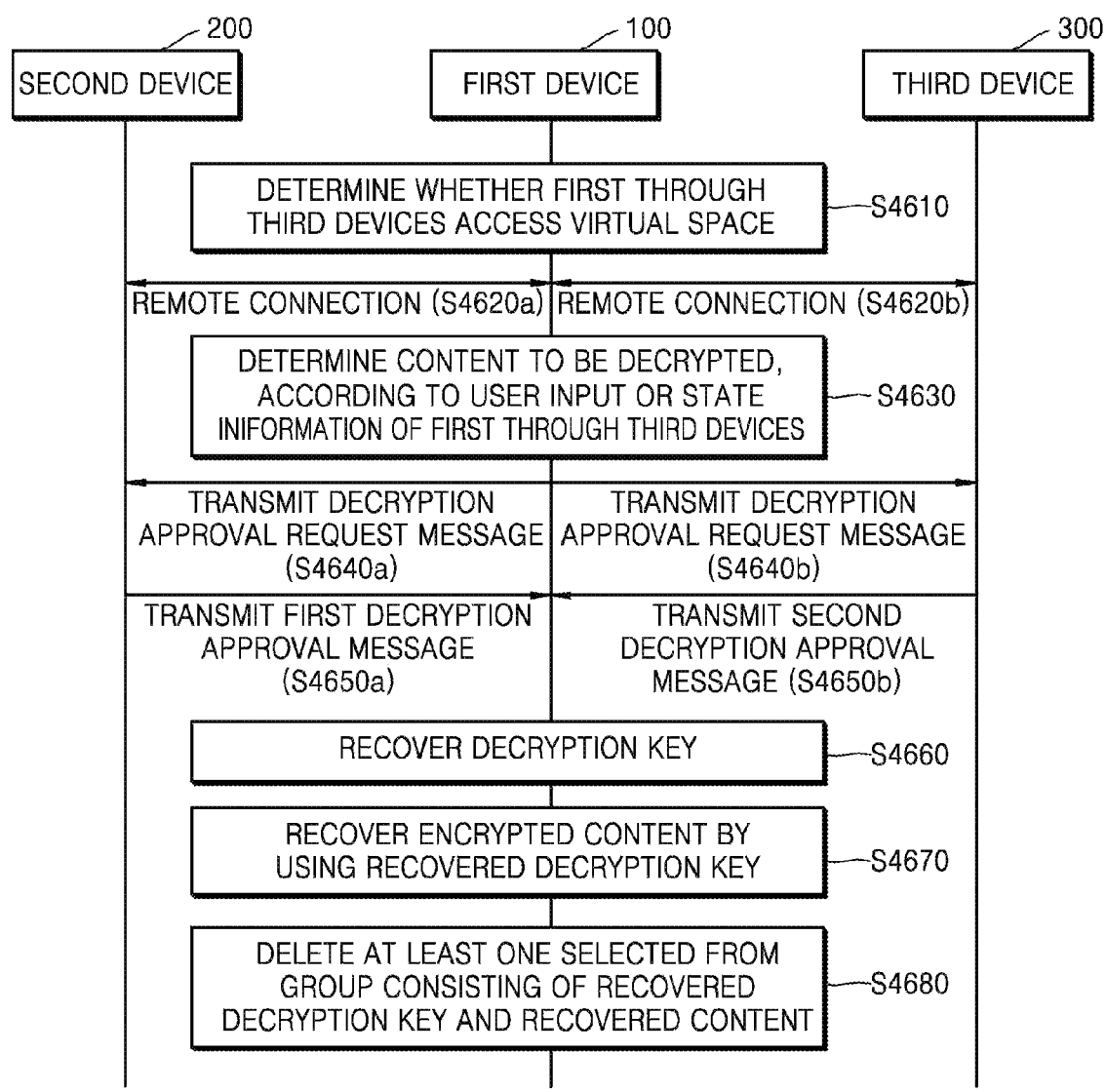
FIG. 46 illustrates a flowchart showing another example of an operation of the security group shown in FIG. 1, according to the method of decrypting content described with reference to FIG. 24, according to an exemplary embodiment.

FIG. 46 illustrates a flowchart showing an example of an operation of the security group SG shown in FIG. 1, according to the method of decrypting content described with reference to FIG. 24, according to an exemplary embodiment.

Referring to FIG. 46, the method of decrypting content includes operations that may be processed in a time series by the first through third devices 100 through 300 which are included in the security group SG shown in FIG. 1.

In operation S4610, the first device 100 determines whether the first through third devices 100 through 300 access a virtual space. In operation S4620a, the first and second devices 100 and 200 are remotely connected to each other. In operation S4620b, the first and third devices 100 and 300 are remotely connected to each other. Likewise, the second and third devices 200 and 300 may also be remotely connected to each other.

In operation S4630, the first device 100 may determine content that is to be decrypted, according to a user input or state information of the first through third devices 100 through 300. For example, the first user USER1 may manually determine encrypted content stored in the first device 100 or a server as content that is to be decrypted, via a user input. Alternatively, encrypted content stored in the first device 100 or a server may be automatically determined as content that is to be decrypted, according to state information of the first through third devices 100 through 300.

In operation S4640a, the first device 100 transmits a decryption approval request message to the second device 200. Likewise, in operation S4640b, the first device 100 transmits a decryption approval request message to the third device 300.

In operation S4650a, the second device 200 transmits a first decryption approval message to the first device 100. For example, the first decryption approval message may include an encryption value $\text{Enc}_{K_1}(t2)$ of a second partial key t2 that is stored in the second device 200. In operation S4650b, the third device 300 transmits a second decryption approval message to the first device 100. For example, the second decryption approval message may include an encryption value $\text{Enc}_{K_1}(t3)$ of the third partial key t3 that is stored in the third device 300.

In operation S4660, the first device 100 recovers a decryption key based on the first and second decryption approval messages. For example, the first device 100 may obtain the second and third partial keys t2 and t3, by decrypting the encryption values $\text{Enc}_{K_1}(t2)$ and $\text{Enc}_{K_1}(t3)$ of the second and third partial keys t2 and t3, respectively, which are included in the first and second decryption approval messages, using a first identification private key k1. Then, the first device 100 may recover a private key t based on the second and third partial keys t2 and t3 and a first partial key t1 stored in the first device 100 (that is, t=t1+t2+t3).

In operation S4670, the first device 100 decrypts encrypted content by using the recovered decryption key. For example, the first device 100 may decrypt a symmetric key s by using the recovered private key t (that is, $\text{Dec}_t(\text{Enc}_T(s))=s$), and decrypt encrypted content by using the decrypted symmetric key s (that is, $\text{AES}_s(m)=m$).

In operation S4680, the first device 100 deletes at least one of the recovered encryption key and the recovered content. For example, the first device 100 may delete at least one of the recovered encryption key t and the recovered content m.

Figure 47:
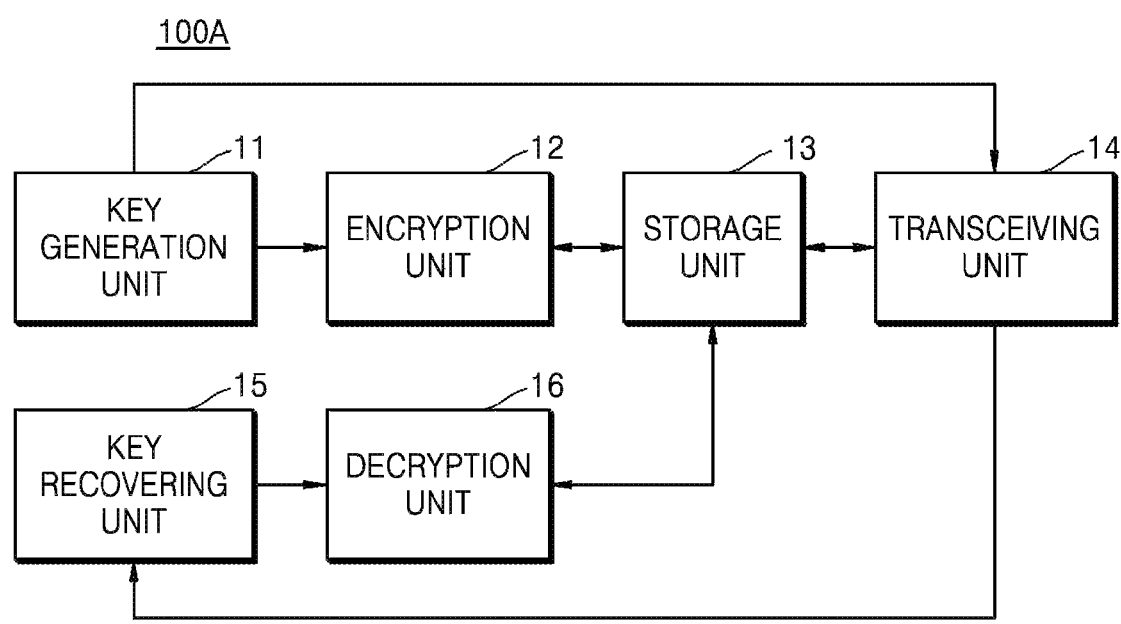
FIG. 47 illustrates a block diagram of a device according to an exemplary embodiment.

FIG. 47 illustrates a block diagram of a device 100A according to an exemplary embodiment.

Referring to FIG. 47, the device 100A includes a key generation unit 11, an encryption unit 12, a storage unit 13, a transceiving unit 14, a key recovering unit 15, and a decryption unit 16. The device 100A may encrypt content that may be shared in a virtual space by a security group which includes a plurality of devices, and decrypt the encrypted content. The device 100A may correspond to one of the plurality of devices included in the security group.

For example, the device 100A may be applicable to all the first through third devices 100 through 300 shown in FIG. 1. Additionally, the device 100A may perform the method of encrypting content and the method of decrypting content described with reference to the examples of FIGS. 1 through 46.

If the device 100A accesses a virtual space, the key generation unit 11 may generate an encryption key and a plurality of partial keys with respect to shared content generated in the virtual space. According to an exemplary embodiment, if an asymmetric encryption method is employed, the key generation unit 11 may generate an encryption key that includes a key pair consisting of a public key and a private key. The key generation unit 11 may generate a plurality of partial keys by splitting the public key or the private key. As another example, if a symmetric encryption method is employed, the key generation unit 11 may generate an encryption key that includes a symmetric key. In this example, the key generation unit 11 may generate a plurality of partial keys by splitting the symmetric key.

The encryption unit 12 may encrypt content using the generated encryption key. For example, the encryption unit 12 may encrypt content using a session key, and encrypt the session key using the encryption key. Additionally, the encryption unit 12 may encrypt the generated plurality of partial keys. If one of a plurality of devices which accessed the virtual space becomes disconnected from the virtual space while decrypted content is being played, the encryption unit 12 may re-encrypt the content that is being played.

According to an exemplary embodiment, if the asymmetric encryption method is employed, the encryption unit 12 may encrypt content using the public key. For example, the encryption unit 12 may encrypt content using the session key, and encrypt the session key using the public key. According to another exemplary embodiment, if the symmetric encryption method is employed, the encryption unit 12 may encrypt content using the symmetric key. For example, the encryption unit 12 may encrypt content using the session key, and encrypt the session key by using the symmetric key.

The storage unit 13 may store at least one selected from the group consisting of encrypted content and decrypted content. Additionally, the storage unit 13 may further store at least one of an encryption key and a partial key. As a non-limiting example, the storage unit 13 may be implemented or may include a security zone such as Trust Zone. After the content is encrypted by the encryption unit 13, the encryption key may be deleted.

The transceiving unit 14 may transmit a plurality of partial keys generated by the key generation unit 11, respectively, to devices included in a security group other than the device 100A. As another example, the transceiving unit 14 may transmit the plurality of partial keys encrypted by the encryption unit 12, respectively, to devices included in a security group other than the device 100A. Additionally, the transceiving unit 14 may transmit the encrypted content stored in the storage unit 13, to at least one of the other devices included in the security group.

If decryption approvals are remotely obtained from devices amounting to a value that is equal to or greater than a threshold value, from among the plurality of devices included in the security group, the key recovering unit 15 may recover a decryption key from the plurality of partial keys stored in each of the devices amounting to the value equal to or greater than the threshold value. Here, the decryption key may correspond to the encryption key generated by the key generation unit 11.

The decryption unit 16 may decrypt the encrypted content using the recovered decryption key. According to an exemplary embodiment, the decryption unit 16 may decrypt the encrypted session key using the recovered decryption key, and decrypt the encrypted content using the decrypted session key. Additionally, after the encrypted content is decrypted, at least one of the decryption key and the decrypted content may be deleted.

In this example, if at least one of the plurality of devices which have accessed the virtual space is disconnected from the virtual space, at least one of the key recovering unit 15 and the decryption unit 16 may stop operation, and the encryption unit 12 may re-encrypt the decrypted content.

In the current embodiment, the key generation unit 11, the encryption unit 12, the key recovering unit 15, and the decryption unit 16 may be implemented as a plurality of programs, and stored in a memory in the device 100A. For example, a control unit included in the device 100A may access the memory, and execute operations such as key generation, encryption, key recovery, decryption, and the like. Additionally, the storage unit 13 may be implemented as a part of an area of the memory in the device 100A. Also, the transceiving unit 14 may be implemented as a part of a communication unit included in the device 100A. Hereinafter, an exemplary embodiment of hardware of a device is described with reference to FIG. 48.

Figure 48:
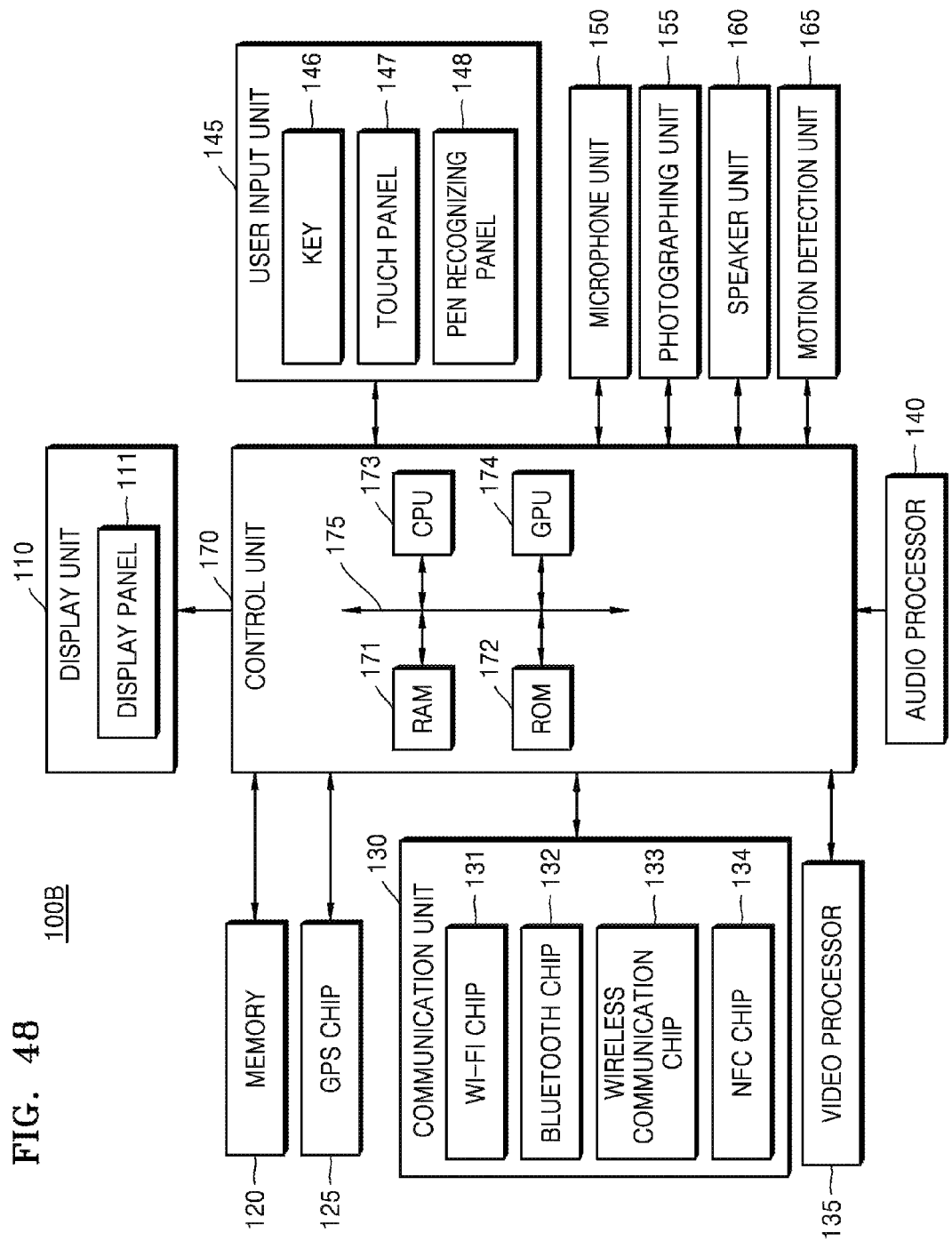
FIG. 48 illustrates a block diagram illustrating a configuration of the device according to an exemplary embodiment.

FIG. 48 illustrates a block diagram of a configuration of the device 100B according to an exemplary embodiment.

Referring to FIG. 48, a configuration of the device 100B may be applicable to all of the first through third devices 100 through 300, described with reference to FIG. 1. The configuration of the device 100B may be applied to various types of a device, for example, a cellular phone, a tablet PC, a PDA, an MP3 player, a kiosk, an electronic picture frame, a navigation system, a digital TV, a wearable device such as a wrist watch or a head-mounted display (HMD), and the like.

Referring to FIG. 48, the device 100B includes a display unit 110, a control unit 170, a memory 120, a GPS chip 125, a communication unit 130, a video processor 135, an audio processor 140, a user input unit 145, a microphone unit 150, a photographing unit 155, a speaker unit 160, and a motion detection unit 165.

The display unit 110 may include a display panel 111 and a controller (not shown) for controlling the display panel 111. The display panel 111 may be include various types of a display such as a liquid-crystal display (LCD), an organic light-emitting diode (OLED) display, an active-matrix organic light-emitting diode (AMOLED) display, a plasma display panel (PDP), and the like. The display panel 111 may be flexible, transparent, wearable, and the like. The display unit 110 and the touch panel 147 included in the user input unit 145 may be combined with each other to constitute a touchscreen (not shown). For example, the touch screen may include a module formed as one body in which the display panel 111 and the touch panel 147 form a layered structure.

The memory 120 may include at least one of an internal memory (not shown) and an external memory (not shown).

The internal memory may include, for example, at least one of a volatile memory (for example, a dynamic random access memory (DRAM), a static random access memory (RAM), a synchronous DRAM (SDRAM), or the like), a non-volatile memory (for example, a one-time programmable read-only memory (OTPROM), a programmable read-only memory (PROM), an erasable and programmable read-only memory (EPROM), an electrically erasable and programmable read-only memory (EEPROM), a mask read-only memory (ROM), a flash ROM, or the like), a hard-disk driver (HDD), and a solid-state driver (SSD). According to an exemplary embodiment, the control unit 170 may load a command or data that is received from at least one of the non-volatile memory and other elements, to the volatile memory, and process the command or data. The control unit 170 may save data that is received or generated from another element, in the non-volatile memory.

The external memory may include, for example, at least one of a compact flash (CF), secure digital (SD), micro secure digital (micro-SD), mini secure digital (mini-SD), extreme digital (xD), a memory stick, and the like.

The memory 120 may store various programs and data used for operation of the device 100B. For example, the memory 120 may temporarily or non-permanently store at least a part of a key generation program and an encryption program for encrypting content, and a key recovering program and a decryption program for decrypting content. As another example, the memory 120 may temporarily or non-permanently store at least a part of encrypted content and decrypted content.

The control unit 170 may control the display unit 110 to display a part of content stored in the memory on the display unit 110. For example, the control unit 170 may display a part of the content stored in the memory 120 on the display unit 110. As another example, if a user gesture is performed on an area of the display unit 110, the control unit 170 may perform a control operation in correspondence with the user gesture.

For example, the control unit 170 may include at least one of a RAM 171, a ROM 172, a central processing unit (CPU) 173, a graphic processing unit (GPU) 174, and a bus 175. In this example, the RAM 171, the ROM 172, the CPU 173, and the GPU 174 may be connected to each other via the bus 175.

The CPU 173 accesses the memory 120, and may perform booting using an operating system (OS) stored in the memory 120. The CPU 173 may perform various operations by using various programs, content, or data stored in the memory 120.

The ROM 172 stores a command set for system booting. As an example, if a turn-on command is input and power is supplied to the device 100B such as a mobile terminal 100B, the CPU 173 may copy the OS stored in the memory 120 to the RAM 171 according to the command stored in the ROM 172, and boot the mobile terminal 100B by executing the OS. When the booting is completed, the CPU 173 copies various programs stored in the memory to the RAM 171, and executes the programs copied to the RAM 171 to perform various operations.

When the booting of the device 100B is completed, the GPU 174 displays a user interface (UI) screen on an area of the display unit 110. For example, the GPU 174 may generate a screen on which an electronic document that includes various objects such as content, an icon, a menu, and the like, may be displayed. The GPU 174 calculates attribute values such as a coordinate value, a shape, a size, a color, and the like, with respect to each object, according to a layout of the screen. Then, the GPU 174 may generate a screen having various types of layouts that include an object, based on the calculated attribute value. The screen generated by the GPU 174 may be provided to the display unit 110, and displayed on an area of the display unit 110.

The GPS chip 125 may receive a GPS signal from a GPS satellite, and calculate a current location of the device 100B. For example, the control unit 170 may calculate a location of a user by using the GPS chip 125, if a navigation program is used or a current location of the user is needed.

The communication unit 130 may perform communication with various types of external devices according to various types of communication methods. For example, the communication unit 130 may include at least one of a WiFi chip 131, a Bluetooth chip 132, a wireless communication chip 133, and an NFC chip 134. The control unit 170 may perform communication with various external devices using the communication unit 130.

The WiFi chip 131 and the Bluetooth chip 132 may respectively perform communication using a WiFi method and a Bluetooth method. If the WiFi chip 131 or the Bluetooth chip 132 is employed, various connection information, such as a service set identifier (SSID), a session key, etc., may be transceived in advance. Then, communication may be performed using the connection information so as to transceive various information. The wireless communication chip 133 may refer to a chip for performing communication according to various communication standards such as IEEE, ZigBee, 3$^{rd}$ generation (3G), 3$^{rd}$ generation partnership project (3GPP), long-term evolution (LTE), and the like. The NFC chip 134 refers to a chip that operates according to an NFC method by using 13.56 MHz, from among various RFID frequency bands such as 135 kHz, 13.56 MHz, 433 MHz, 860 to 960 MHz, 2.45 GHz, etc.

The video processor 135 may process video data included in content received via the communication unit 130 or content stored in the memory 120. The video processor 135 may perform various image processes such as decoding, scaling, noise filtering, a frame rate conversion, or a resolution conversion, on the video data.

The audio processor 140 may process audio data included in content received via the communication unit 130, or content stored in the memory 120. The audio processor 140 may perform various processes such as decoding, amplification, or noise filtering, on the audio data.

If a playback program of multimedia content is executed, the control unit 170 may play the multimedia content by driving the video processor 135 and the audio processor 140. The speaker unit 160 may output audio data that is generated by the audio processor 140.

The user input unit 145 may receive an input of various commands from a user. For example, the user input unit 145 may include at least one selected from the group consisting of a key 146, a touch panel 147, and a pen recognition panel 148.

The key 146 may be various types of key such as a mechanical button or a wheel, which may be formed at various areas such as at a front or a side of an outer surface of the device 100B.

The touch panel 147 may detect a touch input by a user and output a touch event value corresponding to a signal of the detected touch input. For example, if the touch panel 147 and the display panel 111 are combined with each other to constitute a touch screen, the touch screen may be implemented using various types of touch sensors such as a capacitive type, a resistive type, or a piezoelectric type. The capacitive touch screen may be formed using a method of detecting micro-electricity generated from a body of a user when a part of the body of the user touches a surface of the touch screen and calculating a coordinate of the touched location, using a dielectric material coated on a surface of the touch screen. The resistive touch screen may be formed using a method of detecting current flowing, where, if a user touches a touch screen that includes two built-in electrode plates, an upper electrode plate and a lower electrode plate between the two built-in electrode plates contact each other at a touched location of the touch screen, and a coordinate of the touched location of the touchscreen may be calculated. A touch event that occurs on the touch screen may be generated by a finger of a person, or may also be generated by a conductive material that may change electrostatic capacity.

A pen recognition panel 148 may detect a proximity touch input or a touch input of a touch pen used by a user (for example, a stylus pen or a digitizer pen), and output an event of the detected proximity input or the detected touch input of the touch pen. For example, the pen recognition panel 148 may be implemented using an electromagnetic radiation (EMR) method and may detect a touch input or a proximity input according to a change in strength of an electromagnetic field as the touch pen comes near or touches the pen recognition panel. For example, the pen recognition panel 148 may include an electromagnetic induction coil sensor that has a grid structure and an electric signal processor that provides an alternating current (AC) signal having a predetermined frequency sequentially to each loop coil of the electromagnetic induction coil sensor. If a pen having a resonant circuit is placed within a vicinity of a loop coil of the pen recognition panel 148, a magnetic field transmitted from the loop coil may generate current based on mutual electromagnetic induction through the resonant circuit of the pen. Based on the current, an induction field may be generated from the coil of the resonant circuit in the pen, and the pen recognition panel 148 may detect the induction field using a loop coil that is in a signal reception state, thereby sensing a proximity location or a touch location of the pen. The pen recognition panel 148 may be located below the display panel 111 and may have a certain area, for example, an area that may cover a display area of the display panel 111.

The microphone unit 150 may receive a vocal or audio input of a user voice or other sound and convert the user voice or the other sound into audio data. The control unit 170 may use the user voice or user speech, input via the microphone 150, for a phone call operation, or may convert the user voice or user speech into audio data and store the user voice or user speech in the memory 120.

The photographing unit 155 may capture a still image or a moving image according to perform control by a user. A plurality of the photographing units 155 such as a front camera and a rear camera may be included.

If the photographing unit 155 and the microphone unit 150 are provided, the control unit 170 may perform a control operation according to a user voice or speech input via the microphone unit 150 or a motion of a user recognized by the photographing unit 155. For example, the device 100B may operate in a motion control mode or a voice control mode. If the device 100B operates in the motion control mode, the control unit 170 may activate the photographing unit 155 to capture an image of the user, track a change in the motion of the user, and then, perform a control operation corresponding to the change in the motion of the user. If the device 100B operates in the voice control mode, the control unit 170 may operate in a voice recognition mode in which user speech input via the microphone unit 150 is analyzed, and a control operation may be performed according to the analyzed user speech.

The motion detection unit 165 may detect movement of a main body of the device 100B. For example, the device 100B may be rotated or tilted in various directions. The motion detection unit 165 may detect movement characteristics such as a rotation direction, an angle, or an inclination using at least one of various sensors such as a geo-magnetic sensor, a gyroscope sensor, and an acceleration sensor.

Additionally, although not shown in FIG. 36, according to other exemplary embodiments, the device 100B may further include a universal serial bus (USB) port to which a USB connector may be connected, various external input ports for connecting to various external terminals such as a headset, a mouse, or a LAN, a digital multimedia broadcasting (DMB) chip for receiving and processing a DMB signal, various sensors, and the like.

Elements of the device 100B may be named differently. Additionally, the device 100B may include at least one of the above-described elements. It may be further understood that some elements may not be included, or additional elements may be further included.

Figure 49:
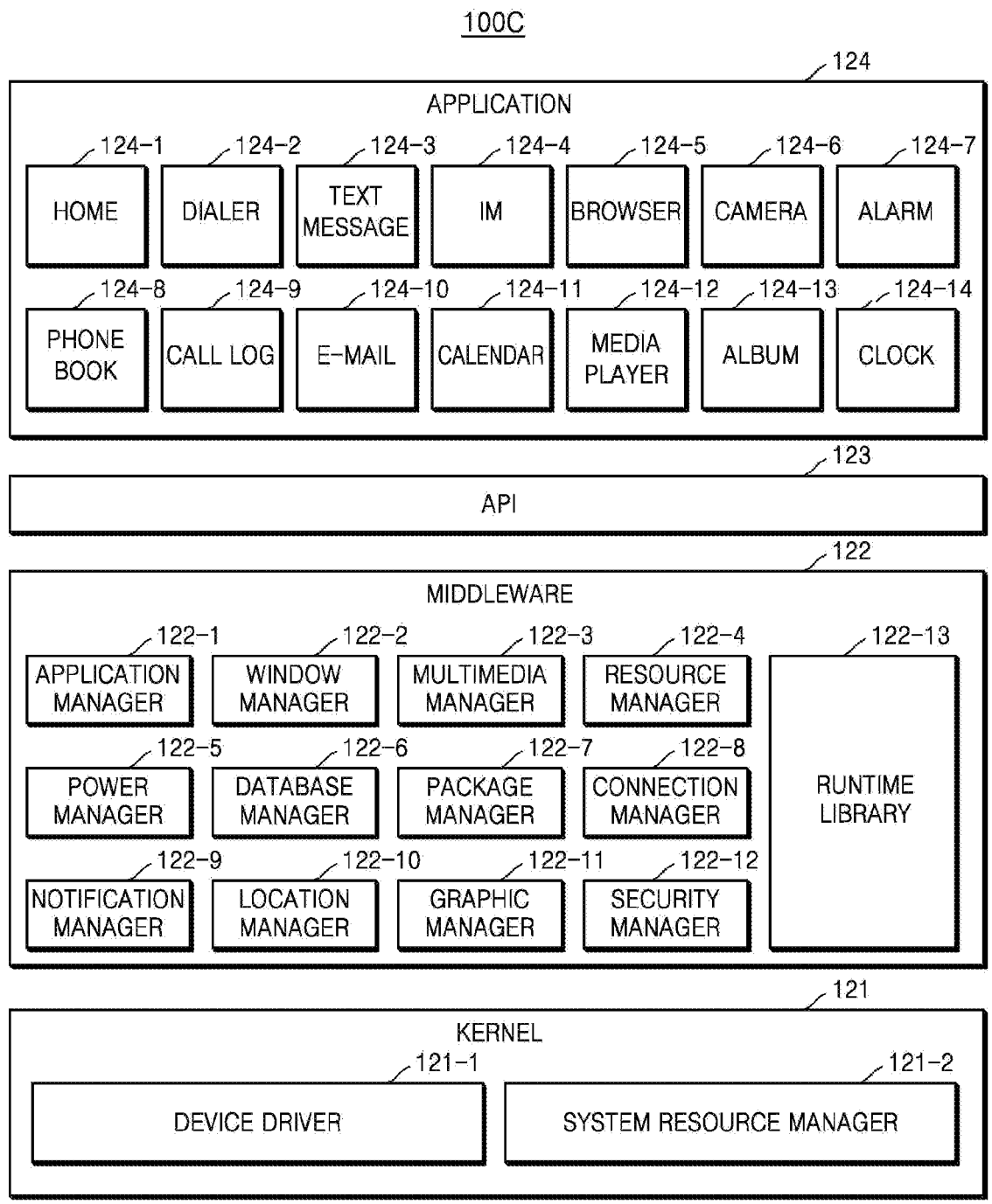
FIG. 49 illustrates a block diagram of a software configuration of the device according to an exemplary embodiment.

FIG. 49 illustrates a block diagram of a software configuration of the device 100C according to an exemplary embodiment.

Referring to FIG. 49, the memory 120 may store an operating system for controlling the device 100C and an application program for operating an application. The operating system may include a kernel, middleware, an application programming interface (API), and the like. The operating system may be, for example, Android, iPhone operating system (iOS), Windows, Symbian, Tizen, Bada, and the like.

The kernel 121 may include at least one selected from the group consisting of a device driver 121-1 or a system resource manager 121-2. The device driver 121-1 may access and control hardware of the device 100C by using software. For example, the device driver 121-1 may classified into an interface and an individual driver module provided by each hardware company. The device driver 121-1 may include, for example, at least one selected from the group consisting of a display driver, a camera driver, a Bluetooth driver, a shared memory driver, a USB driver, a key pad driver, a WiFi driver, an audio driver, an inter-process communication driver, and the like. The system resource manager 121-2 may include at least one selected from the group consisting of a process management unit, a memory management unit, and a file system management unit. The system resource manager 121-2 may perform a function such as control, allocation, or withdrawal of a system resource.

The middleware 122 may include a plurality of modules that are configured in advance to provide a function required for various applications in common. The middleware 122 may provide a function via an API 123 so that an application 124 may efficiently use resources in the device 100C. For example, the middleware 122 may include at least one selected from the group consisting of a plurality of modules such as an application manager 122-1, a window manager 122-2, a multimedia manager 122-3, a resource manager 122-4, a power manager 122-5, a database manager 122-6, a package manager 122-7, a connection manager 122-8, a notification manager 122-9, a location manager 122-10, a graphic manager 122-11, and a security manager 122-12.

The application manager 122-1 may manage a life cycle of at least one application from the application 124. The window manager 122-2 may manage a graphics user interface (GUI) resource used on a screen. The multimedia manager 122-3 may determine a format for playing various multimedia files, and encode and/or decode a multimedia file using a codec that is appropriate for the format. The resource manager 122-4 may manage a resource such as source code, a memory, or a storage space of at least one application selected from the group consisting of applications included in the application 124. The power manager 122-5 may operate with a basic input/output system (BIOS) to manage a battery or other power source and provide power information for operation. The database manager 122-6 may manage generation of, search for, and change of a database that is used for at least one application selected from the group consisting of the applications included in the application 124.

The package manager 122-7 may manage installation or update of an application distributed in the form of a package file. The connection manager 122-8 may manage, for example, wireless connection such as WiFi or Bluetooth. The notification manager 122-9 may display or notify an event such as an arrival message, an appointment, or proximity notification to a user using a method that is uninterruptible to the user. The location manager 122-10 may manage location information of the device 100C. The graphic manager 122-1 may manage a graphic effect that is to be provided to the user and a UI related thereto. The security manager 122-12 may provide various security functions used for system security or user authentication. If the device 100C has a phone call function, the middleware 122 may further include a phone call manager (not shown) for managing voice or video phone call functions for a user.

The middleware 122 may further include a runtime library 122-13 or other library modules. For example, the runtime library 122-13 may be a library module used by a compiler to add a new function through a programming language while an application is being executed. For example, the runtime library 122-13 may perform a function of input/output, memory management, or an arithmetic function. The middleware 122 may generate and use a new middleware module through various combinations of functions of the modules described above. The middleware 122 may provide a specialized module according to a type of an operating system to provide a differentiated function. The middleware 122 may dynamically delete some of the elements or add new elements. According to an exemplary embodiment, elements described above may not be included, other elements may be further included, or elements may be substituted by other elements that have a similar function but a different name.

The API 123 is a group of API programming functions, and may be substituted with a different element according to an operating system. In the case of Android or iOS, for example, an API set be provided for each platform. In a case of Tizen, for example, two or more API sets may be provided.

The application 124 may include a preloaded application installed at default or a third party application that may be installed and used by a user while the user is using the device 100C. The application 124 may include, for example, at least one of a home application 124-1 for returning to a home screen, a dialer application 124-2 for making a phone call with another party, a text message application 124-3 for receiving a message from another party that may be identified using a phone number, an instant message (IM) application 124-4, a browser application 124-5, a camera application 124-6, an alarm application 124-7, a phonebook application 124-8 for managing a phone number or an address of another party, a call log application 124-9 for managing a phone call log of a user, a log of text message transmission/reception, or a missed-call log, an e-mail application 124-10 for receiving a message from another party that is identified through an e-mail, a calendar application 124-11, a media play application 124-12, an album application 124-13, and a clock application 124-14. According to one or more exemplary embodiments, software may include at least one selected from the group consisting of elements described above. Alternatively, some of the above-described elements may not be included, or other additional elements may be further included.

Figure 50:
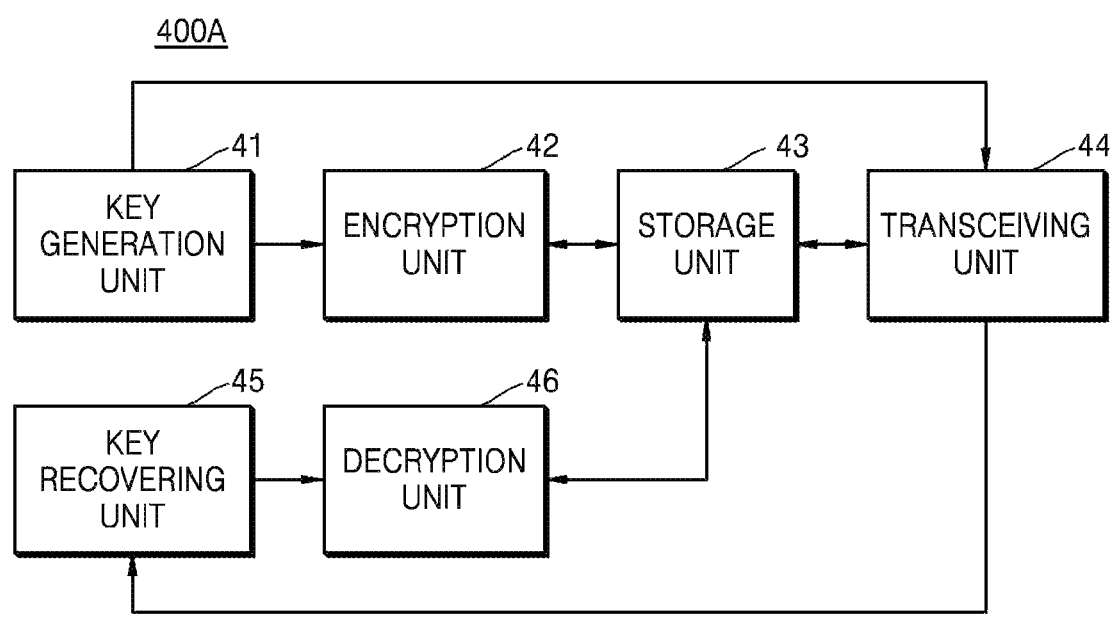
FIG. 50 illustrates a block diagram of a server according to an exemplary embodiment.

FIG. 50 illustrates a block diagram of a server 400A according to an exemplary embodiment.

Referring to FIG. 50, the server 400A includes a key generation unit 41, an encryption unit 42, a storage unit 43, a transceiving unit 44, a key recovering unit 45, and a decryption unit 46. The device 400A may encrypt content that may be shared in a virtual space by a security group of terminals which includes a plurality of devices, and decrypt the encrypted content.

The server 400A may be applied to the server 400 that is described with reference to the example of FIG. 1. Additionally, the server 400A may perform the method of encrypting content and the method of decrypting content described with reference to the examples of FIGS. 1 through 46. Accordingly, a detailed description about operations of content encryption and decryption, performed by the server 400A, may not be provided here again.

The key generation unit 41 may generate an encryption key and a plurality of partial encryption keys with respect to content generated in a virtual space, if a plurality of devices included in a security group access the virtual space. According to an exemplary embodiment, if an asymmetric encryption method is employed, the key generation unit 41 may generate an encryption key that includes a key pair consisting of a public key and a private key. The key generation unit 41 may generate a plurality of partial keys by splitting the public key or the private key. As another example, if the symmetric encryption method is employed, the key generation unit 41 may generate an encryption key that includes a symmetric key. The key generation unit 41 may generate a plurality of partial keys by splitting the symmetric key.

The encryption unit 42 may encrypt content using the generated encryption key. For example, the encryption unit 42 may encrypt content using a session key, and encrypt the session key using the encryption key. Additionally, the encryption unit 42 may encrypt the generated plurality of partial keys. Additionally, if one of a plurality of devices which is accessing a virtual space becomes disconnected from the virtual space, the encryption unit 42 may re-encrypt the content that is being played.

According to an exemplary embodiment, if the asymmetric encryption method is employed, the encryption unit 42 may encrypt content using the public key. For example, the encryption unit 42 may encrypt content using the session key, and encrypt the session key using the public key. According to another exemplary embodiment, if the symmetric encryption method is employed, the encryption unit 42 may encrypt content using the symmetric key. For example, the encryption unit 42 may encrypt content using the session key, and encrypt the session key using the symmetric key.

The storage unit 43 may store at least one selected from the group consisting of encrypted content and decrypted content. Additionally, the storage unit 43 may further store at least one of an encryption key and a decryption key. Also, the storage unit 43 may be implemented as a security zone such as Trust Zone. After the content is encrypted by the encryption unit 42, the encryption key may be deleted.

The transceiving unit 44 may transmit a plurality of partial keys, generated by the key generation unit 41, to a plurality of devices, respectively. As another example, the transceiving unit 44 may transmit the plurality of partial keys, encrypted by the encryption unit 42, to a plurality of devices, respectively. Additionally, the transceiving unit 44 may transmit the encrypted content, stored in the storage unit 43, to at least one of a plurality of devices.

If decryption approvals are remotely obtained from enough devices amounting to a value equal to or greater than a threshold value, from among the plurality of devices included in a security group, the key recovering unit 45 may recover a decryption key from the plurality of partial keys that are stored in each of the devices amounting to the value equal to or greater than the threshold value. Here, the decryption key may correspond to an encryption key generated by the key generation unit 41.

The decryption unit 46 may decrypt the encrypted content using the recovered decryption key. For example, the decryption unit 46 may decrypt the encrypted session key using the recovered decryption key, and decrypt the encrypted content using the decrypted session key. Additionally, after the encrypted content is decrypted, at least one of the decryption key and the decrypted content may be deleted.

In the current embodiment, if at least one of the plurality of devices which have accessed the virtual space is disconnected from the virtual space, at least one of the key recovering unit 45 and the decryption unit 46 may stop operation, and the encryption unit 42 may re-encrypt the decrypted content.

In addition, the key generation unit 41, the encryption unit 42, the key recovering unit 45, and the decryption unit 46 may be implemented as a plurality of programs, and stored in a memory in the server 400A. A control unit included in the server 400A may access the memory, and thus, execute operations such as key generation, encryption, key recovery, and decryption. Additionally, the storage unit 43 may be implemented as a portion of an area of the memory in the server 400A. Additionally, in the current embodiment, the transceiving unit 44 may be implemented as a part of a communication unit included in the server 400A. Hereinafter, an exemplary embodiment of hardware of the device is described with reference to FIG. 51.

Figure 51:
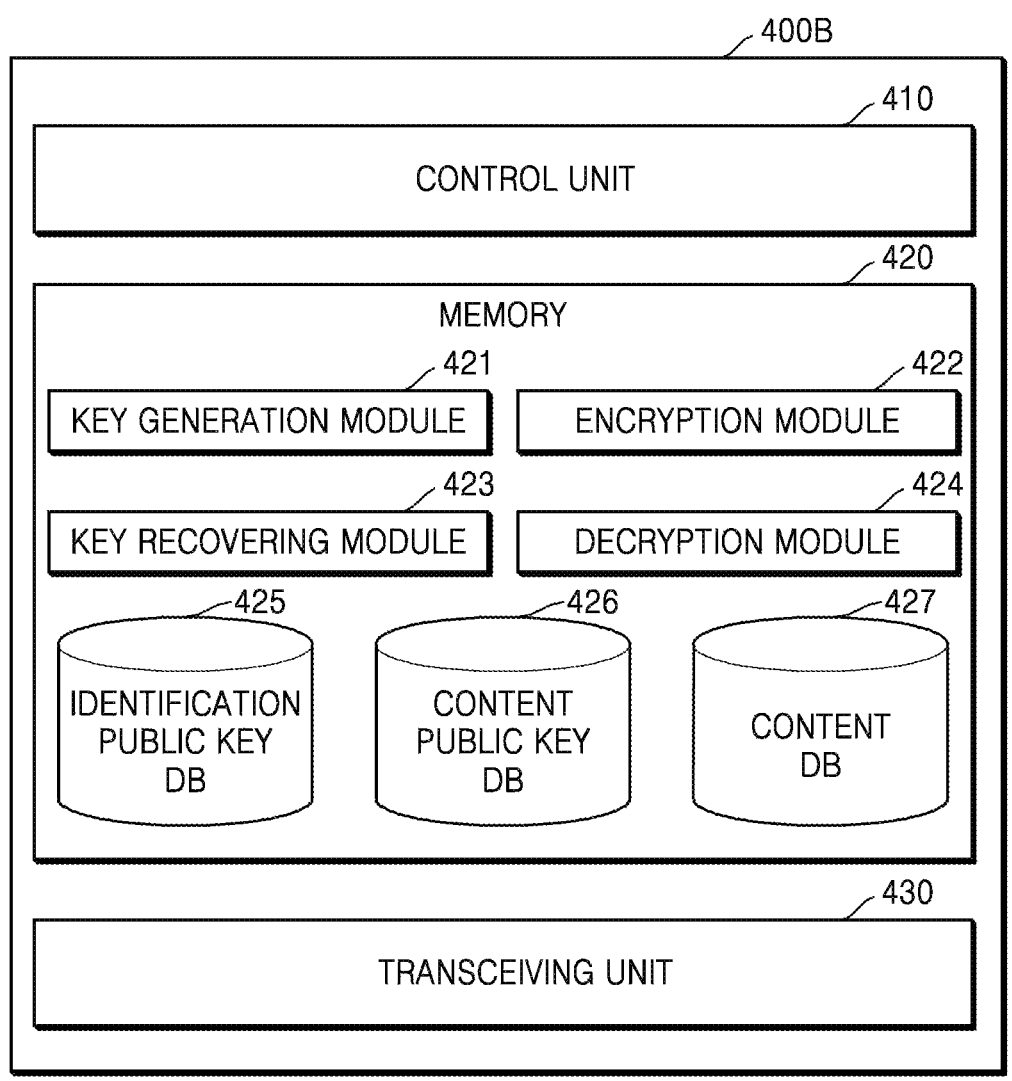
FIG. 51 illustrates a block diagram illustrating a configuration of a server according to an exemplary embodiment.

FIG. 51 illustrates a block diagram of a configuration of a server 400B according to an exemplary embodiment.

Referring to FIG. 51, the server 400B includes a control unit 410, a memory 420, and a transceiving unit 430. However, the elements, shown in FIG. 51, are not essential elements. The server 400B may be implemented using more or less elements than those shown in FIG. 51. For example, the server 400B may be a cloud server that is implemented using less elements than those shown in FIG. 51. Hereinafter, the elements are sequentially described.

The control unit 410 may control all operations of the server 400B. For example, at least one piece of content received from a device may be encrypted/decrypted by executing programs (or modules) stored in the memory 420. As a non-limiting example, if first through third devices included in the security group access a virtual space, the control unit 410 may generate an encryption key and a plurality of partial keys, and encrypt the content. Additionally, if each of the first through third devices approve decryption of the encrypted content or if devices amounting to a value equal to or greater than a preset threshold value, from among the first through third devices, approve decryption of the encrypted content, the control unit 410 may recover a decryption key from encrypted partial keys and decrypt the encrypted content by using the recovered decryption key.

The memory 420 may store a program for processing and controlling the control unit 410, or store input/output data, for example, content received from a device, information about a device, analysis information about content, and the like. The programs stored in the memory 420 may be classified into a plurality of modules according to a function. For example, the programs may be classified into a key generation module 421, an encryption module 422, a key recovering module 423, a decryption module 424, an identification public key database (DB) 425, a content public key DB 426, a content DB 427, and the like.

The transceiving unit 430 may include one or more elements for communication between the server 400B and the plurality of devices. For example, the transceiving unit 430 may transmit at least one selected from the group consisting of encrypted content, decrypted content, and encrypted partial keys to the plurality of devices.

According to one or more exemplary embodiments, content shared between a plurality of terminals of a sharing group accessing a chatting space may be protected to prevent unauthorized terminals or users who are not apart of the sharing group, from viewing or otherwise accessing the shared content. For example, the shared content may be encrypted by a server using a key such as a public and/or a private key. However, rather than give the entire key to each of the plurality of terminals of the sharing group, only a portion of the key may be given to some or each of the plurality of terminals. Accordingly, at least some or all of the plurality of terminals must be present to provide their partial key in order to reproduce the entire encryption key, and to subsequently decrypt the previously shared content.

For example, encrypted content that was previously shared in the chatting space by the secure group of users may be decrypted, in response to detecting the plurality of users included in the secure group of users are accessing the chatting space. Accordingly, while the secure group of users is still present in the chatting space, the content may be shared. Subsequently, one or more of the group of users may leave or be otherwise unavailable in the chat space. Upon detecting that the secure group of users is again present in the chatting space, a device or a server may request the partial encryption keys from the secure group of users to recover the entire encryption key or decryption key to unlock the previously shared content.

One or more exemplary embodiments can be implemented in a form of an executable program command through a variety of computer means recordable to computer-readable media. The computer-readable media may include solely or in combination, program commands, data files and data structures. The program commands recorded to the media may be components specially designed for the inventive concept or may be usable to a skilled person in a field of computer software. Computer-readable recording media include magnetic media such as a hard disk, floppy disk, magnetic tape, optical media such as CD-ROM and DVD, magneto-optical media such as an optical disk and hardware devices such as ROM, RAM and flash memory specially designed to store and carry out programs. Program commands include not only a machine language code made by a complier but also a high level code that may be used by an interpreter etc., which is executed by a computer.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of sharing content in a chatting space of a social networking service (SNS) by a device from among a plurality of devices included in a sharing group of devices, the method comprising:
   generating content in the chatting space;
   encrypting the generated content;
   storing the encrypted content in at least one of the plurality of devices or a server;
   detecting whether the plurality of devices included in the sharing group of devices are accessing the chatting space; and
   decrypting the encrypted content in response to detecting that the plurality of devices included in the sharing group of devices are accessing the chatting space.

2. The method of claim 1, wherein the plurality of devices comprise a first device, a second device, and a third device, and
   the method further comprises decrypting the encrypted content in response to at least two selected from the group consisting of the first through third devices accessing the chatting space.

3. The method of claim 1, further comprising:
   encrypting the decrypted content, in response to at least one selected from the group consisting of the plurality of devices being disconnected from the chatting space after the decrypting of the encrypted content is performed.

4. The method of claim 1, further comprising generating a sharing folder for the generated content in at least one of the plurality of devices or the server.

5. The method of claim 1, wherein the encrypting comprises:
   generating an encryption key for encrypting the generated content and a plurality of partial keys of the encryption key;
   distributing the generated plurality of partial keys to the plurality of devices, respectively; and
   encrypting the generated content using the encryption key.

6. The method of claim 5, wherein the encrypting of the generated content further comprises encrypting the plurality of partial keys, and
   the distributing of the generated plurality of partial keys comprises distributing the encrypted plurality of partial keys to the plurality of device, respectively.

7. The method of claim 6, further comprising storing the distributed encryption keys in a security zone of the respective devices of the plurality of devices.

8. The method of claim 5, wherein the decrypting comprises:
   recovering a decryption key corresponding to the encryption key from the distributed plurality of partial keys of the encryption key, in response to the plurality of devices accessing the chatting space; and
   decrypting the encrypted content using the recovered decryption key.

9. A server configured to share content in a chatting space of a social networking service (SNS), the server comprising:
   a receiver configured to receive, from one of a plurality of devices of a sharing group of devices, a request for generating a chatting space that is to be accessed by the plurality of devices, and to receive content generated by at least one device from among the plurality of devices of a sharing group of devices;
   a controller configured to generate the chatting space, encrypt the generated content, control the encrypted content to be stored in at least one of the plurality of devices or the server, and decrypt the encrypted content in response to the plurality of devices of the sharing group accessing the chatting space; and
   a transmitter configured to transmit the decrypted content to the chatting space.

10. The server of claim 9, wherein the plurality of devices comprise a first device, a second device, and a third device, and
    the controller is configured to decrypt the encrypted content in response to at least two selected form the group consisting of the first through third devices accessing the chatting space.

11. The server of claim 9, wherein the controller is configured to determine a decryption condition with respect to content that is shared in the chatting space or a generation condition with respect to the content that is shared in the chatting space.

12. The server of claim 11, wherein the decryption condition comprises at least two essential devices that have to access the chatting space to decrypt the encrypted content, from among the plurality of devices.

13. The server of claim 11, wherein the decryption condition comprises at least one of a method of transmitting a decryption request to the plurality of devices and a method of receiving a decryption approval from the plurality of devices.

14. The server of claim 13, wherein the method of transmitting the decryption request comprises transmitting a decryption request to the plurality of devices using at least one of a text message, an e-mail, a notification window, and a chatting message.

15. The server of claim 13, wherein the method of receiving the decryption approval comprises receiving a decryption approval from the plurality of devices using at least one of a video phone call, biometric identification data, a password, and a pin code.

16. The server of claim 11, wherein the controller is configured to set different decryption conditions for different pieces of content, respectively.

17. The server of claim 11, wherein the generation condition comprises at least two essential devices that have to access the chatting space to generate the content, from among the plurality of devices.

18. The server of claim 9, wherein the controller is configured to determine a sharing limitation with respect to the decrypted content so that the decrypted content is shared between only the plurality of devices.

19. The server of claim 18, wherein the sharing limitation comprises at least one selected from the group consisting of:
a providing time for the decrypted content,
whether a visible watermark is included in the decrypted content,
whether a print screen function is prohibited with respect to the decrypted content,
whether a device shaking request message is transmitted while the decrypted content is being played, and
whether to stop providing of the decrypted content based on a real-time detection of whether the plurality of devices are viewing the decrypted content.

20. The server of claim 9, wherein the controller is configured to determine the plurality of devices.

21. The server of claim 9, wherein the transmitter is configured to transmit a message asking the plurality of devices about whether the plurality of devices are to participate in the chatting space, based on an address book that is accessible by an application providing the chatting space.

22. The server of claim 9, wherein the controller is configured to request the plurality of devices for a user identification certification via at least one of a video phone call, biometric identification data, a password, and a pin code.

23. The server of claim 9, wherein the controller is configured to generate a user interface (UI) object corresponding to the chatting space which is configured to be accessed by the plurality of devices.

24. A non-transitory computer-readable medium having recorded thereon a computer program that is executable by a computer to execute a method of sharing content in a chatting space of a social networking service (SNS), by a device from among a plurality of devices included in a sharing group of devices, the method comprising: generating content in the chatting space;
encrypting the generated content;
storing the encrypted content in at least one of the plurality of devices or a server;
detecting whether the plurality of devices included in the sharing group of devices are accessing the chatting space; and
decrypting the encrypted content in response to detecting that the plurality of devices included in the sharing group of devices are accessing the chatting space.

25. A method of providing a social networking service (SNS), by a server, the method comprising:
receiving content generated by at least one device from among a plurality of devices of a sharing group of devices;
encrypting the received content;
storing the encrypted content in at least one of the plurality of devices or the server;
detecting whether the plurality of devices included in the sharing group of devices are accessing a chatting space; and
decrypting the encrypted content in response to detecting that the plurality of devices included in the sharing group of devices are accessing the chatting space.

26. The method of claim 25, wherein the plurality of devices comprise a first device, a second device, and a third device, and
the method further comprises decrypting the encrypted content in response to at least two selected from the group consisting of the first through third devices accessing the chatting space.

27. The method of claim 25, further comprising:
encrypting the decrypted content, in response to at least one selected from the group consisting of the plurality of devices being disconnected from the chatting space after the decrypting of the encrypted content is performed.

28. A non-transitory computer-readable medium having recorded thereon a computer program that is executable by a computer to execute a method of providing a social networking service (SNS), by a server, the method comprising:
receiving content generated by at least one device from among a plurality of devices of a sharing group of devices;
encrypting the received content;
storing the encrypted content in at least one of the plurality of devices or the server;
detecting whether the plurality of devices included in the sharing group of devices are accessing a chatting space; and
decrypting the encrypted content in response to detecting that the plurality of devices included in the sharing group of devices are accessing the chatting space.

* * * * *